US009721331B2

(12) United States Patent
Arai et al.

(10) Patent No.: US 9,721,331 B2
(45) Date of Patent: Aug. 1, 2017

(54) DIGITAL FILTER, AND IMAGE GENERATING, SUPERHYBRID IMAGE GENERATING, ELECTRONIC MEDIUM MANUFACTURING, AND LETTER-ROW TILT ILLUSION GENERATING APPARATUS, METHOD AND PROGRAM

(71) Applicant: National Institute of Japan Science and Technology Agency, Kawaguchi-shi, Saitama (JP)

(72) Inventors: Hitoshi Arai, Tokyo (JP); Shinobu Arai, Tokyo (JP)

(73) Assignee: NATIONAL INSTITUTE OF JAPAN SCIENCE AND TECHNOLOGY AGENCY, Kawaguchi-Shi (JP)

( * ) Notice: Subject to any disclaimer, the term of this patent is extended or adjusted under 35 U.S.C. 154(b) by 0 days.

(21) Appl. No.: 14/471,092

(22) Filed: Aug. 28, 2014

(65) Prior Publication Data
US 2015/0078676 A1 Mar. 19, 2015

Related U.S. Application Data

(63) Continuation of application No. PCT/JP2012/084256, filed on Dec. 21, 2012.

(30) Foreign Application Priority Data

Feb. 29, 2012 (JP) ................................. 2012-043750

(51) Int. Cl.
G06T 5/20 (2006.01)
G06T 5/10 (2006.01)
G06T 5/00 (2006.01)

(52) U.S. Cl.
CPC ................ *G06T 5/20* (2013.01); *G06T 5/001* (2013.01); *G06T 5/10* (2013.01); *G06T 2207/20016* (2013.01); *G06T 2207/20064* (2013.01)

(58) Field of Classification Search
None
See application file for complete search history.

(56) References Cited

U.S. PATENT DOCUMENTS 5,799,112 A    8/1998  De Queiroz et al.
7,386,158 B2 * 6/2008  Yamada .................. G06T 5/004
                                                382/132

(Continued)

FOREIGN PATENT DOCUMENTS

EP    1 501 050 A2    1/2005
JP    H10-98628 A     4/1998
JP    2009-251711 A   10/2009

OTHER PUBLICATIONS

Chen, D.R., Chang, R.F., Kuo, W.J., Chen, M.C. and Huang, Y.L., 2002. Diagnosis of breast tumors with sonographic texture analysis using wavelet transform and neural networks. Ultrasound in medicine & biology, 28(10), pp. 1301-1310.*

(Continued)

*Primary Examiner* — Michelle Hausmann

(57) ABSTRACT

In the present invention, subband signals are obtained by performing multiresolution decomposition on image data by using a broad-sense pinwheel framelet that is a set of an approximate filter with no orientation and a plurality of detail filters with respective orientations, and that has a degree. When an image is reconstructed by summing the obtained subband signals, the reconstructed image data is generated by attenuating or amplifying a subband signal (Continued)

corresponding to at least one of filters that have predetermined frequency characteristics and/or a predetermined orientation among the filters.

21 Claims, 53 Drawing Sheets

(56) References Cited

U.S. PATENT DOCUMENTS

| | | | | |
|---|---|---|---|---|
| 8,326,046 | B2* | 12/2012 | Rezazadeh | G06K 9/6215 382/128 |
| 8,385,971 | B2* | 2/2013 | Rhoads | G06F 17/30244 382/162 |
| 8,515,182 | B2* | 8/2013 | Rezazadeh | G06T 7/0002 382/100 |
| 8,647,275 | B2* | 2/2014 | Sato | A61B 8/06 600/443 |
| 8,861,821 | B2* | 10/2014 | Osumi | A61B 8/14 382/131 |
| 8,873,879 | B2* | 10/2014 | Arai | G06T 11/003 382/260 |
| 8,879,863 | B1* | 11/2014 | Bernard | G06T 5/002 382/224 |
| 9,292,910 | B2* | 3/2016 | Arai | G06T 5/20 |
| 9,426,333 | B2* | 8/2016 | Arai | G06T 11/60 |
| 2001/0016066 | A1* | 8/2001 | Amonou | G06T 7/0081 382/173 |
| 2002/0057844 | A1* | 5/2002 | Sirohey | G06T 3/4092 382/240 |
| 2002/0168113 | A1* | 11/2002 | Nakayama | G06F 17/148 382/240 |
| 2007/0019722 | A1* | 1/2007 | Bourge | H04N 19/615 375/240.11 |
| 2008/0306338 | A1* | 12/2008 | Yamazaki | A61B 1/00009 600/109 |
| 2009/0046943 | A1* | 2/2009 | Ishiga | G06T 5/10 382/266 |
| 2009/0326383 | A1* | 12/2009 | Barnes | A61B 5/0059 600/476 |
| 2010/0008574 | A1* | 1/2010 | Ishiga | H04N 5/357 382/167 |
| 2010/0066874 | A1* | 3/2010 | Ishiga | G06T 5/002 348/252 |
| 2010/0150461 | A1* | 6/2010 | Iwami | H04N 5/44543 382/233 |
| 2010/0208795 | A1* | 8/2010 | Hsiang | H04N 19/61 375/240.2 |
| 2010/0246395 | A1* | 9/2010 | Itaya | H04N 21/23406 370/232 |
| 2011/0206293 | A1* | 8/2011 | Sasaki | G06T 5/50 382/274 |

OTHER PUBLICATIONS

Mirchandani, G., Foote, R., Rockmore, D.N., Healy, D. and Olson, T., 2000. A wreath product group approach to signal and image processing. II. Convolution, correlation, and applications. Signal Processing, IEEE Transactions on, 48(3), pp. 749-767.*

Hitoshi Arai et al., "Analysis of Letter-Row Tilt Illusion 1: Analysis of コニア画 Using Wavelets", Visual Mathematics e Laboratory Report, No. 1 (Apr. 2005).

Hitoshi Arai et al., "Analysis of Letter-Row Tilt Illusion 2: Creation of Letter-Row Tilt Illusion Using Wavelet Analysis", Visual Mathematics e Laboratory Report, No. 2 (Apr. 2005).

Misa Kohara, "Role of Horizontal Components in Illusion in Which Character String Appears Tilted", Ritsumeikan University Student Paper, vol. 12. pp. 83-103 (Sep. 2006).

Rafael C. Gonzalez et al., Digital Image Processing, Third Edition, pp. 294-298 and pp. 335-343, Prentice Hall (2008).

Alasdair McAndrew, "Introduction to Digital Image Processing with Matlab", pp. 173-176, p. 191, and pp. 202-205, Course Technology (2004).

Hitoshi Arai et al., "2D Tight Framelets with Orientation Selectivity Suggested by Vision Science", JSIAM Letters, vol. 1, pp. 9-12 (2009).

Hitoshi Arai et al., "Finite Discrete, Shift-Invariant, Directional Filterbanks for Visual Information Processing, I : Construction", Interdisciplinary Information Sciences, vol. 13, No. 2, pp. 255-273 (2007).

Hitoshi Arai, "Science and Mathematics of Vision: World of Optical Illusions Explored with Wavelets—Third Installment: Nonlinear Mathematical Models of Vision and Simulation of Occurrence of Optical Illusions", Mathematical Science, No. 544, pp. 63-68 (Oct. 2008).

Hitoshi Arai, "Simple Pinwheel Framelet", Kokyuroku of Research Institute of Mathematical Sciences, vol. 1684, pp. 63-67 (Feb. 2010).

Hitoshi Arai, "Science and Mathematics of Vision: World of Optical Illusions Explored with Wavelets—First Installment: Visual Mathematical Model and Wavelets", Mathematical Science, No. 542, pp. 64-69 (Aug. 2008).

International Search Report received for PCT Patent Application No. PCT/JP2012/084256 mailed on Feb. 12, 2013, 4 pages.

The International Bureau of WIPO, "International Preliminary Report on Patentability," issued in International Application No. PCT/JP2012/084256, of which U.S. Appl. No. 14/471,092 is a U.S. national phase entry, with a date of issuance of Sep. 2, 2014.

Yu-Ping Wang et al., "Image enhancement using multiscale oriented wavelets", Proceedings 2001 International Conference on Image Processing, ICIP 2001 in Thessaloniki, Greece, Oct. 7-10, 2001; [International Conference on Image Processing], Institute of Electrical and Electronics Engineers, New York, NY, vol. 1, pp. 610-613 (Oct. 7, 2001).

Hitoshi Arai et al., "Framelet analysis of some geometrical illusions", Japan Journal of Industrial and Applied Mathematics, vol. 27, No. 1, pp. 23-46 (Jun. 1, 2010).

Aude Oliva et al., "Hybrid images", ACM Transactions on Graphics, vol. 25, Issue 3, pp. 527-532 (Jul. 1, 2006).

European Patent Office, "The Partial Supplementary European Search Report", issued in European Patent Application No. 12 870 311.3, which is a European counterpart of U.S. Appl. No. 14/471,092, with an issuance date of Oct. 7, 2015, 6 pages.

* cited by examiner

FIG.5

| $d_k(1)$ | $d_k(2)$ | $d_k(3)$ | $d_k(4)$ | $d_k(5)$ | $d_k(6)$ | $d_k(7)$ | $a_k$ |
|---|---|---|---|---|---|---|---|
| $d_k(8)$ | $d_k(9)$ | $d_k(10)$ | $d_k(11)$ | $d_k(12)$ | $d_k(13)$ | $d_k(14)$ | $d_k(15)$ |
| $d_k(16)$ | $d_k(17)$ | $d_k(18)$ | $d_k(19)$ | $d_k(20)$ | $d_k(21)$ | $d_k(22)$ | $d_k(23)$ |
| $d_k(24)$ | $d_k(25)$ | $d_k(26)$ | $d_k(27)$ | $d_k(28)$ | $d_k(29)$ | $d_k(30)$ | $d_k(31)$ |
| $d_k(32)$ | $d_k(33)$ | $d_k(34)$ | $d_k(35)$ | $d_k(36)$ | $d_k(37)$ | $d_k(38)$ | $d_k(39)$ |
| $d_k(40)$ | $d_k(41)$ | $d_k(42)$ | $d_k(43)$ | $d_k(44)$ | $d_k(45)$ | $d_k(46)$ | $d_k(47)$ |
| $d_k(48)$ | $d_k(49)$ | $d_k(50)$ | $d_k(51)$ | $d_k(52)$ | $d_k(53)$ | $d_k(54)$ | $d_k(55)$ |
| $d_k(56)$ | $d_k(57)$ | $d_k(58)$ | $d_k(59)$ | $d_k(60)$ | $d_k(61)$ | $d_k(62)$ | $d_k(63)$ |

| $d_k(64)$ | $d_k(65)$ | $d_k(66)$ | $d_k(67)$ | $d_k(68)$ | $d_k(69)$ |
|---|---|---|---|---|---|
| $d_k(70)$ | $d_k(71)$ | $d_k(72)$ | $d_k(73)$ | $d_k(74)$ | $d_k(75)$ |
| $d_k(76)$ | $d_k(77)$ | $d_k(78)$ | $d_k(79)$ | $d_k(80)$ | $d_k(81)$ |
| $d_k(82)$ | $d_k(83)$ | $d_k(84)$ | $d_k(85)$ | $d_k(86)$ | $d_k(87)$ |
| $d_k(88)$ | $d_k(89)$ | $d_k(90)$ | $d_k(91)$ | $d_k(92)$ | $d_k(93)$ |
| $d_k(94)$ | $d_k(95)$ | $d_k(96)$ | $d_k(97)$ | $d_k(98)$ | $d_k(99)$ |

FIG.6

| | | | | | | | | $a_{k,1}$ | $b_{k,69}$ | $b_{k,75}$ | $b_{k,81}$ | $b_{k,87}$ | $b_{k,93}$ | $b_{k,99}$ |
| | | | | | | $b_{k,7}$ | $b_{k,15}$ | $b_{k,68}$ | $b_{k,74}$ | $b_{k,80}$ | $b_{k,86}$ | $b_{k,92}$ | $b_{k,98}$ |
| | | | | | $b_{k,6}$ | $b_{k,14}$ | $b_{k,23}$ | $b_{k,67}$ | $b_{k,73}$ | $b_{k,79}$ | $b_{k,85}$ | $b_{k,91}$ | $b_{k,97}$ |
| | | | | $b_{k,5}$ | $b_{k,13}$ | $b_{k,22}$ | $b_{k,31}$ | $b_{k,66}$ | $b_{k,72}$ | $b_{k,78}$ | $b_{k,84}$ | $b_{k,90}$ | $b_{k,96}$ |
| | | | $b_{k,4}$ | $b_{k,12}$ | $b_{k,21}$ | $b_{k,30}$ | $b_{k,39}$ | $b_{k,65}$ | $b_{k,71}$ | $b_{k,77}$ | $b_{k,83}$ | $b_{k,89}$ | $b_{k,95}$ |
| | | $b_{k,3}$ | $b_{k,11}$ | $b_{k,20}$ | $b_{k,29}$ | $b_{k,38}$ | $b_{k,47}$ | $b_{k,64}$ | $b_{k,70}$ | $b_{k,76}$ | $b_{k,82}$ | $b_{k,88}$ | $b_{k,94}$ |
| | $b_{k,2}$ | $b_{k,10}$ | $b_{k,19}$ | $b_{k,28}$ | $b_{k,37}$ | $b_{k,46}$ | $b_{k,55}$ | | | | | | |
| $b_{k,1}$ | $b_{k,9}$ | $b_{k,18}$ | $b_{k,27}$ | $b_{k,36}$ | $b_{k,45}$ | $b_{k,54}$ | $b_{k,63}$ | | | | | | |
| $b_{k,8}$ | $b_{k,17}$ | $b_{k,26}$ | $b_{k,35}$ | $b_{k,44}$ | $b_{k,53}$ | $b_{k,62}$ | | | | | | | |
| $b_{k,16}$ | $b_{k,25}$ | $b_{k,34}$ | $b_{k,43}$ | $b_{k,52}$ | $b_{k,61}$ | | | | | | | | |
| $b_{k,24}$ | $b_{k,33}$ | $b_{k,42}$ | $b_{k,51}$ | $b_{k,60}$ | | | | | | | | | |
| $b_{k,32}$ | $b_{k,41}$ | $b_{k,50}$ | $b_{k,59}$ | | | | | | | | | | |
| $b_{k,40}$ | $b_{k,49}$ | $b_{k,58}$ | | | | | | | | | | | |
| $b_{k,48}$ | $b_{k,57}$ | | | | | | | | | | | | |
| $b_{k,56}$ | | | | | | | | | | | | | |

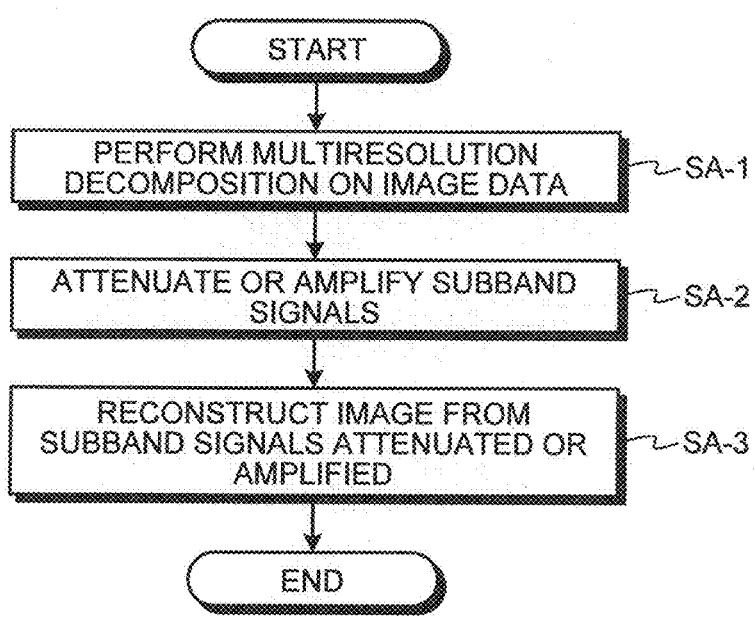

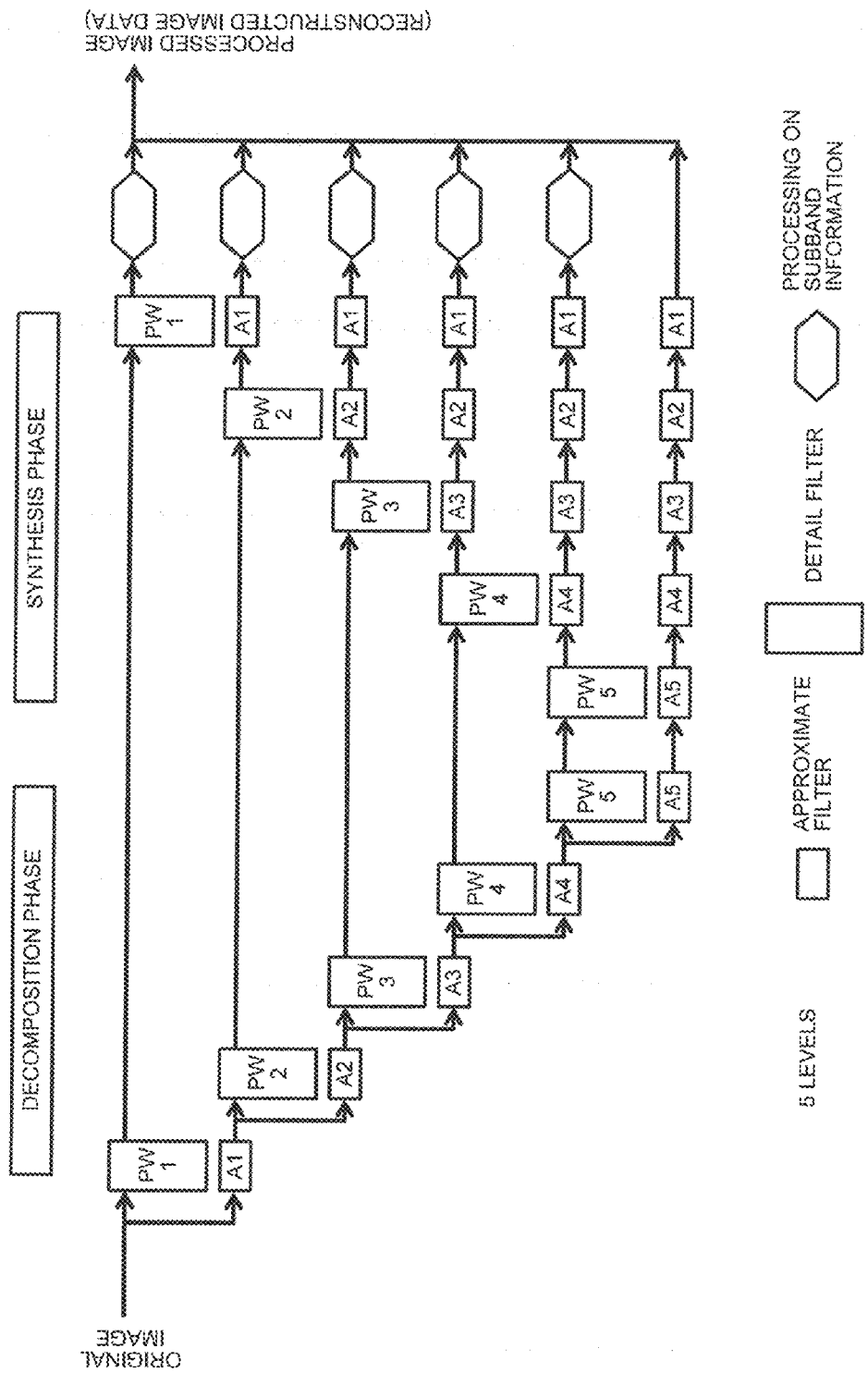

| | | | | | |
|---|---|---|---|---|---|
| \multicolumn{4}{c}{LEVEL 1} | | |
| 1 | 1 | 1 | 0 | | |
| 1 | 1 | 1 | 1 | 1 | 1 |
| 1 | 1 | 1 | 1 | 1 | 1 |
| 1 | 1 | 1 | 1 | | |

FIG.14

LEVEL 1

| 1 | 1 | 1 | 0 |   |   |
|---|---|---|---|---|---|
| 1 | 1 | 1 | 1 | 1 | 1 |
| 1 | 1 | 1 | 1 | 1 | 1 |
| 1 | 1 | 1 | 1 |   |   |

FIG.15

LEVEL 2

| 1 | 1 | 1 | 0 |   |   |
|---|---|---|---|---|---|
| 1 | 1 | 1 | 1 | 1 | 1 |
| 1 | 1 | 1 | 1 | 1 | 1 |
| 1 | 1 | 1 | 1 |   |   |

LEVEL 1

| 1 | 1 | 1 | 1 | 1 | 1 | 1 | 0 |   |   |   |   |   |   |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 |   |   |   |   |   |   |

FIG.21

LEVEL 1

| 1 | 1 | 1 | 1 | 1 | 1 | 1 | 0 |   |   |   |   |   |   |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 |   |   |   |   |   |   |

FIG.22

LEVEL 2

| 1 | 1 | 1 | 1 | 1 | 1 | 1 | 0 |   |   |   |   |   |   |
|---|---|---|---|---|---|---|---|---|---|---|---|---|---|
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 |   |   |   |   |   |   |

| | | | | | | | | | | | | | |
|---|---|---|---|---|---|---|---|---|---|---|---|---|---|
| | | | | LEVEL 1 | | | | | | | | | |
| 1 | 1 | 1 | 1 | 1 | 0 | 0 | 0 | | | | | | |
| 1 | 1 | 1 | 1 | 1 | 0 | 0 | 0 | 0 | 0 | 1 | 1 | 1 | 1 |
| 1 | 1 | 1 | 1 | 1 | 0 | 0 | 0 | 0 | 0 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | | | | | | |

LEVEL 1

| 0 | 0 | 0 | 0 | 0 | 1 | 1 | 1 |   |   |   |   |   |   |
|---|---|---|---|---|---|---|---|---|---|---|---|---|---|
| 0 | 0 | 0 | 0 | 0 | 1 | 1 | 1 | 1 | 1 | 0 | 0 | 0 | 0 |
| 0 | 0 | 0 | 0 | 0 | 1 | 1 | 1 | 1 | 1 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 |   |   |   |   |   |   |

| | | | | LEVEL 1 | | | | | | | | | |
|---|---|---|---|---|---|---|---|---|---|---|---|---|---|
| 0 | 0 | 0 | 0 | 0 | 1 | 1 | 0 | | | | | | |
| 0 | 0 | 0 | 0 | 0 | 1 | 1 | 1 | 1 | 1 | 0 | 0 | 0 | 0 |
| 0 | 0 | 0 | 0 | 0 | 1 | 1 | 1 | 1 | 1 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | | | | | | |

LEVEL 2

| 0 | 0 | 0 | 1 | 1 | 1 | 1 | 0 |   |   |   |   |   |   |
|---|---|---|---|---|---|---|---|---|---|---|---|---|---|
| 0 | 0 | 0 | 1 | 1 | 1 | 1 | 1 | 1 | 1 | 1 | 1 | 0 | 0 |
| 0 | 0 | 0 | 1 | 1 | 1 | 1 | 1 | 1 | 1 | 1 | 1 | 0 | 0 |
| 0 | 0 | 0 | 1 | 1 | 1 | 1 | 1 | 1 | 1 | 1 | 1 | 0 | 0 |
| 0 | 0 | 0 | 1 | 1 | 1 | 1 | 1 | 1 | 1 | 1 | 1 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 |   |   |   |   |   |   |

LEVELS 1 AND 2

| 1 | 1 | 1 | 1 | 1 | 1 | 1 | 0 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | | | | | | |

| | | | | | | LEVEL 4 | | | | | | | |
|---|---|---|---|---|---|---|---|---|---|---|---|---|---|
| 0 | 0 | 0 | 0 | 0 | 1/3 | 1/3 | 1/3 | | | | | | |
| 0 | 0 | 0 | 0 | 0 | 1/3 | 1/3 | 1/3 | 1/3 | 1/3 | 0 | 0 | 0 | 0 |
| 0 | 0 | 0 | 0 | 0 | 1/3 | 1/3 | 1/3 | 1/3 | 1/3 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

FIG.49

LEVEL 1

| 0.4 | 0.4 | 0.4 | 0.4 | 0.4 | 0.4 | 0.4 | 0.4 | 0.4 | 0 | | | | | | | | |
|---|---|---|---|---|---|---|---|---|---|---|---|---|---|---|---|---|---|
| 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| 0.4 | 0.4 | 0.4 | 0.4 | 0.4 | 0.4 | 0.4 | 0.4 | 0.4 | 0.4 | | | | | | | | |

FIG.50

LEVEL 5

| 0 | 0 | 0 | 0 | 0 | 0 | 0 | 0 | 0 | 1 | | | | | | | | |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | | | | | | | | |

FIG.52

LEVEL 3

| 0 | 0 | 0 | 0 | 0 | 0 | 0.2 | 0.2 | 0.2 | 0 |     |     |     |   |   |   |   |   |
|---|---|---|---|---|---|-----|-----|-----|-----|-----|-----|-----|---|---|---|---|---|
| 0 | 0 | 0 | 0 | 0 | 0 | 0.2 | 0.2 | 0.2 | 0.2 | 0.2 | 0.2 | 0.2 | 0 | 0 | 0 | 0 | 0 |
| 0 | 0 | 0 | 0 | 0 | 0 | 0.2 | 0.2 | 0.2 | 0.2 | 0.2 | 0.2 | 0.2 | 0 | 0 | 0 | 0 | 0 |
| 0 | 0 | 0 | 0 | 0 | 0 | 0.2 | 0.2 | 0.2 | 0.2 | 0.2 | 0.2 | 0.2 | 0 | 0 | 0 | 0 | 0 |
| 0 | 0 | 0 | 0 | 0 | 0 | 0   | 0   | 0   | 0   | 0   | 0   | 0   | 0 | 0 | 0 | 0 | 0 |
| 0 | 0 | 0 | 0 | 0 | 0 | 0   | 0   | 0   | 0   | 0   | 0   | 0   | 0 | 0 | 0 | 0 | 0 |
| 0 | 0 | 0 | 0 | 0 | 0 | 0   | 0   | 0   | 0   | 0   | 0   | 0   | 0 | 0 | 0 | 0 | 0 |
| 0 | 0 | 0 | 0 | 0 | 0 | 0   | 0   | 0   | 0   | 0   | 0   | 0   | 0 | 0 | 0 | 0 | 0 |
| 0 | 0 | 0 | 0 | 0 | 0 | 0   | 0   | 0   | 0   | 0   | 0   | 0   | 0 | 0 | 0 | 0 | 0 |
| 0 | 0 | 0 | 0 | 0 | 0 | 0   | 0   | 0   | 0   |     |     |     |   |   |   |   |   |

FIG.53

LEVEL 4

| 0.6 | 0.6 | 0.6 | 0.6 | 0.6 | 0.6 | 0.6 | 0.6 | 0.6 | 0   |     |     |     |     |     |     |     |     |
|-----|-----|-----|-----|-----|-----|-----|-----|-----|-----|-----|-----|-----|-----|-----|-----|-----|-----|
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 |     |     |     |     |     |     |     |     |

LEVEL 4

| 0 | 0 | 0 | 0 | 0 | 0 | 0 | 0 | 0 | 1 |   |   |   |   |   |   |   |   |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 |   |   |   |   |   |   |   |   |

| | | | | | | | | | | | | | |
|---|---|---|---|---|---|---|---|---|---|---|---|---|---|
| 0 | 0 | 0 | 0 | 0 | 0 | 0 | 0 | | | | | | |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | s | s |
| 0 | 0 | 0 | 0 | 0 | 0 | 0 | 0 | 0 | 0 | 0 | 0 | s | s |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | | | | | | |

LEVEL 2

FIG.69

LEVELS 1 TO 4

| 0 | 0 | 0 | 0 | 0 | 0 | 0 | 0 |   |   |   |   |   |   |
|---|---|---|---|---|---|---|---|---|---|---|---|---|---|
| 0 | 1 | 1 | 1 | 1 | 1 | 2 | 0 | 0 | 0 | 0 | 0 | 0 | 0 |
| 0 | 1 | 1 | 1 | 1 | 2 | 1 | 0 | 0 | 0 | 0 | 0 | 0 | 0 |
| 0 | 1 | 1 | 1 | 2 | 1 | 1 | 0 | 0 | 0 | 0 | 0 | 0 | 0 |
| 0 | 1 | 1 | 2 | 1 | 1 | 1 | 0 | 0 | 0 | 0 | 0 | 0 | 0 |
| 0 | 1 | 2 | 1 | 1 | 1 | 1 | 0 | 0 | 0 | 0 | 0 | 0 | 0 |
| 0 | 2 | 1 | 1 | 1 | 1 | 1 | 0 | 0 | 0 | 0 | 0 | 0 | 0 |
| 0 | 0 | 0 | 0 | 0 | 0 | 0 | 0 |   |   |   |   |   |   |

FIG.70

LEVEL 5

| 0 | 0 | 0 | 0 | 0 | 0 | 0 | 1 |   |   |   |   |   |   |
|---|---|---|---|---|---|---|---|---|---|---|---|---|---|
| 0 | 1 | 1 | 1 | 1 | 1 | 2 | 0 | 0 | 0 | 0 | 0 | 0 | 0 |
| 0 | 1 | 1 | 1 | 1 | 2 | 1 | 0 | 0 | 0 | 0 | 0 | 0 | 0 |
| 0 | 1 | 1 | 1 | 2 | 1 | 1 | 0 | 0 | 0 | 0 | 0 | 0 | 0 |
| 0 | 1 | 1 | 2 | 1 | 1 | 1 | 0 | 0 | 0 | 0 | 0 | 0 | 0 |
| 0 | 1 | 2 | 1 | 1 | 1 | 1 | 0 | 0 | 0 | 0 | 0 | 0 | 0 |
| 0 | 2 | 1 | 1 | 1 | 1 | 1 | 0 | 0 | 0 | 0 | 0 | 0 | 0 |
| 0 | 0 | 0 | 0 | 0 | 0 | 0 | 0 |   |   |   |   |   |   |

DIGITAL FILTER, AND IMAGE GENERATING, SUPERHYBRID IMAGE GENERATING, ELECTRONIC MEDIUM MANUFACTURING, AND LETTER-ROW TILT ILLUSION GENERATING APPARATUS, METHOD AND PROGRAM

CROSS REFERENCE TO RELATED APPLICATIONS

This patent application is a continuation under 35 U.S.C. §111(a) of International Patent Application No. PCT/JP2012/084256 filed on Dec. 21, 2012, and designating the U.S. among other countries, which claims the benefit of foreign priority to Japanese Patent Application No. JP 2012-043750 filed on Feb. 29, 2012, the disclosures of all of which are hereby incorporated by reference in their entireties. The International Application was published in Japanese on Sep. 6, 2013, as International Publication No. WO 2013/128781 A1 under PCT Article 21(2).

FIELD

The present invention relates to [I] a digital filter for image processing, an image generating apparatus, a superhybrid image generating apparatus, an image generating method, a digital filter creating method, a superhybrid image generating method, a printing medium manufacturing method, an electronic medium manufacturing method, and a program, and [II] a letter-row tilt illusion generating apparatus, a letter-row tilt illusion generating method, a printing medium manufacturing method, an electronic medium manufacturing method, and a program.

BACKGROUND

[I] Digital filters can broadly be classified into finite impulse response (FIR) filters that have a finite impulse response and infinite impulse response (IIR) filters that have an infinitely continuing impulse response. Examples of the IIR filters include, but are not limited to, filters created by simply dividing a frequency range into 1 and 0, Butterworth filters, Gaussian filters using Gaussian functions, and Gabor filters (see Non Patent Literature 4).

The FIR filters have more advantages than the IIR filters in various respects, such as a perfect reconstruction property, fewer errors, and structural stability. In order to design the FIR filters, a certain kind of truncation has often conventionally been performed by applying, for example, a window function technique or a frequency sampling technique to infinitely continuing functions.

There is a technique of using an FIR wavelet as an FIR filter created without performing the truncation. For example, Non Patent Literature 5 discloses that image processing is performed to extract high-frequency components from an original image by summing all subband signals in detail parts up to a certain level, using a wavelet.

[II] It is conventionally reported that an illusion occurs in a certain character string in which the character string appears tilted in a direction different from a character array direction (hereinafter called "letter-row tilt illusion").

Causes of the occurrence of the letter-row tilt illusion are analyzed using, for example, a wavelet analysis in Non Patent Literature 1 and 2, and using a psychological approach in Non Patent Literature 3. In Patent Literature 1, a technology has been developed to edit fonts so that the letter-row tilt illusion does not occur.

CITATION LIST

Patent Literature

Patent Literature 1: Japanese Patent Application Laid-open No. 2009-251711.

Non Patent Literature

Non Patent Literature 1: Hitoshi Arai and Shinobu Arai, "Analysis of Letter-Row tilt Illusion 1: Analysis of 'Ko-Ni-A-Ga' using wavelets", Visual Mathematics e Laboratory Report No. 1, 2005.
Non Patent Literature 2: Hitoshi Arai and Shinobu Arai, "Analysis of Letter-Row Tilt illusion 2: Creation of Letter-Row Tilt Illusion using wavelet analysis", Visual Mathematics e Laboratory Report No. 2, 2005.
Non Patent Literature 3: Misa Kohara, "Role of horizontal components in illusion in which character string appears tilted", Ritsumeikan University Student Paper, 12, 2006, pp. 83-103.
Non Patent Literature 4: Rafael C. Gonzalez and Richard E. Woods, Digital Image Processing, Third Edition, Prentice Hall, 2008.
Non Patent Literature 5: Alasdair McAndrew, "Introduction to Digital Image Processing with MatLab", Course Technology, 2004.
Non Patent Literature 6: Hitoshi Arai and Shinobu Arai, "2D tight framelets with orientation selectivity suggested by vision science", JSIAM Letters Vol. 1 (2009), pp. 9-12.
Non Patent Literature 7: Hitoshi Arai and Shinobu Arai, "Finite discrete, shift-invariant, directional filterbanks for visual information processing, I: Construction", Interdisciplinary Information Sciences, Vol. 13 (2007), pp. 255-273.

SUMMARY

Technical Problem

[I] However, conventional methods for creating a FIR filter that perform truncation need an operation, such as windowing, to reduce ripples that occur due to the truncation. Besides, conventional FIR wavelets are greatly limited in frequency band and orientation selectivity, which is a problem in that FIR filters having a variety of frequency characteristics and orientations cannot be designed.

The Gaussian filters and the Gabor filters are each created from a differentiable function having no compact support, such as a Gaussian function or a Gabor function in a two-dimensional Euclidean space. Conventional methods for designing such a filter have a problem that the filter cannot always be obtained as a differentiable function in a two-dimensional Euclidean space. The conventional designing methods have great limitations, and have a problem that it is difficult to obtain a FIR filter using a differentiable function that has a compact support in a two-dimensional Euclidean space (in other words, that always has a value of 0 outside a bounded domain).

The present invention is achieved in view of the above problems and an object of the present invention is to provide a digital filter for image processing, a digital filter creating method, and a program that are capable of obtaining FIR filters having a variety of frequency characteristics and orientations as a differentiable function having a compact support without involving truncation, and to provide an image generating apparatus, a superhybrid image generating apparatus, an image generating method, a superhybrid image generating method, a printing medium manufacturing method, an electronic medium manufacturing method, and a program that use the FIR filter as an example.

[II] However, character strings that cause letter-row tilt illusions are conventionally discovered by accident or empirically created by illusion researchers or designers, which is a problem in that there is no method of automatically generating such character strings.

The present invention is achieved in view of the above problem and an object of the present invention is to provide a letter-row tilt illusion generating apparatus, a letter-row tilt illusion generating method, a printing medium manufacturing method, an electronic medium manufacturing method, and a program that are capable of automatically creating a character string that causes a letter-row tilt illusion from any character set.

Solution to Problem

[I] It is an object of the present invention to at least partially solve the problems in the conventional technology. According to an aspect of the present invention, a digital filter for image processing includes: a decomposing unit that obtains subband signals by performing multiresolution decomposition on image data by using a broad-sense pinwheel framelet that is a set of an approximate filter with no orientation and a plurality of detail filters with respective orientations, and that has a degree; and a reconstructing unit that obtains reconstructed image data by reconstructing an image by summing the subband signals obtained by the decomposing unit, and the reconstructing unit generates the reconstructed image data by attenuating or amplifying a subband signal corresponding to at least one of filters that have predetermined frequency characteristics and/or a predetermined orientation among the filters.

According to another aspect of the present invention, in the digital filter for image processing, the predetermined frequency characteristics are specified by a position in a predetermined filter arrangement based on an orientation at each level of the broad-sense pinwheel framelet and/or by a level in the multiresolution decomposition.

According to still another aspect of the present invention, in the digital filter for image processing, the reconstructing unit attenuates or amplifies the corresponding subband signal by weighting and summing the subband signals obtained by the decomposing unit.

According to still another aspect of the present invention, in the digital filter for image processing, the reconstructing unit attenuates or amplifies the corresponding subband signal by weighting the filters in a decomposition phase and/or a synthesis phase of the broad-sense pinwheel framelet.

According to still another aspect of the present invention, in the digital filter for image processing, the reconstructing unit obtains the reconstructed image data by weighting frequency response functions for the respective filters of the broad-sense pinwheel framelet, multiplying and adding the results with a predetermined method to derive filter coefficients therefrom, and filtering the image data with the filters constituted by the filter coefficients.

According to still another aspect of the present invention, in the digital filter for image processing, the decomposing unit and the reconstructing unit obtain the reconstructed image data by using a unit impulse response that has been obtained in advance in response to a unit impulse signal for the same number of pixels as that of the image data, and obtaining a cyclic convolution product using the unit impulse response for the image data.

According to still another aspect of the present invention, in the digital filter for image processing, the reconstructing unit relatively attenuates a subband signal corresponding to the approximate filter at a predetermined level in the multiresolution decomposition.

According to still another aspect of the present invention, in the digital filter for image processing, the reconstructing unit relatively amplifies a subband signal corresponding to a detail filter among the filters that is on a high-frequency side at a predetermined level, and relatively attenuates a subband signal corresponding to a filter among the filters that is on a low-frequency side at the predetermined level.

According to still another aspect of the present invention, in the digital filter for image processing, the reconstructing unit relatively attenuates a subband signal corresponding to a detail filter among the filters that is on a high-frequency side at a predetermined level, and relatively amplifies a subband signal corresponding to a filter among the filters that is on a low-frequency side at the predetermined level.

According to still another aspect of the present invention, in the digital filter for image processing, the reconstructing unit relatively attenuates subband signals corresponding to filters that are on a low-frequency side and a high-frequency side among the filters, and relatively amplifies a subband signal corresponding to a filter among the filters that is in a medium-frequency band including on a relatively low-frequency side and on a relatively high-frequency side.

According to still another aspect of the present invention, in the digital filter for image processing, the reconstructing unit attenuates a subband signal corresponding to at least one of detail filters that have an orientation orthogonal or oblique to a floating direction among the detail filters.

According to still another aspect of the present invention, in the digital filter for image processing, the reconstructing unit attenuates a subband signal corresponding to at least one of detail filters belonging to one group among two groups of a group composed of detail filters with an orientation that is neither horizontal nor vertical to an orthogonal axis of a floating direction and is at a negative angle relative to the orthogonal axis and a group composed of detail filters with an orientation that is neither horizontal nor vertical to the orthogonal axis of the floating direction and is at a positive angle relative to the orthogonal axis, and detail filters with an orientation orthogonal to the floating direction, among the detail filters.

According to still another aspect of the present invention, in the digital filter for image processing, the decomposing unit performs the multiresolution decomposition on two types of image data by using the broad-sense pinwheel framelet; and the reconstructing unit further comprises a hybrid generating unit that generates hybrid image data by generating respective pieces of reconstructed image data by relatively amplifying a subband signal corresponding to at least one of detail filters that have high-frequency-side frequency characteristics for one of the two types of image data, and relatively amplifying a subband signal corresponding to at least one of the filters that have low-frequency-side frequency characteristics for the other of the two types of image data, and by superimposing the respective pieces of reconstructed image data obtained for the two types of image data.

According to still another aspect of the present invention, in the digital filter for image processing, the digital filter is a unit impulse response to a unit impulse signal that is obtained, when an image is reconstructed by summing subband signals obtained by performing multiresolution decomposition on the unit impulse signal for the same number of pixels as that of image data by using a broad-sense pinwheel framelet that is a set of an approximate filter with no orientation and a plurality of detail filters with respective orientations, and that has a degree, by attenuating or amplifying a subband signal corresponding to at least one of filters that have predetermined frequency characteristics and/or a predetermined orientation among the filters.

According to still another aspect of the present invention, a digital filter for image processing is created by calculating filter coefficients thereof by weighting, with predetermined weights, frequency response functions for respective filters of a broad-sense pinwheel framelet that is a set of an approximate filter with no orientation and a plurality of detail filters with respective orientations, and that has a degree, and multiplying and adding the results with a predetermined method, wherein the predetermined weights are weights each of which attenuates or amplifies a subband signal corresponding to at least one of filters that have predetermined frequency characteristics and/or a predetermined orientation among the filters.

According to still another aspect of the present invention, an image generating apparatus includes the digital filter for image processing.

According to still another aspect of the present invention, an image generating method uses the digital filter for image processing.

According to still another aspect of the present invention, a superhybrid image generating apparatus includes at least a control unit, and the control unit includes: a decomposing unit that obtains subband signals by performing multiresolution decomposition on three types of image data by using a wavelet frame with orientation selectivity or a filterbank with orientation selectivity that is a set of an approximate filter with no orientation and a plurality of detail filters with respective orientations; a reconstructing unit that obtains, when reconstructing an image by summing the subband signals obtained by the decomposing unit, reconstructed image data by attenuating or amplifying a subband signal corresponding to at least one of filters that have predetermined frequency characteristics among the filters; and a superhybrid generating unit that generates superhybrid image data by superimposing the reconstructed image data obtained for the three types of image data; and the reconstructing unit generates the respective pieces of reconstructed image data by relatively amplifying a subband signal corresponding to at least one of detail filters that have high-frequency-side frequency characteristics for first image data of the three types of image data, relatively amplifying a subband signal corresponding to at least one of detail filters that have medium-frequency-side frequency characteristics for second image data of the three types of image data, and relatively amplifying a subband signal corresponding to at least one of filters that have low-frequency-side frequency characteristics for third image data of the three types of image data.

According to still another aspect of the present invention, in the superhybrid image generating apparatus, the reconstructing unit generates the respective pieces of reconstructed image data by relatively amplifying a subband signal corresponding to at least one of filters that have frequency characteristics on a still lower frequency side for the first image data and/or the second image data.

According to still another aspect of the present invention, in the superhybrid image generating apparatus, the predetermined frequency characteristics: are specified by a position in a predetermined filter arrangement based on an orientation at each level of a broad-sense pinwheel framelet and/or a level in the multiresolution decomposition; include characteristics on a side farther from the approximate filter in the arrangement and/or at a lower level as the frequency characteristics are on the higher frequency side; and include characteristics on a side nearer to the approximate filter in the arrangement and/or at a higher level as the frequency characteristics are on the lower frequency side.

According to still another aspect of the present invention, a digital filter creating method is performed by a computer including at least a control unit, and the digital filter creating method includes: a decomposing step of obtaining subband signals by performing multiresolution decomposition on a unit impulse signal for the same number of pixels as that of image data by using a broad-sense pinwheel framelet that is a set of an approximate filter with no orientation and a plurality of detail filters with respective orientations, and that has a degree; and a reconstructing step of creating, as a digital filter for image processing, a unit impulse response to a unit impulse signal that is obtained, when an image is reconstructed by summing the subband signals obtained at the decomposing step, by attenuating or amplifying a subband signal corresponding to at least one of filters that have predetermined frequency characteristics and/or a predetermined orientation among the filters; the decomposing step and the reconstructing step being performed by the control unit.

According to still another aspect of the present invention, a digital filter creating method is performed by a computer including at least a control unit, and the digital filter creating method includes a step performed by the control unit of creating a digital filter for image processing by calculating filter coefficients thereof by weighting, with predetermined weights, frequency response functions for respective filters of a broad-sense pinwheel framelet that is a set of an approximate filter with no orientation and a plurality of detail filters with respective orientations, and that has a degree, and multiplying and adding the results with a predetermined method, wherein the predetermined weights are weights each of which attenuates or amplifies a subband signal corresponding to at least one of filters that have predetermined frequency characteristics and/or a predetermined orientation among the filters.

According to still another aspect of the present invention, a superhybrid image generating method is performed by a computer that includes at least a control unit, and the superhybrid image generating method includes: a decomposing step of obtaining subband signals by performing multiresolution decomposition on three types of image data by using a wavelet frame with orientation selectivity or a filterbank with orientation selectivity that is a set of an approximate filter with no orientation and a plurality of detail filters with respective orientations; a reconstructing step of obtaining, when reconstructing an image by summing the subband signals obtained by the decomposing step, reconstructed image data by attenuating or amplifying a subband signal corresponding to at least one of filters that have predetermined frequency characteristics among the filters; and a superhybrid generating step of generating superhybrid image data by superimposing the reconstructed image data obtained for the three types of image data; the decomposing step, the reconstructing step, and the superhybrid generating step being performed by the control unit, wherein the reconstructing step generates the respective pieces of reconstructed image data by relatively amplifying a subband signal corresponding to at least one of detail filters that have high-frequency-side frequency characteristics for first image data of the three types of image data, relatively amplifying a subband signal corresponding to at least one of detail filters that have medium-frequency-side frequency characteristics for second image data of the three types of image data, and relatively amplifying a subband signal corresponding to at least one of filters that have low-frequency-side frequency characteristics for third image data of the three types of image data.

According to still another aspect of the present invention, in the superhybrid image generating method, the reconstructing step generates the respective pieces of reconstructed image data by relatively amplifying a subband signal corresponding to at least one of filters that have frequency characteristics on a still lower frequency side for the first image data and/or the second image data.

According to still another aspect of the present invention, a printing medium manufacturing method is performed by a computer that includes at least a control unit and a printing unit, and the printing medium manufacturing method includes: a decomposing step of obtaining subband signals by performing multiresolution decomposition on three types of image data by using a wavelet frame with orientation selectivity or a filterbank with orientation selectivity that is a set of an approximate filter with no orientation and a plurality of detail filters with respective orientations; a reconstructing step of obtaining, when reconstructing an image by summing the subband signals obtained by the decomposing step, reconstructed image data by attenuating or amplifying a subband signal corresponding to at least one of filters that have predetermined frequency characteristics among the filters; a superhybrid generating step of generating superhybrid image data by superimposing the reconstructed image data obtained for the three types of image data; and an image outputting step of manufacturing a printing medium by outputting the obtained superhybrid image data to the printing unit; the decomposing step, the reconstructing step, the superhybrid generating step, and the image outputting step being performed by the control unit, wherein the reconstructing step includes generating the respective pieces of reconstructed image data by relatively amplifying a subband signal corresponding to at least one of detail filters that have high-frequency-side frequency characteristics for first image data of the three types of image data, relatively amplifying a subband signal corresponding to at least one of detail filters that have medium-frequency-side frequency characteristics for second image data of the three types of image data, and relatively amplifying a subband signal corresponding to at least one of filters that have low-frequency-side frequency characteristics for third image data of the three types of image data.

According to still another aspect of the present invention, in the printing medium manufacturing method, the reconstructing step includes generating the respective pieces of reconstructed image data by relatively amplifying a subband signal corresponding to at least one of filters that have frequency characteristics on a still lower frequency side for the first image data and/or the second image data.

According to still another aspect of the present invention, an electronic medium manufacturing method is performed by a computer including at least a control unit, and the electronic medium manufacturing method includes: a decomposing step of obtaining subband signals by performing multiresolution decomposition on three types of image data by using a wavelet frame with orientation selectivity or a filterbank with orientation selectivity that is a set of an approximate filter with no orientation and a plurality of detail filters with respective orientations; a reconstructing step of obtaining, when reconstructing an image by summing the subband signals obtained by the decomposing step, reconstructed image data by attenuating or amplifying a subband signal corresponding to at least one of filters that have predetermined frequency characteristics among the filters; a superhybrid generating step of generating superhybrid image data by superimposing the reconstructed image data obtained for the three types of image data; and an image outputting step of manufacturing an electronic medium that stores therein the obtained superhybrid image data; the decomposing step, the reconstructing step, the superhybrid generating step, and the image outputting step being performed by the control unit, and the reconstructing step generates the respective pieces of reconstructed image data by relatively amplifying a subband signal corresponding to at least one of detail filters that have high-frequency-side frequency characteristics for first image data of the three types of image data, relatively amplifying a subband signal corresponding to at least one of detail filters that have medium-frequency-side frequency characteristics for second image data of the three types of image data, and relatively amplifying a subband signal corresponding to at least one of filters that have low-frequency-side frequency characteristics for third image data of the three types of image data.

According to still another aspect of the present invention, in the electronic medium manufacturing method, the reconstructing step includes generating the respective pieces of reconstructed image data by relatively amplifying a subband signal corresponding to at least one of filters that have frequency characteristics on a still lower frequency side for the first image data and/or the second image data.

According to still another aspect of the present invention, a non-transitory computer-readable medium includes computer-readable program codes, performed by a computer, and the program codes when executed cause the computer to execute: a decomposing step of obtaining subband signals by performing multiresolution decomposition on a unit impulse signal for the same number of pixels as that of image data by using a broad-sense pinwheel framelet that is a set of an approximate filter with no orientation and a plurality of detail filters with respective orientations, and that has a degree; and a reconstructing step of creating, as a digital filter for image processing, a unit impulse response to a unit impulse signal that is obtained, when an image is reconstructed by summing the subband signals obtained at the decomposing step, by attenuating or amplifying a subband signal corresponding to at least one of filters that have predetermined frequency characteristics and/or a predetermined orientation among the filters.

According to still another aspect of the present invention, a non-transitory computer-readable medium includes computer-readable program codes, performed by a computer, and the program codes when executed cause the computer to execute a step of creating a digital filter for image processing by calculating filter coefficients thereof by weighting, with predetermined weights, frequency response functions for respective filters of a broad-sense pinwheel framelet that is a set of an approximate filter with no orientation and a plurality of detail filters with respective orientations, and that has a degree, and multiplying and adding the results with a predetermined method, and the predetermined weights are weights each of which attenuates or amplifies a subband signal corresponding to at least one of filters that have predetermined frequency characteristics and/or a predetermined orientation among the filters.

According to still another aspect of the present invention, a non-transitory computer-readable medium includes computer-readable program codes, performed by a computer, and the program codes when executed cause the computer to execute: a decomposing step of obtaining subband signals by performing multiresolution decomposition on three types of image data by using a wavelet frame with orientation selectivity or a filterbank with orientation selectivity that is a set of an approximate filter with no orientation and a plurality of detail filters with respective orientations; a reconstructing step of obtaining, when reconstructing an image by summing the subband signals obtained by the decomposing step, reconstructed image data by attenuating or amplifying a subband signal corresponding to at least one of filters that have predetermined frequency characteristics among the filters; and a superhybrid generating step of generating superhybrid image data by superimposing the reconstructed image data obtained for the three types of image data; and the reconstructing step generates the respective pieces of reconstructed image data by relatively amplifying a subband signal corresponding to at least one of detail filters that have high-frequency-side frequency characteristics for first image data of the three types of image data, relatively amplifying a subband signal corresponding to at least one of detail filters that have medium-frequency-side frequency characteristics for second image data of the three types of image data, and relatively amplifying a subband signal corresponding to at least one of filters that have low-frequency-side frequency characteristics for third image data of the three types of image data.

According to still another aspect of the present invention, in the non-transitory computer-readable medium, the reconstructing step generates the respective pieces of reconstructed image data by relatively amplifying a subband signal corresponding to at least one of filters that have frequency characteristics on a still lower frequency side for the first image data and/or the second image data.

[II] According to still another aspect of the present invention, a letter-row tilt illusion generating apparatus includes at least a storing unit and a control unit, and the storing unit includes: a character image storing unit that stores therein character images of a plurality of characters; and a test image storing unit that stores a test image obtained, assuming a line segment or a figure shaped like the line segment in a character array direction as a single character unit, by arranging one or more such line segments or figures in the character array direction; and the control unit includes: a character test image generating unit that generates a character test image by replacing the line segments or the figures, each corresponding to the single character unit in the test image, with the character images of the characters stored in the character image storing unit; an orientation difference calculating unit that uses filters with orientation selectivity near the character array direction to calculate a difference between orientation components of the character test image for the characters and the test image before the line segments or the figures are replaced with the characters, and stores the difference between the orientation components in the storing unit; and a character string creating unit that creates a character string that generates a letter-row tilt illusion by arranging, in the character array direction, characters selected from the characters based on a criterion that the difference between the orientation components is better to be smaller.

According to still another aspect of the present invention, in the letter-row tilt illusion generating apparatus: the test image storing unit stores a plurality of such test images in which positions of the line segments or the figures in the corresponding test image differ from each other in a direction vertical to the character array direction; the character test image generating unit generates the character test image by replacing the line segments or the figures, each corresponding to the single character unit at the same sequential position in the test images, with the character images of the characters; and the character string creating unit further comprises a grouping unit that groups the characters into one or more of the test images in which the difference between the orientation components calculated for each of the test images for the characters by the orientation difference calculating unit is locally minimized in the test images, and arranges the characters based on a criterion that the local minimum value of the difference between orientation components is better to be smaller.

According to still another aspect of the present invention, in the letter-row tilt illusion generating apparatus, the character string creating unit comprises a ranking unit that calculates indicator values for the characters belonging to the group based on, in addition to the criterion that the local minimum value of the difference between orientation components is better to be smaller, a criterion that the difference between the maximum value and the minimum value near the local minimum value is better to be larger, that stores the indicator values in the storing unit, and that ranks the characters using the indicator values, and arranges the characters using the criteria or, if necessary, the ranking.

According to still another aspect of the present invention, in the letter-row tilt illusion generating apparatus, the grouping unit regroups the characters that have commonly been grouped into test images in which the positions of the line segments or the figures differ from each other by a predetermined distance among the test images, and the ranking unit ranks the characters in the regrouped group and sets the regrouped characters as targets to be arranged.

According to still another aspect of the present invention, in the letter-row tilt illusion generating apparatus: the orientation difference calculating unit calculates a plurality of differences from the character test images using the filters with orientation selectivity near the character array direction; the grouping unit regroups the characters using the differences; and the ranking unit ranks the characters in the regrouped group.

According to still another aspect of the present invention, in the letter-row tilt illusion generating apparatus, the character string creating unit includes a letter-row tilt illusion evaluation value adding unit that numerically evaluates an amount of illusion of the generated letter-row tilt illusion by using the local minimum value of the difference between orientation components and the difference between the maximum value and the minimum value near the local minimum value.

According to still another aspect of the present invention, in the letter-row tilt illusion generating apparatus, the character string creating unit arranges the characters according to continuity of the test images.

According to still another aspect of the present invention: the letter-row tilt illusion generating apparatus further includes an input unit; the control unit further includes a character selecting unit that allows a user to select any number of characters among the characters via the input unit; and the character string creating unit sets the characters selected using the character selecting unit as targets to be arranged.

According to still another aspect of the present invention, in the letter-row tilt illusion generating apparatus, the filters with orientation selectivity near the character array direction are detail filters with orientations near the character string array direction among filters of a wavelet frame with orientation selectivity or a filterbank with orientation selectivity that is a set of an approximate filter with no orientation and a plurality of detail filters with respective orientations.

According to still another aspect of the present invention, in the letter-row tilt illusion generating apparatus, the orientation difference calculating unit creates character strings that generate letter-row tilt illusions having various frequency characteristics by selecting filters with appropriate frequency characteristics as the detail filters.

According to still another aspect of the present invention, a letter-row tilt illusion generating method is performed by a letter-row tilt illusion generating apparatus that includes at least a storing unit and a control unit, and the storing unit includes: a character image storing unit that stores therein character images of a plurality of characters; and a test image storing unit that stores therein a test image obtained, assuming a line segment or a figure shaped like the line segment in a character array direction as a single character unit, by arranging one or more such line segments or figures in the character array direction; and the letter-row tilt illusion generating method includes: a character test image generating step of generating a character test image by replacing the line segments or the figures, each corresponding to the single character unit in the test image, with the character images of the characters stored in the character image storing unit; an orientation difference calculating step of using filters with orientation selectivity near the character array direction to calculate a difference between orientation components of the character test image for the characters and the test image before the line segments or the figures are replaced with the characters, and storing the difference between the orientation components in the storing unit; and a character string creating step of creating a character string that generates a letter-row tilt illusion by arranging, in the character array direction, characters selected from the characters based on a criterion that the difference between the orientation components is better to be smaller; the character test image generating step, the orientation difference calculating step, and the character string creating step being performed by the control unit.

According to still another aspect of the present invention, a printing medium manufacturing method is performed by a letter-row tilt illusion generating apparatus that includes at least a storing unit, a control unit, and a printing unit, and the storing unit includes: a character image storing unit that stores therein character images of a plurality of characters; and a test image storing unit that stores a test image obtained, assuming a line segment or a figure shaped like the line segment in a character array direction as a single character unit, by arranging one or more such line segments or figures in the character array direction; and the printing medium manufacturing method includes: a character test image generating step of generating a character test image by replacing the line segments or the figures, each corresponding to the single character unit in the test image, with the character images of the characters stored in the character image storing unit; an orientation difference calculating step of using filters with orientation selectivity near the character array direction to calculate a difference between orientation components of the character test image for the characters and the test image before the line segments or the figures are replaced with the characters, and storing the difference between the orientation components in the storing unit; a character string creating step of creating a character string that generates a letter-row tilt illusion by arranging, in the character array direction, characters selected from the characters based on a criterion that the difference between the orientation components is better to be smaller; and a character string outputting step of controlling the printing unit to manufacture a printing medium with the character string created at the character string creating step printed thereon; the character test image generating step, the orientation difference calculating step, the character string creating step, and the character string outputting step being performed by the control unit.

According to still another aspect of the present invention, an electronic medium manufacturing method is performed by a letter-row tilt illusion generating apparatus that includes at least a storing unit and a control unit, and the storing unit includes: a character image storing unit that stores therein character images of a plurality of characters; and a test image storing unit that stores therein a test image obtained, assuming a line segment or a figure shaped like the line segment in a character array direction as a single character unit, by arranging one or more such line segments or figures in the character array direction; and the electronic medium manufacturing method includes: a character test image generating step of generating a character test image by replacing the line segments or the figures, each corresponding to the single character unit in the test image, with the character images of the characters stored in the character image storing unit; an orientation difference calculating step of using filters with orientation selectivity near the character array direction to calculate a difference between orientation components of the character test image for the characters and the test image before the line segments or the figures are replaced with the characters, and storing the difference between the orientation components in the storing unit; a character string creating step of creating a character string that generates a letter-row tilt illusion by arranging, in the character array direction, characters selected from the characters based on a criterion that the difference between the orientation components is better to be smaller; and a character string outputting step of manufacturing an electronic medium that stores therein the character string created at the character string creating step; the character test image generating step, the orientation difference calculating step, the character string creating step, and the character string outputting step being performed by the control unit.

According to still another aspect of the present invention, a non-transitory computer-readable medium includes computer-readable program codes, performed by a letter-row tilt illusion generating apparatus that includes at least a storing unit and a control unit, and the storing unit includes: a character image storing unit that stores therein character images of a plurality of characters; and a test image storing unit that stores therein a test image obtained, assuming a line segment or a figure shaped like the line segment in a character array direction as a single character unit, by arranging one or more such line segments or figures in the character array direction; and the program codes when executed cause the control unit to execute: a character test image generating step of generating a character test image by replacing the line segments or the figures, each corresponding to the single character unit in the test image, with the character images of the characters stored in the character image storing unit; an orientation difference calculating step of using filters with orientation selectivity near the character array direction to calculate a difference between orientation components of the character test image for the characters and the test image before the line segments or the figures are replaced with the characters, and storing the difference between the orientation components in the storing unit; and a character string creating step of creating a character string that generates a letter-row tilt illusion by arranging, in the character array direction, characters selected from the characters based on a criterion that the difference between the orientation components is better to be smaller.

Moreover, the present invention is related to a recording medium, in which the above-described program is recorded.

Advantageous Effects of Invention

[I] According to the present invention, the digital filter for image processing performs multiresolution decomposition on image data by using a broad-sense pinwheel framelet that is a set of an approximate filter with no orientation and a plurality of detail filters with respective orientations, and that has a degree, and when obtaining reconstructed image data by reconstructing an image by obtaining subband signals and summing the obtained subband signals, attenuates or amplifies a subband signal corresponding to at least one of filters that have predetermined frequency characteristics and/or a predetermined orientation among the filters, and thereby generates the reconstructed image data. Hence, the present invention brings about an effect that a digital filter for image processing can be provided that can be implemented as FIR filters having a variety of frequency characteristics and orientations as a differentiable function having a compact support without involving truncation. This can provide filters having predetermined frequency characteristics and/or predetermined orientations with a differentiable function that generates very few ripples and always has a value of zero outside a bounded domain. Because the broad-sense pinwheel framelet has a degree, a number of types of filters (such as high-pass filters) can be created, and filters can be selected according to frequency components desired to be obtained.

In the above description, according to the present invention, the predetermined frequency characteristics are specified by a position in a predetermined filter arrangement based on an orientation at each level of the broad-sense pinwheel framelet and/or by a level in the multiresolution decomposition. This brings about an effect that a variety of frequency characteristics can be specified.

Moreover, in the above description, the present invention attenuates or amplifies the corresponding subband signal by weighting and summing the obtained subband signals. This brings about an effect that filters can be obtained that have a variety of frequency characteristics and orientations by weighting outputs of the filters having predetermined frequency characteristics and/or predetermined orientations in the broad-sense pinwheel framelet.

Moreover, in the above description, the present invention weights the filters in the decomposition phase and/or the synthesis phase of the broad-sense pinwheel framelet. This brings about the effect that filters can be obtained that have a variety of frequency characteristics and orientations.

Moreover, in the above description, the present invention obtains the reconstructed image data by weighting frequency response functions for the respective filters of the broad-sense pinwheel framelet, and multiplying and adding the results with a predetermined method to derive filter coefficients therefrom, and filtering the image data with the filters constituted by the filter coefficients. This brings about an effect that the output by the filtering can be quickly calculated.

Moreover, in the above description, the present invention obtains the reconstructed image data by using a unit impulse response that has been obtained in advance in response to a unit impulse signal for the same number of pixels as that of the image data, and obtaining a cyclic convolution product using the unit impulse response for the image data. This brings about an effect that the output by the filtering can be quickly calculated by using the unit impulse response prepared in advance.

Moreover, in the above description, the present invention relatively attenuates a subband signal corresponding to the approximate filter at a predetermined level in the multiresolution decomposition. This can provide high-pass filters capable of enhancing high-frequency components in an original image by using the multiresolution decomposition.

Moreover, in the above description, the present invention relatively amplifies a subband signal corresponding to a detail filter among the filters that is on the high-frequency side at a predetermined level, and relatively attenuates a subband signal corresponding to a filter among the filters that is on the low-frequency side at the predetermined level. This brings about an effect that a variety of high-pass filters can be obtained that are capable of enhancing high-frequency components in an original image by using the broad-sense pinwheel framelet. This also brings about an effect that the image can be sharpened by performing image processing using such high-pass filters.

Moreover, in the above description, the present invention relatively attenuates a subband signal corresponding to a detail filter among the filters that is on the high-frequency side at a predetermined level, and relatively amplifies a subband signal corresponding to a filter among the filters that is on the low-frequency side at the predetermined level. This can provide low-pass filters capable of enhancing low-frequency components in an original image by using the multiresolution decomposition.

Moreover, in the above description, the present invention relatively attenuates subband signals corresponding to filters that are on the low-frequency side and the high-frequency side among the filters, and relatively amplifies a subband signal corresponding to a filter among the filters that is in a medium-frequency band, such as on a relatively low-frequency side or on a relatively high-frequency side. This can provide band-pass filters capable of enhancing band components in an original image by using the multiresolution decomposition.

Moreover, in the above description, the present invention attenuates a subband signal corresponding to at least one of detail filters that have an orientation orthogonal or oblique to a floating direction among the detail filters. This brings about an effect that a reconstructed image can be created that generates a floating illusion.

Moreover, in the above description, the present invention attenuates a subband signal corresponding to at least one of detail filters belonging to one group among two groups of a group composed of detail filters with an orientation that is neither horizontal nor vertical to an orthogonal axis of the floating direction and is at a negative angle relative to the orthogonal axis and a group composed of detail filters with an orientation that is neither horizontal nor vertical to the orthogonal axis of the floating direction and is at a positive angle relative to the orthogonal axis, and detail filters with an orientation orthogonal to the floating direction, among the detail filters. This brings about the effect that a reconstructed image can be created that generates a floating illusion.

Moreover, in the above description, the present invention performs the multiresolution decomposition on two types of image data by using the broad-sense pinwheel framelet, and when performing the reconstruction, generates respective pieces of reconstructed image data by relatively amplifying a subband signal corresponding to at least one of detail filters having high-frequency-side frequency characteristics for one of the two types of image data, and relatively amplifying a subband signal corresponding to at least one of the filters having low-frequency-side frequency characteristics for the other of the two types of image data. The present invention then generates the hybrid image data by superimposing the respective pieces of reconstructed image data obtained for the two types of image data. This brings about an effect that the hybrid image data can be created that provides two types of appearances depending on the distance.

Moreover, according to the present invention, the digital filter for image processing is a unit impulse response to a unit impulse signal that is obtained, when an image is reconstructed by summing subband signals obtained by performing multiresolution decomposition on the unit impulse signal for the same number of pixels as that of image data by using a broad-sense pinwheel framelet that is a set of an approximate filter with no orientation and a plurality of detail filters with respective orientations, and that has a degree, by attenuating or amplifying a subband signal corresponding to at least one of filters that have predetermined frequency characteristics and/or a predetermined orientation among the filters. This brings about an effect that a digital filter for image processing can be provided that can be implemented as FIR filters having a variety of frequency characteristics and orientations as a differentiable function having a compact support without involving truncation, and that can quickly calculate the filter output.

Moreover, according to the present invention, the digital filter for image processing is created by calculating filter coefficients thereof by weighting, with predetermined weights, frequency response functions for respective filters of a broad-sense pinwheel framelet that is a set of an approximate filter with no orientation and a plurality of detail filters with respective orientations, and that has a degree, and multiplying and adding the results with a predetermined method. In the digital filter for image processing, the predetermined weights are weights each of which attenuates or amplifies a subband signal corresponding to at least one of filters that have predetermined frequency characteristics and/or a predetermined orientation among the filters. This brings about an effect that a digital filter can be obtained in which outputs of the filters having predetermined frequency characteristics and/or predetermined orientations in the broad-sense pinwheel framelet are weighted by the weighted frequency response functions, and a digital filter for image processing can be provided that can quickly calculate the filter output.

Moreover, the image generating apparatus including the digital filter for image processing according to the present invention brings about an effect that image processing can be performed with respect to a variety of frequency characteristics and orientations by using the filters bringing about the effects described above.

Moreover, the image generating method including the digital filter for image processing according to the present invention brings about the effect that image processing can be performed with respect to a variety of frequency characteristics and orientations by using the filters bringing about the effects described above.

Moreover, the present invention obtains respective subband signals by performing multiresolution decomposition on three types of image data by using a wavelet frame with orientation selectivity or a filterbank with orientation selectivity that is a set of an approximate filter with no orientation and a plurality of detail filters with respective orientations; and when the present invention obtains, when reconstructing an image by summing the subband signals obtained, the reconstructed image data by attenuating or amplifying a subband signal corresponding to at least one of filters that have predetermined frequency characteristics among the filters, the present invention generates the respective pieces of reconstructed image data by relatively amplifying a subband signal corresponding to at least one of detail filters having high-frequency-side frequency characteristics for first image data of the three types of image data, relatively amplifying a subband signal corresponding to at least one of detail filters having medium-frequency-side frequency characteristics for second image data of the three types of image data, and relatively amplifying a subband signal corresponding to at least one of filters having low-frequency-side frequency characteristics for third image data of the three types of image data, and generates superhybrid image data by superimposing the reconstructed image data obtained for the three types of image data. This brings about an effect that the superhybrid image data can be created that provides three types of appearances depending on the distance.

Moreover, when obtaining the reconstructed data in the above description, the present invention relatively amplifies a subband signal corresponding to at least one of filters that have frequency characteristics on the still lower frequency side for the first image data and/or the second image data. This brings about an effect that the first and the second images can be easily viewed without hindering the view of the third image in the superimposed image.

Moreover, in the above description, according to the present invention, the predetermined frequency characteristics are specified by a position in a predetermined filter arrangement based on an orientation at each level of a broad-sense pinwheel framelet and/or a level in the multiresolution decomposition, include characteristics on the side farther from the approximate filter in the filter arrangement and/or at a lower level as the frequency characteristics are on the higher frequency side, and include characteristics on the side nearer to the approximate filter in the filter arrangement and/or at a higher level as the frequency characteristics are on the lower frequency side. This brings about an effect that the superhybrid image can be generated by using the level in the multiresolution decomposition and/or the filter arrangement in the broad-sense pinwheel framelet.

[II] According to this invention, character images of a plurality of characters are stored; assuming a line segment or a figure shaped like the line segment in a character array direction as a single character unit, a test image is obtained by arranging one or more such line segments or figures in the character array direction and is stored; a character test image is generated by replacing the line segments or the figures, each corresponding to the single character unit in the test image, with the character images of the characters stored in the character image storing unit; filters with orientation selectivity near the character array direction are used to calculate a difference between orientation components of the character test image for the characters and the test image before the line segments or the figures are replaced with the characters, and the difference between the orientation components is stored; and a character string that generates a letter-row tilt illusion is created by arranging, in the character array direction, characters selected from the characters based on a criterion that the difference between the orientation components is better to be smaller. This brings about an effect that a character string that causes a letter-row tilt illusion can be automatically created from any character set. More specifically, by taking advantage of an orientation component inherent in each character, the present invention can automatically generate a letter-row tilt illusion by generating a character string with an orientation component in the character array direction similar to an orientation component of a figure that causes a viewer to perceive a tilt angle different from the character array direction.

Moreover, according to the present invention, a plurality of such test images are stored in which positions of the line segments or the figures in the corresponding test image differ from each other in the direction vertical to the character array direction; the character test images are generated by replacing the line segments or the figures, each corresponding to the single character unit at the same sequential position in the test images, with the character images of the characters; the characters are grouped into one or more of the test images in which the difference between the orientation components calculated for each of the test images for the characters is locally minimized in the test images; and the characters are arranged based on a criterion that the local minimum value of the difference between orientation components is better to be smaller. This brings about an effect that many character strings that cause letter-row tilt illusions can be efficiently created by grouping any character set according to the orientation component.

Moreover, the present invention can calculate and store indicator values for the characters belonging to the group based on, in addition to the criterion that the local minimum value of the difference between orientation components is better to be smaller, a criterion that the difference between the maximum value and the minimum value near the local minimum value is better to be larger, and can rank the characters using the indicator values; the present invention arranges the characters using the criteria or, if necessary, the ranking. This brings about an effect that letter-row tilt illusions with various amounts of illusion can be created. For example, this brings about an effect that, by using the degree of smallness of the local minimum value of the difference and the degree of largeness of the difference between the maximum value and the minimum value near the local minimum value, a letter-row tilt illusion with a very large amount of illusion is generated, or a letter-row tilt illusion with a not so large amount of illusion is intentionally generated.

Moreover, the present invention regroups the characters that have commonly been grouped into test images in which the positions of the line segments or the figures differ from each other by a predetermined distance among the test images, then ranks, if necessary, the characters in the regrouped group and sets the regrouped characters as targets to be arranged. This brings about an effect that letter-row tilt illusions with various amounts of illusion that appear smoothly tilted can be created.

Moreover, the present invention calculates a plurality of differences from the character test images using the filters with orientation selectivity near the character array direction, then regroups the characters using the differences, and, if necessary, ranks the characters in the regrouped group. This brings about an effect that a character string is created in which an illusion is more visible.

Moreover, the present invention can numerically evaluate an amount of illusion of the generated letter-row tilt illusion by using the local minimum value of the difference between orientation components and the difference between the maximum value and the minimum value near the local minimum value. This brings about an effect that the amount of illusion of the generated letter-row tilt illusion can be numerically compared.

Moreover, the present invention numbers the groups in the order of position of the line segment or the figure of the corresponding test image in the direction vertical to the character array direction, and arranges the characters such that the numbers are arranged in ascending or descending order in a segmental manner or as a whole. This brings about an effect that a character string causing a letter-row tilt illusion can be automatically and efficiently created. This also brings about an effect that, in addition to creating a letter-row tilt illusion that appears tilted in one direction, it is possible to create a letter-row tilt illusion with a more complex tilt, such as a letter-row tilt illusion with an apparent tilt not necessarily constant (such as a letter-row tilt illusion of waving up and down, or right and left).

Moreover, the present invention allows a user to select any number of characters among the characters via the input unit, and sets the characters selected using the character selecting unit as targets to be arranged. This brings about an effect that the user can create a character string causing a letter-row tilt illusion from a desired character set.

Moreover, the present invention creates character strings that generate letter-row tilt illusions having various frequency characteristics by selecting filters with appropriate frequency characteristics as the detail filters. This brings about an effect that a character string can be created that generates a letter-row tilt illusion with a larger amount of illusion when viewed from a near position, an illusion with a larger amount of illusion when viewed from a distant position, or a letter-row tilt illusion that appears tilted when viewed from any position.

Moreover, according to the present invention, in the printing medium manufacturing method, character images of a plurality of characters are stored, and assuming a line segment or a figure shaped like the line segment in a character array direction as a single character unit, a test image is obtained by arranging one or more such line segments or figures in the character array direction and is stored. The printing medium manufacturing method includes generating a character test image by replacing the line segments or the figures, each corresponding to the single character unit in the test image, with the character images of the characters stored in the character image storing unit, using filters with orientation selectivity near the character array direction to calculate a difference between orientation components of the character test image for the characters and the test image before the line segments or the figures are replaced with the characters, storing the difference between the orientation components, creating a character string that generates a letter-row tilt illusion by arranging, in the character array direction, characters selected from the characters based on a criterion that the difference between the orientation components is better to be smaller, and controlling the printing unit to manufacture a printing medium with the character string created at the character string creating step printed thereon. This brings about an effect that a medium with a character string that causes a letter-row tilt illusion printed thereon can be manufactured from any character set. More specifically, the present invention can manufacture a printing medium capable of generating a letter-row tilt illusion by generating a character string with an orientation component in the character array direction similar to an orientation component of a figure that causes a viewer to perceive a tilt angle different from the character array direction by taking advantage of an orientation component inherent in each character.

Moreover, according to the present invention, in the electronic medium manufacturing method, character images of a plurality of characters are stored, and assuming a line segment or a figure shaped like the line segment in a character array direction as a single character unit, a test image is obtained by arranging one or more such line segments or figures in the character array direction and is stored. The electronic medium manufacturing method includes generating a character test image by replacing the line segments or the figures, each corresponding to the single character unit in the test image, with the character images of the characters stored in the character image storing unit, using filters with orientation selectivity near the character array direction to calculate a difference between orientation components of the character test image for the characters and the test image before the line segments or the figures are replaced with the characters, storing the difference between the orientation components, creating a character string that generates a letter-row tilt illusion by arranging, in the character array direction, characters selected from the characters based on a criterion that the difference between the orientation components is better to be smaller, and manufacturing an electronic medium that stores therein the character string created at the character string creating step. This brings about an effect that an electronic medium for a character string that causes a letter-row tilt illusion can be manufactured from any character set. More specifically, the present invention can manufacture an electronic medium capable of generating a letter-row tilt illusion by generating a character string with an orientation component in the character array direction similar to an orientation component of a figure that causes a viewer to perceive a tilt angle different from the character array direction by taking advantage of an orientation component inherent in each character.

BRIEF DESCRIPTION OF DRAWINGS

FIG. 5 is a diagram in which an approximate part is represented by $a_k$ and detail parts are represented by symbols (numbers) of $d_k(1)$ to $d_k(99)$ in the pinwheel framelet at level k of degree 7.

FIG. 6 is a diagram representing coefficients applied in association with the array of filters in FIG. 5.

FIG. 7 is a flowchart illustrating one example of basic processing performed by an image processing apparatus 400 in the embodiment.

FIG. 8 is a diagram illustrating one example of filterbanks in the decomposition phase and the synthesis phase of the maximal overlap multiresolution decomposition.

FIG. 14 is a diagram illustrating one example of another weighting method for extracting a high-frequency portion.

FIG. 15 is a diagram illustrating one example of the other weighting method for extracting the high-frequency portion.

FIG. 21 is a diagram illustrating one example of still another weighting method for extracting a high-frequency portion.

FIG. 22 is a diagram illustrating one example of the still other weighting method for extracting the high-frequency portion.

FIG. 49 is a diagram illustrating a weighting method for filters for the image 1 applied to the image 1 in an example of the embodiment.

FIG. 50 is a diagram illustrating the weighting method for the filters for the image 1 applied to the image 1 in the example of the embodiment.

FIG. 52 is a diagram illustrating a weighting method for filters for the image 2 applied to the image 2 in the example of the embodiment.

FIG. 53 is a diagram illustrating the weighting method for the filters for the image 2 applied to the image 2 in the example of the embodiment.

FIG. 69 is a diagram illustrating one example of a weighting method for creating band-pass filters with orientation selectivity that generate a floating illusion.

FIG. 70 is a diagram illustrating the example of the weighting method for creating the band-pass filters with orientation selectivity that generate the floating illusion.

FIG. 77 is a diagram illustrating filters that are obtained by calculating the cyclic correlation product of maximal overlap pinwheel framelet filters at level 2 of degree 7 and maximal overlap pinwheel framelet approximate filters at level 1 of degree 7.

FIG. 78 is a diagram illustrating one example of a font stored in a character image file 106b.

FIG. 86 is a diagram illustrating character strings created by the letter-row tilt illusion generating apparatus 100 of the embodiment.

FIG. 87 is a diagram illustrating other character strings created by the letter-row tilt illusion generating apparatus 100 of the embodiment.

FIG. 90 is a diagram illustrating one example of a letter-row tilt illusion of a character string having a meaning that is created by the letter-row tilt illusion generating apparatus 100 of the embodiment.

DESCRIPTION OF EMBODIMENTS

[I] The following describes in detail an embodiment of a digital filter for image processing, a digital filter creating method, and a program according to the present invention, and an image generating apparatus, a superhybrid image generating apparatus, an image generating method, a superhybrid image generating method, a printing medium manufacturing method, an electronic medium manufacturing method, and a program according to the present invention that use FIR filters as an example, based on the drawings. In the following embodiment, explanations will be given on examples in which the digital filter for image processing, the image generating apparatus, the image generating method, the digital filter creating method, and the program, and the superhybrid image generating apparatus, the superhybrid image generating method, the printing medium manufacturing method, the electronic medium manufacturing method, and the program are implemented in an image processing apparatus such as a computer. However, this invention is not limited to the embodiment. For example, all or a part of processing of the embodiment to be described later may be performed by a computer or a person.

[Configuration of Image Processing Apparatus]

Figure 1:
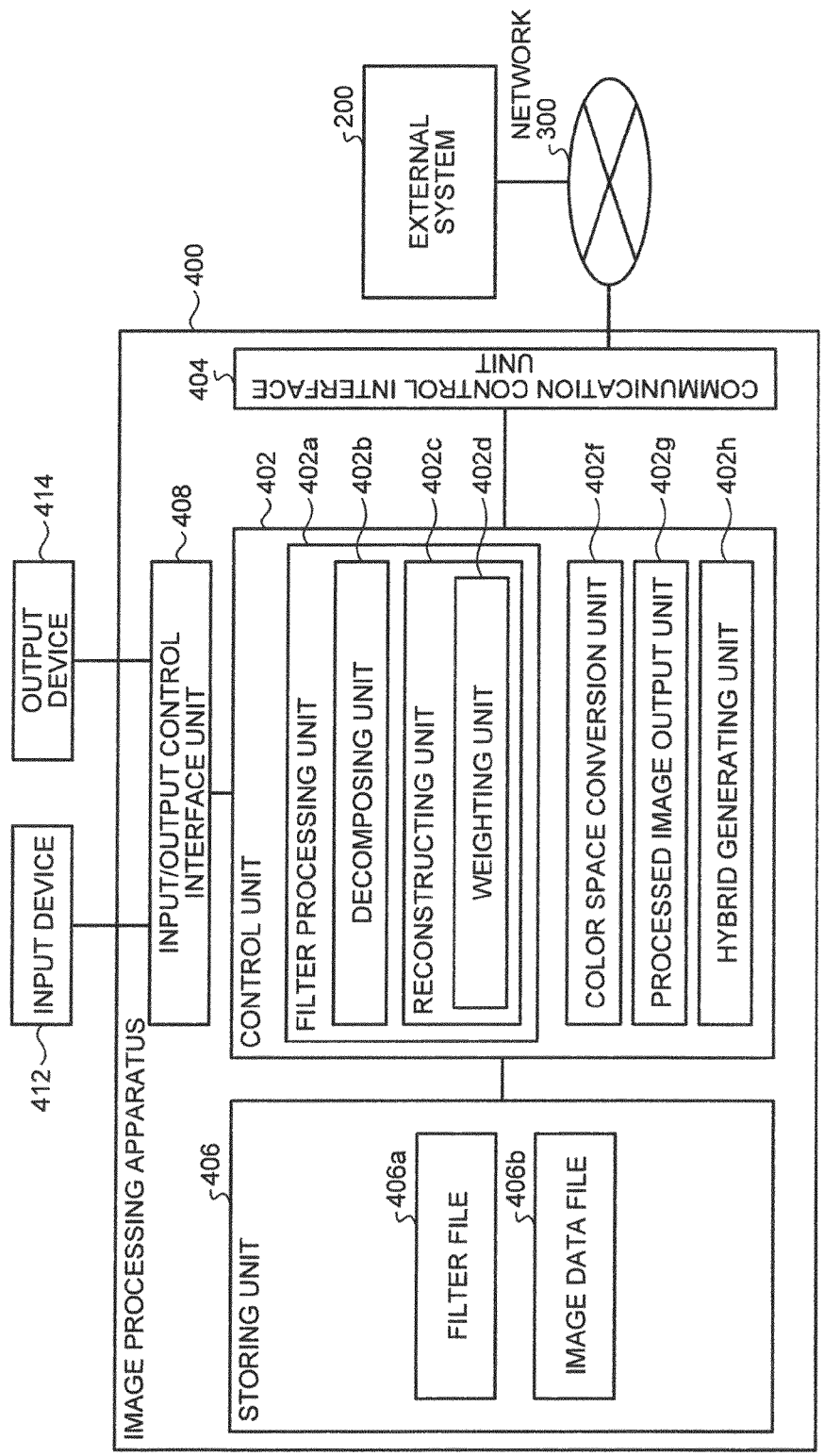
FIG. 1 is a block diagram illustrating one example of the configuration of an image processing apparatus to which an embodiment of the present invention is applied.

The configuration of the image processing apparatus will be described below with reference to FIG. 1. FIG. 1 is a block diagram illustrating an example of the configuration of the image processing apparatus to which the embodiment of the present invention is applied, and conceptually illustrates only a portion relating to the present embodiment in the configuration.

In the present embodiment, an image processing apparatus 400 has, for example, a function to obtain subband signals by performing multiresolution decomposition, for example, using a pinwheel framelet that is a set of an approximate filter with no orientation and a plurality of detail filters with respective orientations on image data, and, when obtaining reconstructed image data by reconstructing an image by summing the subband signals obtained at a decomposing step, to generate the reconstructed image data by attenuating or amplifying a subband signal corresponding to at least one of filters that have predetermined frequency characteristics and/or a predetermined orientation among the filters. A part or all of functions of the image processing apparatus 400 may serve as a digital filter. Otherwise, a storing unit 406 (to be described later) of the image processing apparatus 400 may store, for example, the function of the digital filter, and the image processing apparatus 400 may perform the filter processing.

In FIG. 1, an image processing apparatus 400 is schematically illustrated as including a control unit 402, a communication control interface unit 404, an input/output control interface unit 408, and a storing unit 406. The control unit 402 is, for example, a CPU that performs overall control of the image processing apparatus 400. The input/output control interface unit 408 is an interface connected to an input device 412 and an output device 414. The storing unit 406 is a device that stores, for example, various databases and tables. These units of the image processing apparatus 400 are communicably connected via any desired communication channel.

Various files (a filter file 406a and an image data file 406b) stored in the storing unit 406 are storage units, such as fixed disk drives. For example, the storing unit 406 stores various programs, tables, files, databases, web pages, and the like used for various processes.

Of these components of the storing unit 406, the filter file 406a is a filter storing unit that stores wavelet frames with orientation selectivity or filterbanks with orientation selectivity that are each a set of an approximate filter with no orientation and a plurality of detail filters with respective orientations. In the present embodiment, the "wavelet" is not limited to a classical wavelet, a wavelet in a narrow sense, or the like, and includes a wavelet in a broad sense. For example, the wavelet is a finite-length waveform or a wave-like oscillation with an amplitude that is amplified from 0 and quickly converges to 0, and, for example, includes pseudo wavelets, such as a Gabor filter and a curvelet.

In the present embodiment, in some cases, a pinwheel framelet (see Section [Pinwheel Framelet] to be described later) is used as a FIR filter that can be created without involving truncation, that has a variety of frequency characteristics and orientations, and that can be expressed as a differentiable function having a compact support. However, the present invention is not limited to this, but, for example, it is possible to use, for example, a simple pinwheel framelet (see Non Patent Literature 6), a framelet obtained by changing coefficients and/or exponents of terms constituting the definitional equation of the pinwheel framelet (such as an expression $F^1_{k,l}(\theta_1, \theta_2)$ or an expression $F^2_{k,l}(\theta_1, \theta_2)$ to be described in Section [Pinwheel Framelet]), or a framelet obtained by changing coefficients of terms constituting frequency response functions of filters of the simple pinwheel framelet (Non Patent Literature 6). These framelets and the (above-mentioned narrow-sense) pinwheel framelet are collectively called a broad-sense pinwheel framelet. The "broad-sense pinwheel framelet" is a filterbank that is a set of an approximate filter with no orientation and a plurality of detail filters with respective orientations, and that has a degree. In other words, a broad-sense pinwheel framelet is a two-dimensional framelet with orientation selectivity. A broad-sense pinwheel framelet has a property of being a filterbank that is capable of multiresolution decomposition, has a variety of orientation selectivity, and is constituted by finite-length filters. Using this broad-sense pinwheel framelet can create an FIR digital filter that has a variety of frequency ranges and a variety of orientation selectivity.

Figure 2:
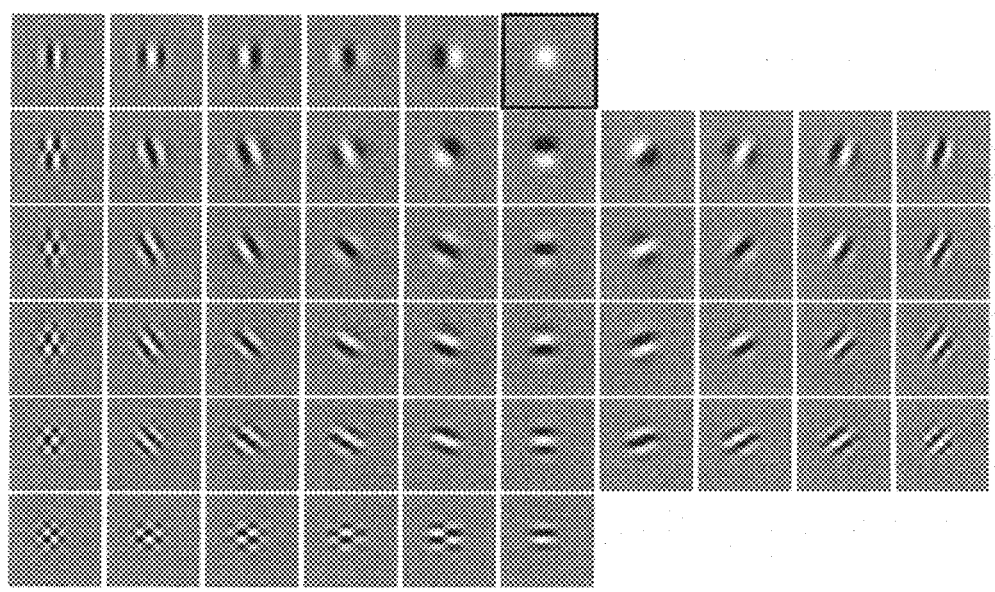
FIG. 2 is a diagram illustrating one example of filters that are obtained by calculating the cyclic correlation product of maximal overlap pinwheel framelet filters at level 3 of degree 5 and maximal overlap pinwheel framelet approximate filters at levels 1 and 2 of degree 5, and that are for actually obtaining decomposition in the decomposition phase at level 3 in maximal overlap multiresolution decomposition by the framelets.

A pinwheel framelet is, for example, a mathematical model of simple cells in the human visual cortex. This decomposition is a mathematical model of signals decomposed by simple cells in the human brain. Because a pinwheel framelet has a degree that is an odd number of three or more, and can detect more orientations as the degree is larger, a variety of filters can be created. A pinwheel framelet has a property that the number of filters increases and the calculation time also increases as the degree increases. The number of filters of a pinwheel framelet of degree n is, for example, $(n+1)^2+(n-1)^2$. Of these filters, one filter is an approximate filter and the remaining filters are detail filters. FIG. 2 illustrates filters obtained by calculating the cyclic correlation product of maximal overlap pinwheel framelet filters at level 3 of degree 5 and maximal overlap pinwheel framelet approximate filters at levels 1 and 2 of degree 5 (for example of the cyclic correlation product, see Hitoshi Arai, "Linear Algebra, Basics and Applications", Nippon Hyoron Sha Co., Ltd. (2006)). A pinwheel framelet is a model neuroscientifically closer to simple cells in V1 of the cerebral cortex than the simple pinwheel framelet.

Because the degree of this pinwheel framelet is 5, for example, as illustrated in FIG. 2, the pinwheel framelet is composed of a set of 52 filters in total, combined from 6×6 filters on the left side and 4×4 filters on the right side, for each level. Of these filters, one filter surrounded by a black rectangle in the central upper portion in FIG. 2 is a filter obtained by calculating the cyclic correlation product of the approximate filters from level 1 to level 3, and the other 51 filters are filters obtained by calculating the cyclic correlation product of the detail filters at level 3 and the approximate filters from level 1 to level 2. The orientations of the above-mentioned filters generated by the detail filters are arranged substantially in the direction in which a pinwheel rotates around the filter generated only from the approximate filters. As will be described later, maximal overlap multiresolution decomposition by using a pinwheel framelet of each degree has levels, and level 1 detects the finest portion (high-frequency portion). FIG. 2 illustrates the pinwheel framelet at level 3, and more approximate portions (lower-frequency portions) are detected as the level increases to 2, 3, . . . . The filter file 406a may store a broad-sense pinwheel framelet, such as a pinwheel framelet, in the form of a function (such as a frequency response function of framelet filters). A specific example of the function will be described later.

Various wavelets may be used in the present embodiment without being limited to the above. The wavelet is not limited to a classical wavelet, a wavelet in a narrow sense, or the like, and includes a wavelet in a broad sense. For example, the wavelet is a finite-length waveform or a wave-like oscillation with an amplitude that is amplified from 0 and quickly converges to 0, and, for example, includes pseudo wavelets, such as a Gabor filter and a curvelet. The filter file 406a may store a filter group, such as a filterbank with orientation selectivity, and filters with orientations, without being limited to a frame, such as a wavelet frame with orientation selectivity. In order to obtain FIR filters having a variety of frequency characteristics and orientations as a differentiable function having a compact support without involving truncation, the present embodiment preferably uses a broad-sense pinwheel framelet.

The filters stored in the filter file 406a are not limited to a wavelet frame with orientation selectivity itself, such as a pinwheel framelet, or a filterbank with orientation selectivity itself, but may be filters having predetermined frequency characteristics and/or predetermined orientations that are created from them. For example, a filter stored in the filter file 406a may be a unit impulse response to a unit impulse signal. Such a digital filter is a unit impulse response to a unit impulse signal that is obtained, when an image is reconstructed by summing subband signals obtained by performing multiresolution decomposition using the broad-sense pinwheel framelet on the unit impulse signal for the same number of pixels as that of the image data, by attenuating or amplifying a subband signal corresponding to at least one of filters that have predetermined frequency characteristics and/or a predetermined orientation among the filters. Such a unit impulse response is used for high-speed calculation of image data of a target original image. A high-speed calculation method will be described in detail later.

As another example, a filter stored in the filter file 406a may be a digital filter for image processing that is created by calculating filter coefficients thereof by weighting frequency response functions for respective filters of a broad-sense pinwheel framelet with predetermined weights, and multiplying and adding the results with a predetermined method.

The predetermined weights may each be a weight that attenuates or amplifies a subband signal corresponding to at least one of filters that have predetermined frequency characteristics and/or a predetermined orientation among the filters. An example of filters that have predetermined frequency characteristics and/or predetermined orientations and an example of weighting will be described later.

The image data file 406b is an image data storing unit that stores image data. The image data stored in the image data file 406b may be, for example, image data entered via the input device 412 or may be image data received from, for example, an external system 200 via a network 300. The image data may be image data for a color image or may be grayscale image data. An image (data) before being subjected to multiresolution decomposition using wavelet frames with orientation selectivity, such as a pinwheel framelet, is referred to as the original image (data), and an image (data) after being reconstructed on the basis of subband signals is referred to as the reconstructed image (data). An image that is weighted with respect to predetermined frequency characteristics and/or predetermined orientations is particularly referred to as a processed image in some cases. The image data file 406b may store, as image data, a unit impulse signal for an image size (the number of pixels) that is the same as that of the image data of the target original image. The unit impulse signal stored in the image data file 406b is supplied to the filterbank stored in the filter file 406a as image data in the same manner, and the output unit impulse response is used for high-speed calculation of the image data of the target original image as described above (the high-speed calculation method will be described in detail later).

The description returns to FIG. 1 again. The input/output control interface unit 408 controls the input device 412 and the output device 414. For example, a display device, such as a monitor (including a home television), and a printing device, such as printer, can be used as the output device 414. As the input device 412, for example, a keyboard, a mouse, and a microphone can be used in addition to, for example, an imaging device, such as a camera, and an input device connected to an external storage medium.

In FIG. 1, the control unit 402 includes an internal memory for storing a control program, such as an OS (Operating system), a program defining, for example, various processing procedures, and required data. The control unit 402 performs information processing for performing various types of processing, for example, using these programs. The control unit 402 includes a filter processing unit 402a, a color space conversion unit 402f, a processed image output unit 402g, and a hybrid generating unit 402h in the sense of a functional concept. The filter processing unit 402a further includes a decomposing unit 402b and a reconstructing unit 402c, which further includes a weighting unit 402d.

Of these units, the filter processing unit 402a is a filter processing unit that obtains subband signals by performing multiresolution decomposition using a wavelet frame with orientation selectivity or a filterbank with orientation selectivity that is a set of an approximate filter with no orientation and a plurality of detail filters with respective orientations, and reconstructs an image by summing the obtained subband signals with appropriate weights. The filter processing unit 402a may be configured as, for example, a circuit functioning as a digital filter. In the present embodiment, the filter processing unit 402a includes the decomposing unit 402b and the reconstructing unit 402c as described below.

Figure 3:
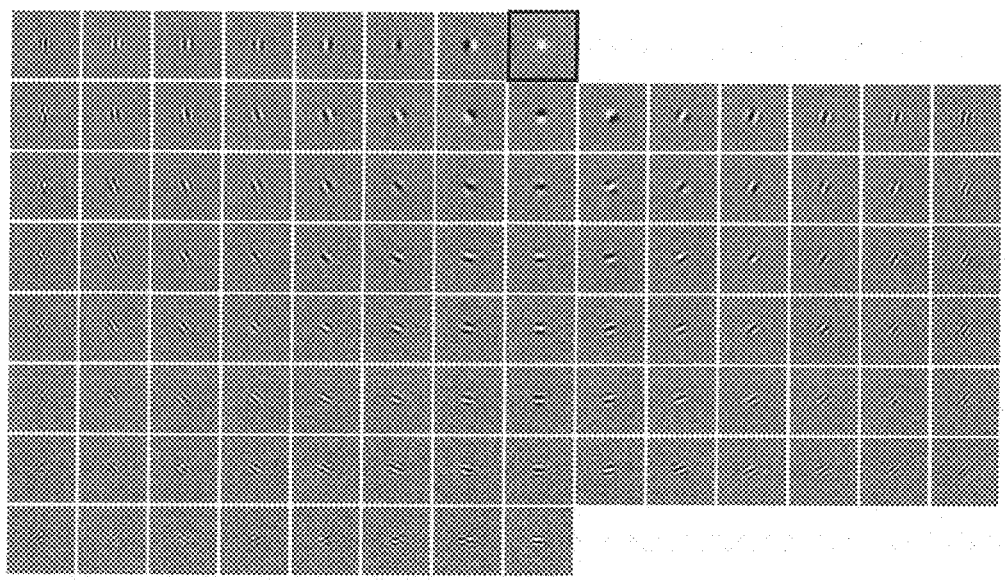
FIG. 3 is a diagram illustrating filters obtained by calculating the cyclic correlation product of maximal overlap pinwheel framelet filters at level 2 (high-frequency side) of degree 7 and a maximal overlap pinwheel framelet approximate filter at level 1 of degree 7, and is a diagram for showing the difference depending on the level.
Figure 4:
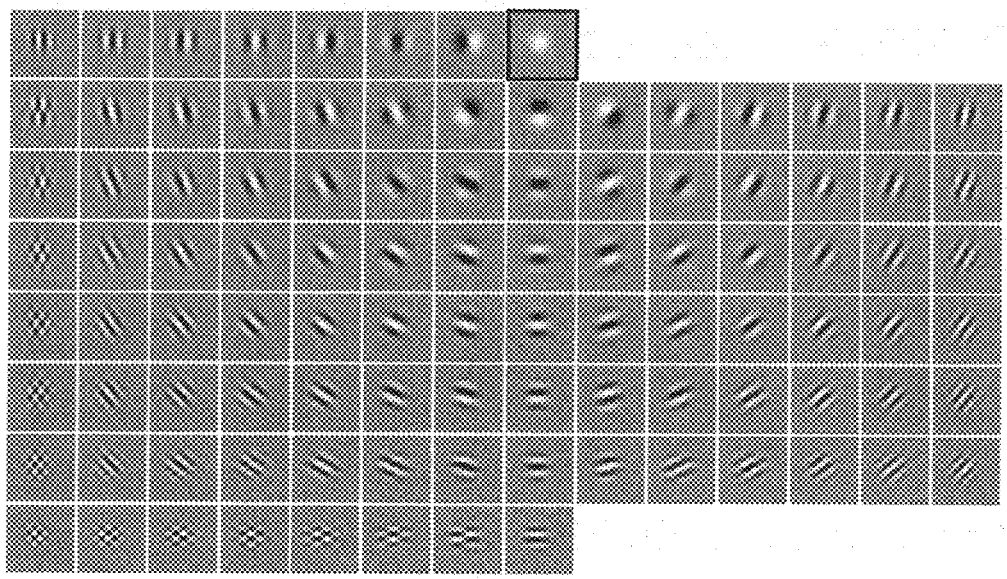
FIG. 4 is a diagram illustrating filters obtained by calculating the cyclic correlation product of maximal overlap pinwheel framelet filters at level 3 (low-frequency side) of degree 7 and maximal overlap pinwheel framelet approximate filters at levels 1 and 2 of degree 7, and is a diagram for showing the difference depending on the level.

The decomposing unit 402b is a decomposing unit that obtains subband signals by performing multiresolution decomposition on image data by using a wavelet frame with orientation selectivity, such as a pinwheel framelet, stored in the filter file 406a. The "multiresolution decomposition" includes maximal overlap multiresolution decomposition, maximally decimated multiresolution decomposition, and partially decimated and partially overlap multiresolution decomposition (for example of the maximal overlap multiresolution decomposition, see Hitoshi Arai, "Wavelet", Kyoritsu Shuppan Co., Ltd. (2010)). When the multiresolution decomposition is calculated by the decomposing unit 402b, the cyclic correlation product and a cyclic convolution product are used. However, the multiresolution decomposition may be calculated by a well-known high-speed calculation method that uses fast Fourier transformation. As described above, the multiresolution decomposition using a wavelet frame with orientation selectivity, such as a pinwheel framelet, has levels. FIGS. 3 and 4 are diagrams for showing the difference depending on the level of a pinwheel framelet. FIG. 3 illustrates filters obtained by calculating the cyclic correlation product of maximal overlap pinwheel framelet filters at level 2 (high-frequency side) and a maximal overlap pinwheel framelet approximate filter at level 1. FIG. 4 illustrates filters obtained by calculating the cyclic correlation product of maximal overlap framelet filters at level 3 (low-frequency side) and maximal overlap pinwheel framelet approximate filters at levels 1 and 2. Because the degree of both of them is 7, the number of filters is $(7+1)^2+(7-1)^2=100$.

For example, the decomposing unit 402b first detects the finest portion (high-frequency portion) by maximal overlap multiresolution decomposition using a pinwheel framelet at level 1, and detects more approximate portions (lower-frequency portions) as the level increases to 2, 3, . . . .

The multiresolution decomposition using a pinwheel framelet includes a decomposition phase and a synthesis phase. Each of the phases is composed of a filterbank composed of an array of an approximate filter and detail filters. After performing image processing in the decomposition phase and the synthesis phase, the decomposing unit 402b finally decomposes the original image data into image signals (that is, subband signals), the number of which is "the number of filters×levels".

For example, in the case of maximal overlap multiresolution decomposition of 5 levels using a pinwheel framelet of degree 7, the subband signals at a certain level k (k=1 to 5) include one approximate part obtained by one approximate filter and 99 detail parts obtained by 99 detail filters. FIG. 5 is a diagram in which the approximate part is represented by $a_k$, and the detail parts are represented by symbols (numbers) of $d_k(1)$ to $d_k(99)$ in the pinwheel framelet at level k of degree 7. The position of the symbol (number) is associated with the position of each filter in FIG. 3 (k=2) or FIG. 4 (k=3). In other words, $a_k$ and $d_k(1)$ to $d_k(99)$ represent the subband signals obtained by the filters in the corresponding positions in FIG. 3 or FIG. 4. In this manner, the multiresolution decomposition using the pinwheel framelet includes the decomposition phase and the synthesis phase. The signals amounting to "the number of filters×levels" obtained after the synthesis phase are referred to as the "subband signals".

The reconstructing unit 402c is a reconstructing unit that obtains the reconstructed image data by reconstructing an image by summing the subband signals obtained by the decomposing unit 402b. For example, the reconstructing unit 402c obtains the reconstructed image data by reconstructing an image by summing the subband signal of the approximate part obtained by the approximate filter at the maximum level described above and the subband signals of the detail parts obtained by all the detail filters. At this point, if the pinwheel framelet has a perfect reconstruction property and the weighting unit 402d to be described later does not perform any processing, the reconstructing unit 402c reproduces the same image as the original image. In other words, the reconstructing unit 402c obtains the reconstructed image data, that is, the processed image data, different from the original image by summing the subband signals after attenuating (deleting) or amplifying (enhancing) a specific subband signal through the processing performed by the weighting unit 402d.

The relation between the perfect reconstruction property and the weighting processing (image processing) will be described using the symbols (numbers) described above. The perfect reconstruction property of maximal overlap multiresolution decomposition is expressed by the following expression.

$$x = a_5 + (d_5(1) + \ldots + d_5(99)) + \ldots + (d_1(1) + \ldots + d_1(99))$$

where x is the input signal (original signal) of the original image.

Coefficients of appropriate real numbers are applied to the approximate part and the respective detail parts, and are denoted as follows: $a_{5,1}, b_{5,1}, \ldots, b_{5,99}, \ldots, b_{1,1}, \ldots, b_{1,99}$. FIG. 6 is a diagram representing the coefficients applied in association with the array of filters in FIG. 5. In this case, the reconstructed image (signal) is represented by the following expression.

$$y = a_{5,1} a_5 + (b_{5,1} d_5(1) + \ldots + b_{5,99} d_5(99)) + \ldots + (b_{1,1} d_1(1) + \ldots + b_{1,99} d_1(99))$$

At this point, if the respective coefficients satisfy $a_{5,1} = b_{5,1} = \ldots = b_{5,99} = \ldots = b_{1,1} = \ldots = b_{1,99} = 1$, it is clear that x=y is obtained (the original image is the same as the reconstructed image), which means a perfect reconstruction. In the present embodiment, as an example, the weighting unit 402d generates the reconstructed image (that is, the processed image) that is not the same as the original image by setting the coefficients $a_{5,1}, b_{5,1}, \ldots, b_{5,99}, \ldots, b_{1,1}, \ldots, b_{1,99}$ of the subband signals corresponding to the filters that have predetermined frequency characteristics and/or predetermined orientations to values that are not 1.

Classification of the detail filters will be described. The detail filters can be classified into five types based on the orientations thereof. Specifically, denoting an axis orthogonal to a certain direction (such as a floating direction in which an image is desired to be floated due to an illusion) as "orthogonal axis", the detail filters can be classified into the following five types: (1) a detail filter with an orientation in the same direction as that of the orthogonal axis; (2) a detail filter with an orientation in the direction vertical to the orthogonal axis; (3) a detail filter with an orientation that is at a positive angle relative to the orthogonal axis; (4) a detail filter with an orientation that is at a negative angle relative to the orthogonal axis; and (5) a detail filter whose orientation is not uniquely defined. The angle θ relative to the orthogonal axis satisfies the expression $-90° < \theta \leq 90°$, where the counterclockwise direction is assumed to be positive. A detail filter with an orientation horizontal or vertical to the orthogonal axis (θ=0° or 90°) is classified into (1) or (2), and therefore is not classified into (3) or (4). The "(5) detail filter whose orientation is not uniquely defined" includes orientations at both a positive angle and a negative angle that have the same absolute value of the angle relative to the orthogonal axis, and therefore is not classified into (3) or (4).

If, for example, a certain direction (such as the floating direction) is assumed to be the longitudinal direction, in the example of FIG. 5, the subband signals corresponding to the "(1) detail filters with an orientation in the same direction as that of the orthogonal axis" are $d_k(15)$, $d_k(23)$, $d_k(31)$, $d_k(39)$, $d_k(47)$, $d_k(55)$, and $d_k(63)$. The subband signals corresponding to the "(2) detail filters with an orientation in the direction vertical to the orthogonal axis" are $d_k(1)$ to $d_k(7)$. The subband signals corresponding to the "(3) detail filters with orientations that are at positive angles relative to the orthogonal axis" are $d_k(64)$ to $d_k(99)$. The subband signals corresponding to the "(4) detail filters with orientations that are at negative angles relative to the orthogonal axis" are $d_k(9)$ to $d_k(14)$, $d_k(17)$ to $d_k(22)$, $d_k(25)$ to $d_k(30)$, $d_k(33)$ to $d_k(38)$, $d_k(41)$ to $d_k(46)$, and $d_k(49)$ to $d_k(54)$. The subband signals corresponding to the "(5) detail filters whose orientations are not uniquely defined" are $d_k(8)$, $d_k(16)$, $d_k(24)$, $d_k(32)$, $d_k(40)$, $d_k(48)$, and $d_k(56)$ to $d_k(62)$.

The detail filters can also be characterized by frequency characteristics thereof. Specifically, the detail filters concentrically spread from the approximate part with the approximate filter of the pinwheel framelet serving as the center, and have characteristics of passing higher-frequency components as being away from the center and lower-frequency components as being closer to the center. In other words, the detail filters on the side farther from the approximate filter in the filter arrangement of the pinwheel framelet obtain the subband signals of the higher-frequency components, and the detail filters on the side nearer to the approximate filter in the filter arrangement of the pinwheel framelet obtain the subband signals of the lower-frequency components.

In the example of FIG. 5, the subband signals corresponding to detail filters that have frequency characteristics on the lowest frequency side are $d_k(7)$, $d_k(14)$, $d_k(15)$, and $d_k(64)$. The subband signals corresponding to detail filters that have frequency characteristics on the next lowest frequency side are $d_k(6)$, $d_k(13)$, $d_k(21)$ to $d_k(23)$, $d_k(65)$, $d_k(70)$, and $d_k(71)$. The subband signals corresponding to detail filters that have frequency characteristics on the still next lowest frequency side are $d_k(5)$, $d_k(12)$, $d_k(20)$, $d_k(28)$ to $d_k(31)$, $d_k(66)$, $d_k(72)$, and $d_k(76)$ to $d_k(78)$. The subband signals corresponding to detail filters having (relatively medium) frequency characteristics on the still next lowest frequency side are $d_k(4)$, $d_k(11)$, $d_k(19)$, $d_k(27)$, $d_k(35)$ to $d_k(39)$, $d_k(67)$, $d_k(73)$, $d_k(79)$, and $d_k(82)$ to $d_k(85)$. The subband signals corresponding to detail filters that have frequency characteristics on the still next lowest frequency side (on a relatively higher frequency side) are $d_k(3)$, $d_k(10)$, $d_k(18)$, $d_k(26)$, $d_k(34)$, $d_k(42)$ to $d_k(47)$, $d_k(68)$, $d_k(74)$, $d_k(80)$, $d_k(86)$, and $d_k(88)$ to $d_k(92)$. The subband signals corresponding to detail filters that have frequency characteristics on the still next lowest frequency side (on a relatively still higher frequency side) are $d_k(2)$, $d_k(9)$, $d_k(17)$, $d_k(25)$, $d_k(33)$, $d_k(41)$, $d_k(49)$ to $d_k(55)$, $d_k(69)$, $d_k(75)$, $d_k(81)$, $d_k(87)$, $d_k(93)$, and $d_k(94)$ to $d_k(99)$. The subband signals corresponding to detail filters that have frequency characteristics on the still next lowest frequency side (on the highest frequency side) are $d_k(1)$, $d_k(8)$, $d_k(16)$, $d_k(24)$, $d_k(32)$, $d_k(40)$, $d_k(48)$, and $d_k(56)$ to $d_k(63)$.

The above is the explanation of the classification of the detail filters.

The weighting unit 402d is a weighting unit that attenuates or amplifies the subband signal corresponding to the filters having the predetermined frequency characteristics (specified particular frequency characteristics) and/or the predetermined orientations (specified particular orientations). The weighting unit 402d may perform weighting by summing the subband signals obtained by the decomposing unit 402b with weighting factors applied to the subband signals, or may weight the frequency response functions of the framelet filters stored in functional forms, and thereafter, may derive respective filter coefficients, or may apply multiplication and addition to the weighted frequency response functions using a certain method to obtain the filter coefficients and store the filter coefficients in the filter file 406a so as to quickly obtain the reconstructed image data. The weighting unit 402d may also weight the filters in the decomposition phase and/or the synthesis phase. Under the weighting processing by the weighting unit 402d, the filter processing unit 402a may obtain in advance a unit impulse response to a unit impulse signal for the same number of pixels as that of the image data and store the unit impulse response in the filter file 406a so as to quickly obtain the reconstructed image data using the unit impulse response. In other words, the filter processing unit 402a can quickly obtain processed image data by obtaining a cyclic convolution product using a unit impulse response for new image data.

In the present embodiment, as an example, the weighting unit 402d may perform weighting so as to obtain predetermined frequency components by specifying the predetermined frequency characteristics according to a position in a predetermined filter arrangement based on an orientation at each level of the broad-sense pinwheel framelet and/or according to a level in the multiresolution decomposition. For example, the weighting unit 402d may perform the image processing so as to remove low frequency components and obtain high frequency components by performing weighting that relatively attenuates subband signals corresponding to approximate filters at a predetermined level in the multiresolution decomposition. For this processing, assuming that the decomposing unit 402b performs the multiresolution decomposition up to the predetermined level, the weighting unit 402d may perform weighting that relatively attenuates subband signals in the approximate part obtained by an approximate filter at the maximum level (for example, set the coefficient $a_{k,1}$ of the approximate part to zero). Not limited to this, in the case in which the decomposing unit 402b performs the multiresolution decomposition up to a level higher than the predetermined level, the weighting unit 402d may perform weighting that relatively attenuates detail parts at levels higher than the predetermined level and the approximate part at the maximum level.

The weighting unit 402d may perform the image processing so as to obtain high-frequency components more than low-frequency components by performing weighting that relatively amplifies subband signals corresponding to detail filters on the side farther from the approximate filter in the filter arrangement, among a plurality of filters, and relatively attenuates subband signals corresponding to the approximate filter and detail filters on the side nearer to the approximate filter in the filter arrangement, among a plurality of filters. More specifically, coefficients may be set to values close to zero for the subband signals corresponding to the approximate filter of the above-described pinwheel framelet and for the subband signals corresponding to the detail filters that are positioned nearer to the approximate filter and have low-frequency-side frequency characteristics, and coefficients may be set to values close to one for the subband signals corresponding to the detail filters that are positioned farther from the approximate filter and have high-frequency-side frequency characteristics. Conversely, the weighting unit 402d may perform the image processing so as to obtain low-frequency components more than high-frequency components. In other words, the weighting unit 402d may perform the image processing so as to obtain the low-frequency components more than the high-frequency components by performing weighting that relatively attenuates subband signals corresponding to the detail filters on the side farther from the approximate filter in the filter arrangement, among a plurality of detail filters, and relatively amplifies subband signals corresponding to the approximate filter and the detail filters on the side nearer to the approximate filter in the filter arrangement, among a plurality of detail filters. More specifically, coefficients may be set to values close to one for the subband signals corresponding to the approximate filter of the above-described pinwheel framelet and for the subband signals corresponding to the detail filters that are positioned nearer to the approximate filter and have the low-frequency-side frequency characteristics, and coefficients may be set to values close to zero for the subband signals corresponding to the detail filters that are positioned farther from the approximate filter and have the high-frequency-side frequency characteristics.

The weighting unit 402d may perform the image processing so as to obtain medium-frequency components more than high-frequency components and low-frequency components by performing weighting that relatively attenuates subband signals corresponding to filters having high-frequency frequency characteristics and filters having low-frequency frequency characteristics, among a plurality of filters, and relatively amplifies subband signals corresponding to filters having medium-frequency frequency characteristics, such as relatively high-frequency and relatively low-frequency frequency characteristics, among a plurality of filters. More specifically, coefficients may be set to values close to zero for the subband signals corresponding to the filters of the above-described pinwheel framelet that have the high-frequency frequency characteristics and the filters of the above-described pinwheel framelet that have the low-frequency frequency characteristics, and coefficients may be set to values close to one for the subband signals corresponding to the detail filters that have the medium-frequency frequency characteristics.

The weighting unit 402d may perform the image processing so as to raise or lower components having predetermined orientations by performing weighting that attenuates or amplifies the subband signals corresponding to the detail filters having the predetermined orientations. For example, the components having an orientation at the predetermined angles $\theta(-90°<\theta\leq90°)$ can be extracted from the original image by setting the coefficients to values close to one for the subband signals corresponding to the detail filters of the above-described pinwheel framelet that have the orientation at the predetermined angle $\theta$, and setting the other coefficients to values close to zero.

In the present embodiment, as an example, the weighting unit 402d may perform the weighting so as to generate a hybrid image that appears different depending on whether the image is far or near. For example, in the case of generating one hybrid image by combining two original images, the decomposing unit 402b performs multiresolution decomposition using a broad-sense pinwheel framelet on the two types of image data, and through processing by the weighting unit 402d, the reconstructing unit 402c relatively amplifies a subband signal corresponding to at least one of the detail filters having the high-frequency-side frequency characteristics for one of the two types of image data, and relatively amplifies a subband signal corresponding to at least one of the filters having the low-frequency-side frequency characteristics for the other of the two types of image data, so as to generate respective pieces of reconstructed image data. In this manner, two types of reconstructed image data are obtained by image-processing the two types of original images using the weighting unit 402*d* so as to have different frequency components from each other, and are superimposed so as to be one image by processing performed by the hybrid generating unit 402*h* to be described later, thereby being made into hybrid image data.

Three original images can also be combined to generate one superhybrid image. In that case, the decomposing unit 402*b* obtains subband signals by performing multiresolution decomposition on three types of image data by using a wavelet frame with orientation selectivity or a filterbank with orientation selectivity that is a set of an approximate filter with no orientation and a plurality of detail filters with respective orientations, and when reconstructing an image by summing the subband signals obtained by the decomposing unit 402*b*, the reconstructing unit 402*c* obtains, through processing by the weighting unit 402*d*, the reconstructed image data by attenuating or amplifying a subband signal corresponding to at least one of filters that have predetermined frequency characteristics among the filters. More specifically, the weighting unit 402*d* relatively amplifies a subband signal corresponding to at least one of the detail filters having the high-frequency-side frequency characteristics for the first image data of the three types of image data, relatively amplifies a subband signal corresponding to at least one of the detail filters having the medium-frequency-side frequency characteristics for the second of the above-mentioned image data, and relatively amplifies a subband signal corresponding to at least one of the filters having the low-frequency-side frequency characteristics for the third of the above-mentioned image data, thereby generating respective pieces of reconstructed image data. For the first and/or the second of the above-mentioned image data, the weighting unit 402*d* may generate the above-mentioned respective pieces of reconstructed image data by relatively amplifying a subband signal corresponding to at least one of the above-mentioned filters having the frequency characteristics on the still lower frequency side. In this manner, three types of reconstructed image data are obtained by image-processing the three types of original images using the weighting unit 402*d* so as to have different frequency components from one another, and are superimposed so as to be one image by processing performed by the hybrid generating unit 402*h* to be described later, thereby being made into superhybrid image data. The predetermined frequency characteristics described above may be specified by a position in a predetermined filter arrangement based on an orientation at each level of the pinwheel framelet and/or by a level in the above-described multiresolution decomposition. The weighting unit 402*d* may perform the image processing so as to include components on the side farther from the approximate filter in the filter arrangement and/or lower level components as the frequency characteristics are on the higher frequency side, or may perform the image processing so as to include components on the side nearer to the approximate filter in the filter arrangement and/or higher level components as the frequency characteristics are on the lower frequency side.

In the present embodiment, as an example, the weighting unit 402*d* may perform the weighting so that the floating illusion occurs. For example, the weighting unit 402*d* may generate reconstructed image data that produces the floating illusion by attenuating subband signals corresponding to detail filters of a plurality of detail filters that have orientations orthogonal to a floating direction in which an image is desired to be floated due to the illusion. In other words, the weighting unit 402*d* may attenuate subband signals corresponding to the "(1) detail filters with an orientation in the same direction as that of the orthogonal axis" in the above-described classification. For example, in FIG. 5, if the image is desired to be floated due to the illusion in the longitudinal direction (the up-down direction in FIG. 5), the weighting unit 402*d* attenuates the subband signals of $d_k(15)$, $d_k(23)$, $d_k(31)$, $d_k(39)$, $d_k(47)$, $d_k(55)$, and $d_k(63)$. More specifically, the weighting unit 402*d* sets the coefficients $b_{k,15}$, $b_{k,23}$, $b_{k,31}$, $b_{k,39}$, $b_{k,47}$, $b_{k,55}$, and $b_{k,63}$ to values equal to or larger than 0 and smaller than 1 (see FIG. 6). Regarding the subband signals generated by the decomposing unit 402*b* from the original image data, if biases in signal strength are small between the subband signals corresponding to the "(3) detail filters with orientations that are at positive angles relative to the orthogonal axis" and the subband signals corresponding to the "(4) detail filters with orientations that are at negative angles relative to the orthogonal axis", a floating illusion created by the signal attenuation by the weighting unit 402*d* using this method may be weak in some cases. However, the biases in signal strength can be amplified to enhance the floating illusion by attenuating or amplifying the subband signals by further performing the following method 1 or 2.

(Method 1: Attenuation of Subband Signal in One of Two Groups)

In Method 1, a subband signal corresponding to at least one of detail filters belonging to one of two groups is attenuated, the two groups being a group composed of the "(3) detail filters with orientations that are at positive angles relative to the orthogonal axis" and a group composed of the "(4) detail filters with orientations that are at negative angles relative to the orthogonal axis". Specifically, the weighting unit 402*d* may further attenuate a subband signal corresponding to at least one of detail filters belonging to one of the two groups, that is, the group composed of the detail filters of a plurality of detail filters with orientations that are neither horizontal nor vertical to the orthogonal axis in the floating direction but are at a negative angle relative to the orthogonal axis, and the group composed of the detail filters of a plurality of detail filters with orientations that are neither horizontal nor vertical to the orthogonal axis in the floating direction but are at a positive angle relative to the orthogonal axis. More specifically, assuming the group composed of the "(4) detail filters with orientations that are at negative angles relative to the orthogonal axis" to be "one group", the weighting unit 402*d* sets at least one of the coefficients $b_{k,9}$ to $b_{k,14}$, $b_{k,17}$ to $b_{k,22}$, $b_{k,25}$ to $b_{k,30}$, $b_{k,33}$ to $b_{k,38}$, $b_{k,41}$ to $b_{k,46}$, and $b_{k,49}$ to $b_{k,54}$ corresponding to one group to a value or values equal to or larger than 0 and smaller than 1.

Further limiting the range of subband signals to be attenuated, it is possible to attenuate a subband signal corresponding to at least one of detail filters belonging to one group with orientations that are tilted such that the absolute value of the angle relative to the orthogonal axis is larger than 0 degree and equal to or smaller than 45 degrees. More specifically, assuming the group composed of the "(4) detail filters with orientations that are at negative angles relative to the orthogonal axis" to be "one group", the weighting unit 402*d* sets at least one of the coefficients $b_{k,14}$, $b_{k,21}$, $b_{k,22}$, $b_{k,28}$ to $b_{k,30}$, $b_{k,35}$ to $b_{k,38}$, $b_{k,42}$ to $b_{k,46}$, and $b_{k,49}$ to $b_{k,54}$ to a value or values equal to or larger than 0 and smaller than 1.

Still further limiting the range of subband signals to be attenuated, it is possible to attenuate a subband signal corresponding to at least one of the detail filters that include those up to a higher degree as the angle approaches 0 degree and those up to a lower degree as the angle approaches 45 degrees, among the detail filters with orientations that are tilted such that the absolute value of the angle relative to the orthogonal axis is larger than 0 degree and equal to or smaller than 45 degrees. More specifically, assuming the group composed of the "(4) detail filters with orientations that are at negative angles relative to the orthogonal axis" to be "one group", the weighting unit 402d sets at least one of the coefficients $b_{k,14}$, $b_{k,21}$, $b_{k,22}$, $b_{k,28}$ to $b_{k,30}$, $b_{k,36}$ to $b_{k,38}$, $b_{k,46}$, $b_{k,46}$, and $b_{k,54}$ to a value or values equal to or larger than 0 and smaller than 1. As described above, if a subband signal corresponding to at least one of the detail filters belonging to one group is attenuated, some of the subband signals corresponding to the detail filters with an orientation orthogonal to the floating direction need not necessarily be attenuated.

(Method 2: Amplification of Subband Signal in the Other of Two Groups)

In Method 2, a subband signal corresponding to at least one of detail filters belonging to the other of the two groups (the group that is different from one group in Method 1) is amplified, the two groups being the group composed of the "(3) detail filters with orientations that are at positive angles relative to the orthogonal axis" and the group composed of the "(4) detail filters with orientations that are at negative angles relative to the orthogonal axis". For example, the weighting unit 402d amplifies the subband signals corresponding to detail filters that belong to the other of the two groups and have an orientation of 45 degrees relative to the orthogonal axis in the floating direction. More specifically, assuming the group composed of the "(3) detail filters with orientations that are at positive angles relative to the orthogonal axis" to be "the other group", the weighting unit 402d sets the coefficients $b_{k,64}$, $b_{k,71}$, $b_{k,78}$, $b_{k,85}$, $b_{k,92}$, and $b_{k,99}$ to values larger than 1 so as to amplify the subband signals corresponding to the detail filters of $d_k(64)$, $d_k(71)$, $d_k(78)$, $d_k(85)$, $d_k(92)$, and $d_k(99)$.

The above description is an example of a pattern of the subband signals attenuated or amplified by the weighting unit 402d. In the above-described example of the symbols (numbers) and the coefficients with reference to FIG. 5, the explanation has been given on the example where the floating direction is the longitudinal direction. However, if an image is desired to be floated in the lateral direction, it is sufficient to attenuate or amplify in a similar manner the subband signals of the detail filters of a pattern obtained by flipping the above pattern about a 45° axis (an example will be described later). In the above example, the explanation has been given on the example where the group composed of the "(4) detail filters with orientations that are at negative angles relative to the orthogonal axis" is "one group" and the group composed of the "(3) detail filters with orientations that are at positive angles relative to the orthogonal axis" is "the other group". However, it is possible to attenuate or amplify in a similar manner the subband signals of the detail filters of a pattern obtained by inverting the right and left parts of the above pattern by interchanging both groups. In this case, the floating direction is reversed along the same axis. This can be used to enhance the floating illusion such that images float in opposite directions to each other in two adjacent image regions.

In other words, the weighting unit 402d may control the orientations of the detail filters that attenuate or amplify subband signals such that the floating directions are opposite to each other in the image regions adjacent to each other in the reconstructed image data. In other words, because there are detail filters in which the absolute values of the angle are the same as each other between the "(3) detail filters with orientations that are at positive angles relative to the orthogonal axis" and the "(4) detail filters with orientations that are at negative angles relative to the orthogonal axis", it is sufficient to interchange the positive and negative signs of the angles of the orientations of the detail filters to be attenuated or amplified between the two adjacent image regions. For example, in one of the image regions, when the subband signals of $d_k(64)$, $d_k(71)$, $d_k(78)$, $d_k(85)$, $d_k(92)$, and $d_k(99)$ are amplified as in the above example, the weighting unit 402d amplifies the subband signals corresponding to the detail filters of $d_k(14)$, $d_k(21)$, $d_k(28)$, $d_k(35)$, $d_k(42)$, and $d_k(49)$ in the other image region adjacent to one of the image regions. The weighting unit 402d may divide the original image data into two or more image regions and then amplify or attenuate the corresponding subband signals in each image region. Moreover, the weighting unit 402d may amplify or attenuate the corresponding subband signals in the data of the same or different two or more original images and then combine the images.

The description returns to FIG. 1 again. The color space conversion unit 402f is a color space conversion unit that performs conversion of the color space, decomposition and synthesis of the color components, and the like. For example, when the image data stored in the image data file 406b is a color image, the color space conversion unit 402f converts the color space to a CIELAB color space before processing is performed by the decomposing unit 402b. As a result, the image is decomposed into three color components, that is, L* (lightness), a* (red-green), and b* (yellow-blue). The color space conversion unit 402f may convert the color space to a color space other than the CIELAB color space. An advantage of using the CIELAB color space is that only lightness information can be used as an input signal for the decomposing unit 402b. When the image data is grayscale, the color space conversion unit 402f need not perform processing relating to the color space.

The processed image output unit 402g outputs, to the output device 414, reconstructed image data (that is, processed image data) reconstructed by the reconstructing unit 402c while the weighting unit 402d is attenuating or amplifying subband signals after the color space conversion unit 402f performs, if necessary, synthesis of the color components, conversion of the color space, scale conversion of the lightness and color, and the like.

The processed image that is the reconstructed image according to the present embodiment is characterized in that a predetermined component of frequency components or orientation components that make up the original image and that are extracted by filters with respective orientations is attenuated or amplified. For example, in the superhybrid image described above, a subband signal corresponding to at least one of the detail filters having the high-frequency-side frequency characteristics is relatively amplified for the first image data of the three types of original images; a subband signal corresponding to at least one of the detail filters having the medium-frequency-side frequency characteristics is relatively amplified for the second image data of the three types of original images; and a subband signal corresponding to at least one of the filters having the low-frequency-side frequency characteristics is relatively amplified for the third image data of the three types of original images. In the hybrid image described above, a subband signal corresponding to at least one of the detail filters having the high-frequency-side frequency characteristics is relatively amplified for one of the two types of image data, and a subband signal corresponding to at least one of the filters having the low-frequency-side frequency characteristics is relatively amplified for the other of the two types of image data.

As an example, such a hybrid image or a superhybrid image is an image that is perceived as a different image as the image or a viewer moves closer to or away from the other, and is formed as a design, a photograph, and/or a character by having a region formed by the light and dark (lightness), tone, or shades of colors in the image. The original image may be any image representing, for example, a design, a photograph, or a character.

Here, the processed image output unit 402g may output the reconstructed image for display to a display device, such as a monitor, or may output the reconstructed image for printing to a printing device, such as a printer, to produce a printing medium. The medium that is a printing target may be, for example, paper, a transparency, or the like, or may be in the form of, for example, a flyer, a fan, a card, a picture book, a New Year's card, a Christmas card, or a business card. The processed image output unit 402g may change the design (for example, the size is changed to postcard size or the like) depending on its intended use according to the output form. Moreover, the processed image output unit 402g may transmit reconstructed image data to the external system 200 via the network 300.

The hybrid generating unit 402h is a hybrid generating unit that generates hybrid image data and/or a superhybrid generating unit that generates superhybrid image data by superimposing reconstructed image data obtained for a plurality of pieces of image data. In other words, the hybrid generating unit 402h functions as a hybrid generating unit when generating hybrid image data for two types of image data, and functions as a superhybrid generating unit when generating superhybrid image data for three types of image data. For example, when generating a hybrid image from two types of original images, the hybrid generating unit 402h generates hybrid image data by superimposing reconstructed image data obtained for the two types of image data. When generating a superhybrid image from three types of original images, the hybrid generating unit 402h generates superhybrid image data by superimposing reconstructed image data obtained for the three types of image data.

The image processing apparatus 400 may be communicatively connected to the network 300 via a communication device, such as a router, and a wired or wireless communication line, such as a dedicated line. In FIG. 1, the communication control interface unit 404 performs communication control between the image processing apparatus 400 and the network 300 (or a communication device, such as a router). In other words, the communication control interface unit 404 is an interface connected to a communication device (not shown), such as a router, connected to a communication line or the like, and has the function of performing data communication with other terminals via communication lines. In FIG. 1, the network 300 has the function of mutually connecting the image processing apparatus 400 and the external system 200 and is, for example, the Internet or the like.

In FIG. 1, the external system 200 is mutually connected to the image processing apparatus 400 via the network 300 and may have the function of providing a computer program for causing an external database relating to image data or a broad-sense pinwheel framelet or a computer to function as the image processing apparatus. The external system 200 may be configured as a WEB server, an ASP server, or the like. Moreover, the hardware configuration of the external system 200 may be composed of an information processing apparatus, such as a commercially available workstation and personal computer, and accessory devices thereof. The functions of the external system 200 are implemented by a CPU, a disk device, a memory device, an input device, an output device, a communication control device, and the like in the hardware configuration of the external system 200, computer programs for controlling these devices, and the like.

This is the end of the explanation of the configuration of the image processing apparatus 400 according to the present embodiment. While the above explanation of the image processing apparatus 400 has mainly been made on the function to generate a processed image for original images, the image processing apparatus 400 is not limited to this, but may be, for example, a computer that implements the function to create the filters according to the present invention. For example, the image processing apparatus 400 may perform the same processing as the processing of generating the processed image by applying image processing to the original images on the unit impulse signal for the same number of pixels as that of the image data, and may create a unit impulse response to the obtained unit impulse signal as the filters. In a similar manner, if a broad-sense pinwheel framelet is defined in a functional form, the image processing apparatus 400 may create a digital filter for image processing by calculating filter coefficients thereof by weighting the frequency response functions for the respective filters of the broad-sense pinwheel framelet with the same predetermined weights as those for the processing on the original images, and multiplying and adding the results with a predetermined method. The image processing apparatus 400 may store the digital filter thus created into the filter file 406a, and may apply image processing to the original images using the created digital filter.

[Processing by Image Processing Apparatus 400]

The following describes an example of the processing by the image processing apparatus 400 according to the present embodiment configured as described above, with reference to FIG. 7 to FIG. 75.

[Basic Processing]

First, the basic processing performed by the image processing apparatus 400 will be described with reference to FIG. 7 and FIG. 8. FIG. 7 is a flowchart illustrating one example of the basic processing performed by the image processing apparatus 400 in the present embodiment.

First, the decomposing unit 402b obtains subband signals by performing maximal overlap multiresolution decomposition by using the pinwheel framelets stored in the filter file 406a on the image data stored in the image data file 406b (Step SA-1). FIG. 8 is a diagram illustrating one example of the filterbanks in the decomposition phase and the synthesis phase of maximal overlap multiresolution decomposition. The numbers in FIG. 8 indicate levels. "PW" represents a detail filter. In the case of degree 7, 99 detail filters are present for each level. "A" represents an approximate filter. In the case of degree 7, one approximate filter is present for each level.

First, as illustrated in FIG. 8, using pinwheel framelets at level 1, the decomposing unit 402b decomposes the original image as an input signal into signals that pass 99 detail filters and a signal that passes one approximate filter. Next, using pinwheel framelets at level 2, the decomposing unit 402b decomposes the signal that has passed the approximate filter at level 1 into signals that pass 99 detail filters (at level 2) and a signal that passes one approximate filter (at level 2). The decomposing unit 402b repeats this processing until the level reaches a maximum level (in the case of FIG. 8, level 5). Then, the decomposing unit 402b puts the signals obtained in the decomposition phase through the filterbank in the synthesis phase, and eventually obtains 99×5 subband signals (detail parts) and one subband signal (approximate part).

The description returns to FIG. 7 again. The reconstructing unit 402c does not perfectly reconstruct the image by simply summing the subband signals obtained by the decomposing unit 402b in the above manner, but performs the weighting by attenuating or amplifying subband signals from specific detail filters through the processing performed by the weighting unit 402d (Step SA-2).

Regarding the weighting, in the present embodiment, the weighting unit 402d performs processing on the subband information by multiplying the subband signals output from the decomposing unit 402b by coefficients, as illustrated in FIG. 8. A specific example of a pattern of filters that attenuate or amplify the subband signals (that is, a specific example of the weighting) will be described in detail in the next section.

Then, the reconstructing unit 402c reconstructs the image by summing the subband signals processed by the weighting unit 402d as described above (Step SA-3). When a hybrid image or a superhybrid image is generated, the hybrid generating unit 402h generates the hybrid image data or the superhybrid image data as final processed image data by superimposing the reconstructed image data obtained for a plurality of pieces of image data.

Then, the basic processing performed by the image processing apparatus 400 ends.

[Specific Processing]

Figure 9:
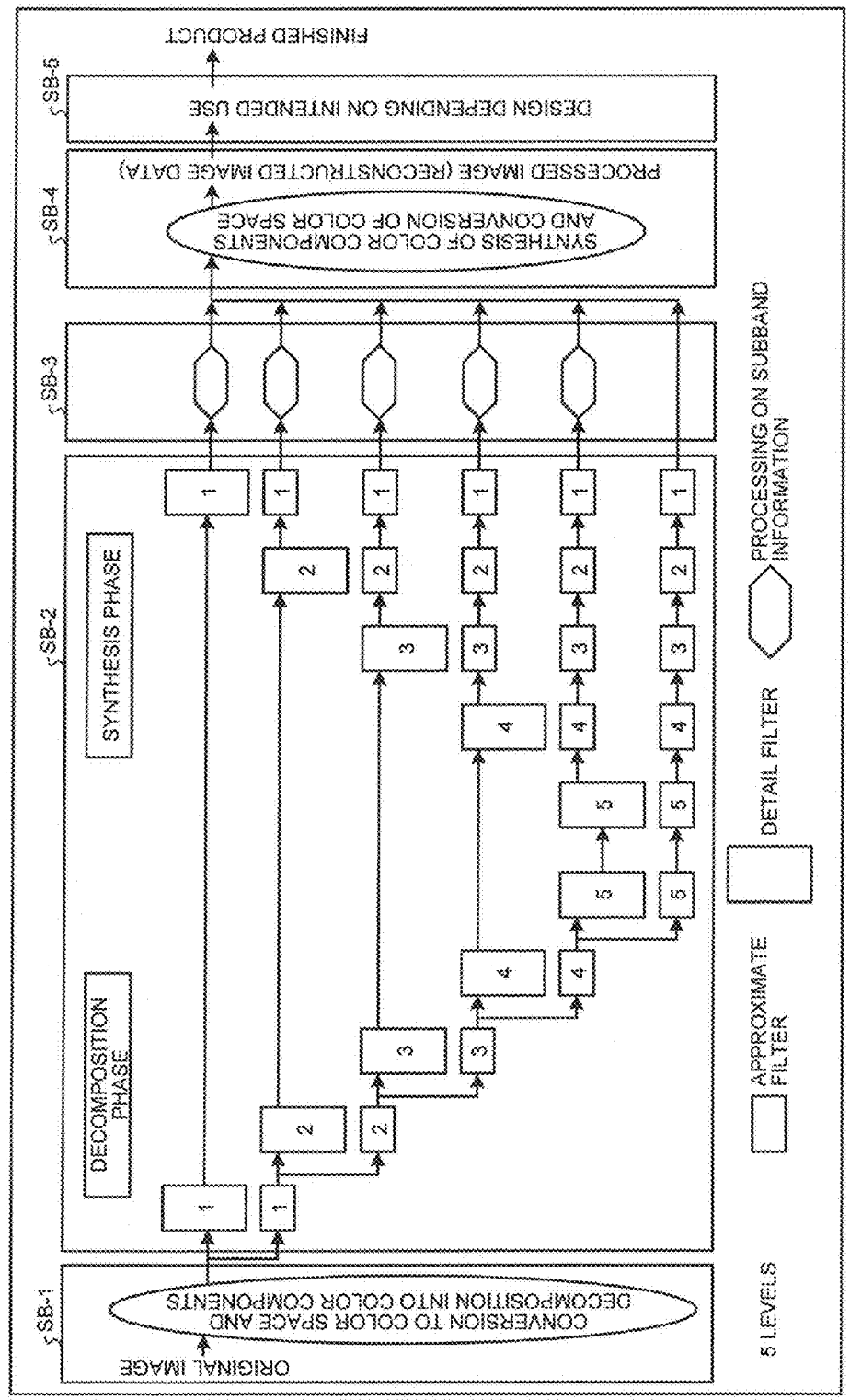
FIG. 9 is a flowchart illustrating one example of specific processing performed by the image processing apparatus 400 in the embodiment.
Figure 75:
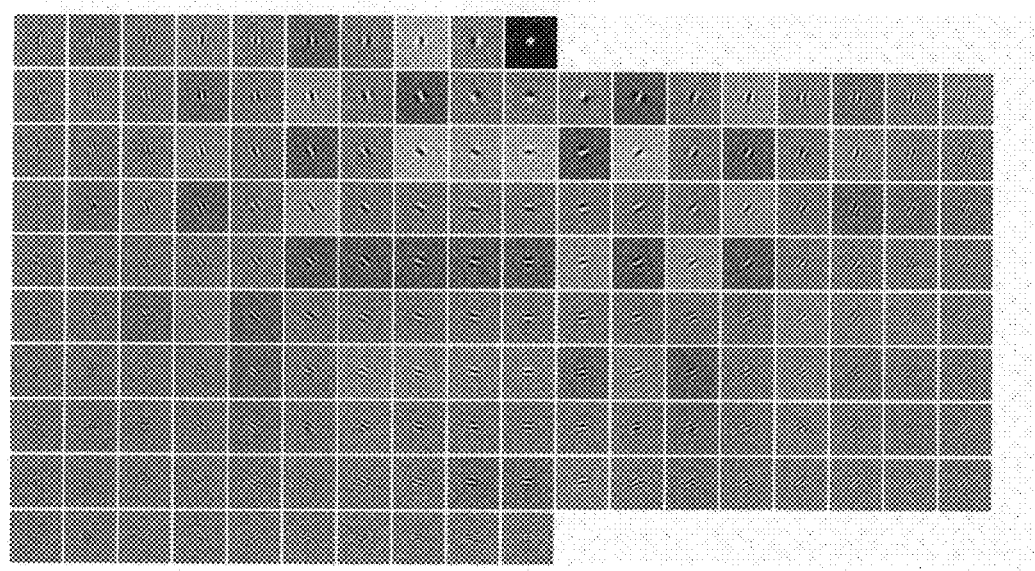
FIG. 75 is a diagram illustrating the decomposition detail coefficients at level 2 when obtained by processing a unit impulse using a maximal overlap pinwheel framelet of degree 9.

Next, details of the processing that further specifically explain the basic processing performed by the image processing apparatus 400 will be described with reference to FIGS. 9 to 75. FIG. 9 is a flowchart illustrating one example of the specific processing performed by the image processing apparatus 400 in the present embodiment. For this specific processing, an explanation will be given on color space conversion processing and decomposition and synthesis processing of color components necessary for a color image, processing on the design of reconstructed image data depending on the intended use, printing processing for obtaining finished products, and the like, in addition to the specific examples of the basic processing described above.

(Step SB-1)

First, a user prepares the original image (such as a character string, an illustration, or a photograph) that is desired to be floated due to an illusion, and stores the original image in the image data file 406b via the input device 412 or the like.

When the stored image data is a color image, the image processing apparatus 400 converts the color space to the CIELAB color space through the processing performed by the color space conversion unit 402f. As a result, the image is decomposed into three color components, that is, L* (lightness), a* (red-green), and b* (yellow-blue). When the image data is grayscale, the color space conversion unit 402f does not perform processing related to the color space.

(Step SB-2)

Then, the decomposing unit 402b performs maximal overlap multiresolution decomposition by using pinwheel framelets on each color component (one color in the case of grayscale) of the original image that is an input signal. In this embodiment, an explanation is given using pinwheel framelets of degree 7. However, similar image processing can also be performed by using wavelet frames of other degrees or with different orientation selectivity. As another example, a simple pinwheel framelet may be used (see Non Patent Literature 6). Alternatively, a pinwheel wavelet frame can also be used (see Non Patent Literature 7). Moreover, multiresolution decomposition, such as maximally decimated multiresolution decomposition or partially decimated and partially overlap multiresolution decomposition, may be performed without being limited to the maximal overlap multiresolution decomposition.

(Step SB-3)

Then, the reconstructing unit 402c does not sum all the subband signals obtained by performing the maximal overlap multiresolution decomposition by using the decomposing unit 402b, but performs weighting processing of deleting certain subband signals, adding certain subband signals without modifying them, and adding certain subband signals after amplifying them by using the weighting unit 402d. A processed image is obtained by arranging the images each obtained by processing the original image by this processing method. Examples of a processing method will be described below by classifying them into some cases. In the following examples, the weighting unit 402d increases or reduces subband signals by setting the coefficients $b_{k,n}$ illustrated in FIG. 6. An operation may be performed on the coefficient $a_k$ of the approximate part ($0 \leq a_k = A \leq 1$).

(Step SB-4)

Then, in the case of a color image, the color space conversion unit 402f synthesizes the image signals of the processed color components (such as L*, a*, and b*) so as to restore the image to a color image before the processed image output unit 402g actually outputs to display or prints out the image. Conversion to, for example, a color space sRGB may be performed according to the need for, for example, a form of output. At Step SB-4, if the value of the lightness after the processing exceeds the range of 0 to 255, processing may be performed in which a threshold is used so as to set a value equal to or smaller than 0 to 0 and replace a value equal to or larger than 255 with 255, or the scale of the lightness and color may be appropriately converted.

(Step SB-5)

The image processing apparatus 400 may add designs depending on the intended use. For example, to generate a floating illusion, the reconstructing unit 402c may combine two processed images by alternately arranging them in odd rows and even rows, the processed images having been created by the weighting unit 402d by performing weighting processing so as to interchange the positive and negative signs of the angles of the orientations. In this manner, the floating illusion is enhanced by arranging images such that the floating directions due to an illusion are opposite to each other in adjacent image regions. The arranging method is not limited to this, and various arranging methods are possible. For example, the images may be arranged such that the images in the odd rows and the even rows are shifted from each other by ½ of the image length. The floating illusion may be enhanced by arranging images such that, in adjacent image regions, the floating directions due to an illusion are different from each other, but are not limited to being opposite to each other. The images are not limited to being arranged in parallel, but may be arranged in a circular shape.

This is the end of the explanation of the specific processing performed by the image processing apparatus 400.

[Example of High-Speed Calculation Method]

In the example of the specific processing described above with reference to FIG. 9, a large number of filtering calculations need to be performed to calculate the processing at Steps SB-2 and SB-3 every time an image is supplied; thus, a relatively long time is required. In this example, an example of a high-speed calculation method that shortens the filtering calculation time will be explained.

First, the filter processing unit 402a (including, for example, the decomposing unit 402b and the reconstructing unit 402c) supplies, instead of the image signal, a unit impulse signal for an image size (the number of pixels) that is the same as that of the image signal, to a filterbank to be used (for example, the above-described filterbank in FIG. 8), and stores in advance an output signal F in the storing unit 406, including, for example, the filter file 406a. The unit impulse signal is, for example, a signal in which the value of the upper left end is 1 and other values are all 0 in the image signal.

Then, when the floating illusion is generated, the filter processing unit 402a calculates a cyclic convolution product x*F (also referred to as the circular convolution product) of an image x on which the processing at Step SB-1 explained with reference to FIG. 9 has been performed, and F (for example of the cyclic convolution product, see Hitoshi Arai, "Fourier Analysis", Asakura Publishing Co., Ltd. (2003)). The calculated product x*F is the same as the reconstructed image y calculated by the specific processing described above with reference to FIG. 9.

In this manner, through the use of the high-speed calculation method of calculating the convolution product of the precalculated impulse response and the original image, when processed images with the same image size (the number of pixels) are generated by the same processing method for a plurality of original images, the time and the amount of calculation can considerably be reduced. More specifically, in the example of the specific processing explained with reference to FIG. 9, 25 seconds are required to generate a floating illusion image for one original image; however, through the use of the high-speed calculation method, a processed image (such as a floating illusion image) can be generated in 2 seconds for one original image by precalculating the impulse response F (although it takes 23 seconds to calculate F).

The following describes respective creating methods and application examples of: 1. high-pass filters, low-pass filters, band-pass filters and band-rejection filters without orientation selectivity; and 2. band-pass filters and band-rejection filters with orientation selectivity; as examples of filters weighted with various weights. In the following sections, for simplicity in description, a graph obtained by discretely Fourier-transforming image data or filter data, obtaining absolute values of respective components, performing periodical shifting (fftshift of Matlab) so as to position the zero frequency component in the center, and further interpolating between points so that the graph can be displayed as a continuous curved surface will be referred to as a "graph of frequency characteristics" of the image or the filters.

1. High-Pass Filter, Low-Pass Filter, Band-Pass Filter and Band-Rejection Filter without Orientation Selectivity An explanation will be given on various creating methods of filters without orientation selectivity and application examples of the filters (frequency analysis of an image, and creation of a hybrid image and a superhybrid image).

1.1 High-Pass Filter

A creation example of high-pass filters for an image of 512×512 pixels will be described.

First, a 512×512 array made up of zeros is created, and a unit impulse in which only the upper left point is 1 is prepared. The image processing apparatus 400 performs maximal overlap multiresolution decomposition through processing performed by the filter processing unit 402a using a pinwheel framelet on the unit impulse.

Figures 10, 11:
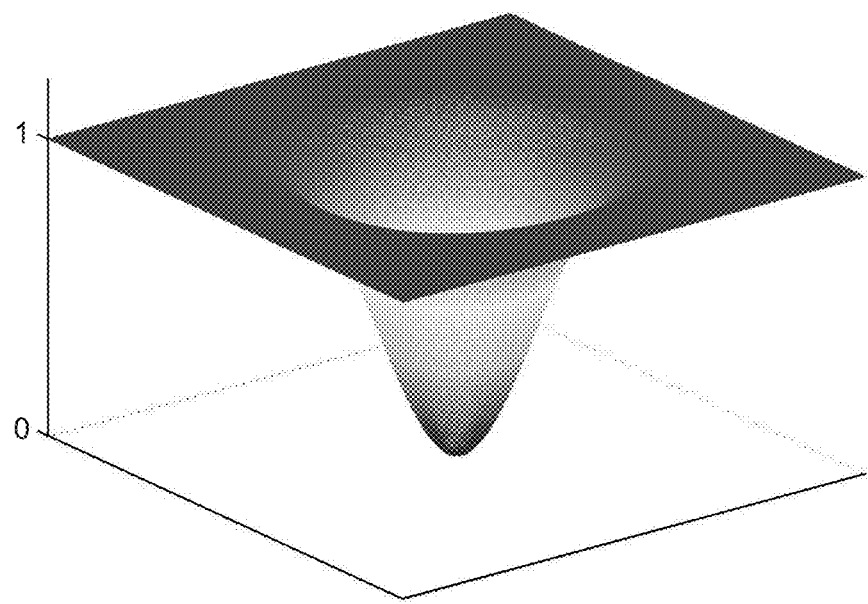
FIG. 10 is a diagram representing a method for creating high-pass filters of an example of the embodiment using a table representing an arrangement of multiresolution decomposition using a pinwheel framelet of degree 3.
FIG. 11 is a diagram illustrating a graph of frequency characteristics of the high-pass filters obtained by the weighting method illustrated in FIG. 10.
Figure 72:
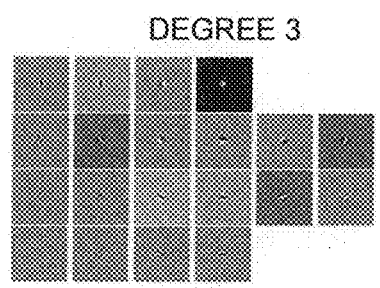
FIG. 72 is a diagram illustrating decomposition detail coefficients at level 2 when obtained by processing a unit impulse using a maximal overlap pinwheel framelet of degree 3.

As an example, the high-pass filters are obtained by performing multiresolution decomposition using a pinwheel framelet of degree 3, and obtaining the unit impulse response by summing the subband signals of all detail parts at level 1 (the pinwheel framelet of degree 3 will be described later using FIG. 72). FIG. 10 is a diagram representing a method for creating the high-pass filters of this example using a table representing an arrangement of the multiresolution decomposition using the pinwheel framelet of degree 3. The positions of numbers correspond to the arrangement of the subband signals of the multiresolution decomposition. The arrangement method is the same as that of FIGS. 2 to 6 (the same arrangement method applies to other tables to be illustrated below). The values in the table indicate weighting factors for the respective detail parts and the approximate part, and represent the weights for the subband signals when a unit impulse corresponding to the filter is supplied. In other words, the respective subband signals are multiplied by the values in the table and summed to form the filters.

As illustrated in FIG. 10, the weighting unit 402d performs weighting that attenuates the subband signal corresponding to the approximate filter at level 1 so as to obtain high-frequency components by eliminating low-frequency components. If the calculation is performed up to a level higher than level 1, the weighting unit 402d sets the coefficients of the detail parts at levels higher than level 1 and the coefficient of the approximate part at the maximum level to 0. FIG. 11 is a diagram illustrating a graph of frequency characteristics of the high-pass filters obtained by the weighting method illustrated in FIG. 10.

Figure 12:
FIG. 12 is a view illustrating an original image used in the example of the embodiment.

By causing the filter processing unit 402a to calculate a cyclic convolution product of the original image using the high-pass filters, a processed image is obtained from the original image (for the cyclic convolution product, see Hitoshi Arai, "Linear Algebra, Basics and Applications", Nippon Hyoron Sha Co., Ltd.). FIG. 12 is a view illustrating the original image used in this example, and FIG. 13 illustrates the processed image obtained as a result of applying the high-pass filters obtained by the weighting method of FIG. 10 to the original image.

Figure 13:
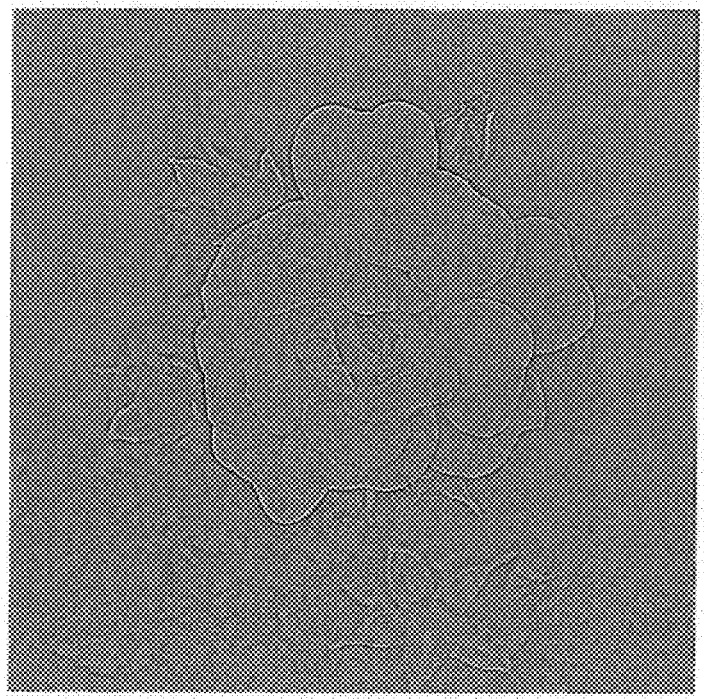
FIG. 13 is a view illustrating a processed image obtained as a result of applying the high-pass filters obtained by the weighting method of FIG. 10 to the original image.

As illustrated in FIG. 13, a high-frequency portion alone was successfully extracted from the original image by applying the high-pass filters obtained by the weighting method of FIG. 10. Distortions are seen at edges of the image of the high-frequency portion in FIG. 13 because the original image was periodically expanded in the present embodiment. The filter processing unit 402a may eliminate the distortions at the edges of the image by processing the image after expanding this portion with an appropriate method, such as symmetric expansion, and trimming the processed image into the size of the original image.

Figure 16:
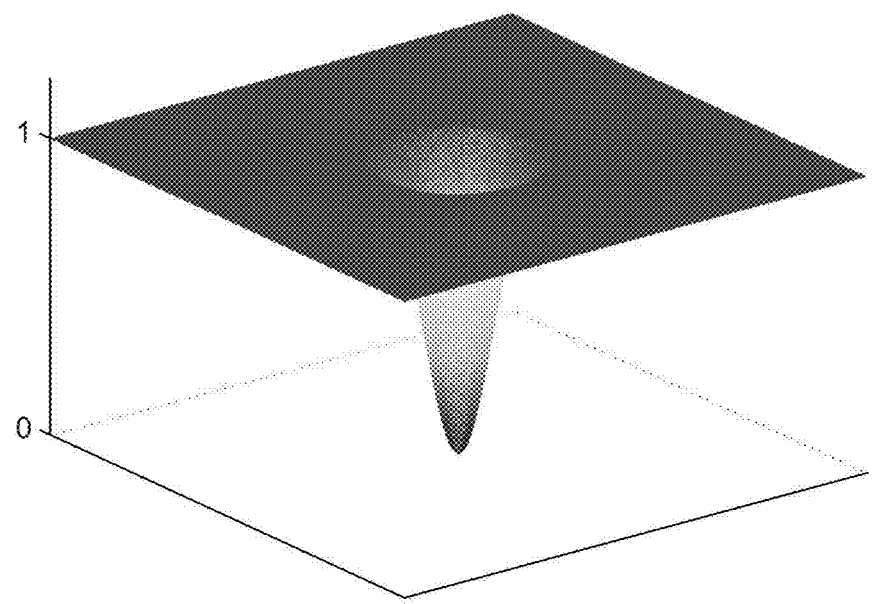
FIG. 16 is a diagram illustrating a graph of frequency characteristics of the filters obtained by the weighting method illustrated in FIGS. 14 and 15.
Figures 17, 18:
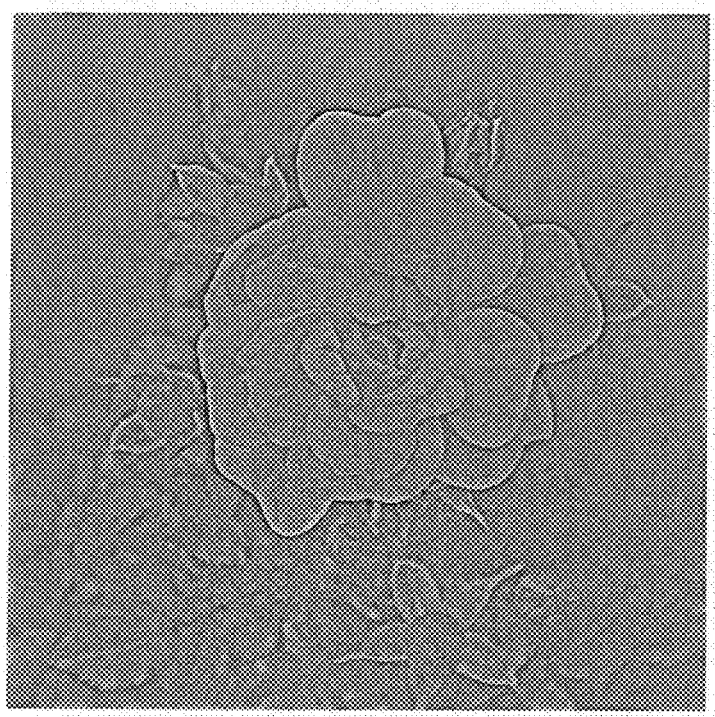
FIG. 17 is a view illustrating a processed image obtained by applying the filters obtained by the weighting method illustrated in FIGS. 14 and 15 to the original image (FIG. 12).
FIG. 18 is a diagram illustrating a weighting method for creating filters using detail parts at level 1 in a pinwheel framelet of degree 7.

FIGS. 14 and 15 are diagrams illustrating one example of another weighting method for extracting the high-frequency portion. The filters were created using only the detail parts at level 1 in the above-described example of FIG. 10. However, in this example, as illustrated in FIGS. 14 and 15, filters were created using the detail parts at level 2 in addition to the detail parts at level 1. FIG. 16 is a diagram illustrating a graph of frequency characteristics of the filters obtained by the weighting method illustrated in FIGS. 14 and 15. FIG. 17 is a view illustrating a processed image obtained by applying the filters obtained by the weighting method illustrated in FIGS. 14 and 15 to the original image (FIG. 12).

As illustrated in FIG. 16, it has been found that the frequency passband of the high-pass filters that also use the detail parts at level 2 is expanded toward slightly lower frequency and, as illustrated in FIG. 17, the processed image contains slightly lower frequency components, than when the filters using only the detail parts at level 1 are used.

While conventional normal wavelets also perform image processing of extracting a high-frequency portion from an image by summing all subband signals of detail parts up to a certain level (see Non Patent Literature 5), the conventional normal wavelets can create only limited types of high-pass filters. In contrast, because the pinwheel framelet has degrees, a number of types of high-pass filters can be created, and the filters can be selected according to the frequency to be extracted. For example, high-pass filters having different frequency characteristics can be created by using a pinwheel framelet of another degree with the following method.

Figure 19:
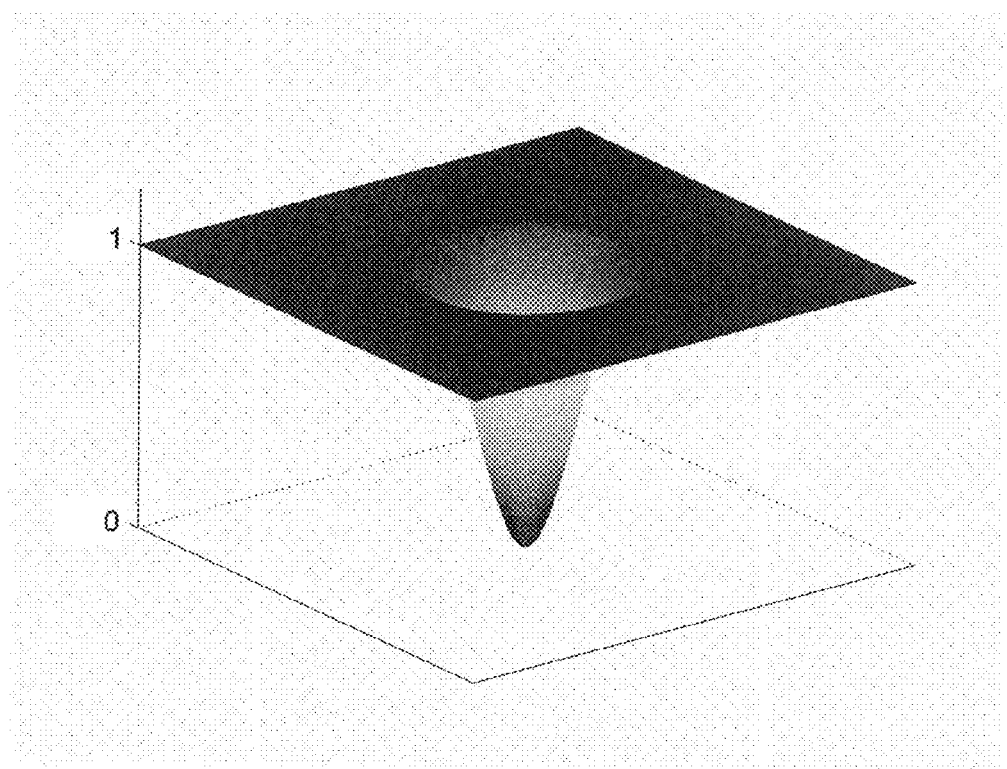
FIG. 19 is a diagram illustrating a graph of frequency characteristics of the filters created using the weighting method of FIG. 18.
Figure 20:
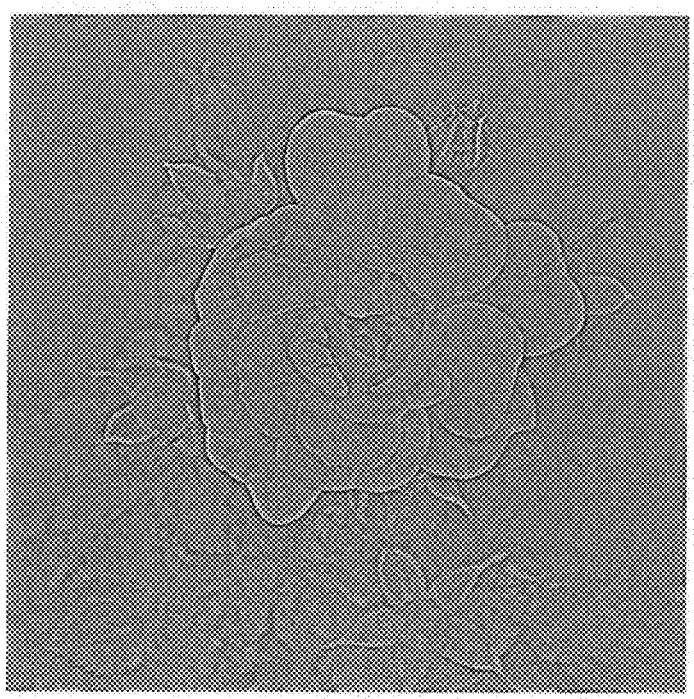
FIG. 20 is a view illustrating a processed image obtained by applying the filters obtained by the weighting method illustrated in FIG. 18 to the original image (FIG. 12).

FIG. 18 is a diagram illustrating a weighting method for creating filters using detail parts at level 1 in a pinwheel framelet of degree 7. As described above, the positions of numbers in the table correspond to the arrangement of the subband signals of the multiresolution decomposition (for the arrangement of the pinwheel framelet of degree 7, see FIG. 74). FIG. 19 is a diagram illustrating a graph of frequency characteristics of the filters created using the weighting method of FIG. 18. FIG. 20 is a view illustrating a processed image obtained by applying the filters obtained by the weighting method illustrated in FIG. 18 to the original image (FIG. 12).

As illustrated in FIG. 20, high-frequency portions corresponding to respective fine orientations can be obtained by creating filters using a pinwheel framelet of a high degree. As illustrated in FIGS. 19 and 11, it is found that the frequency passband is expanded toward lower frequency as the degree of filters created using the detailed parts at the same level 1 is higher.

Figure 23:
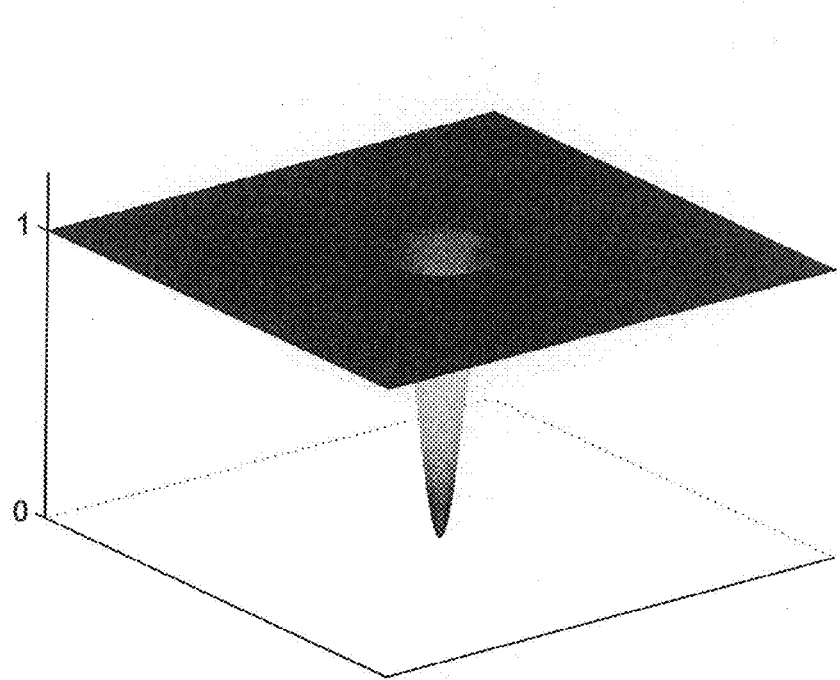
FIG. 23 is a diagram illustrating a graph of frequency characteristics of the filters obtained by the weighting method illustrated in FIGS. 21 and 22.
Figure 24:
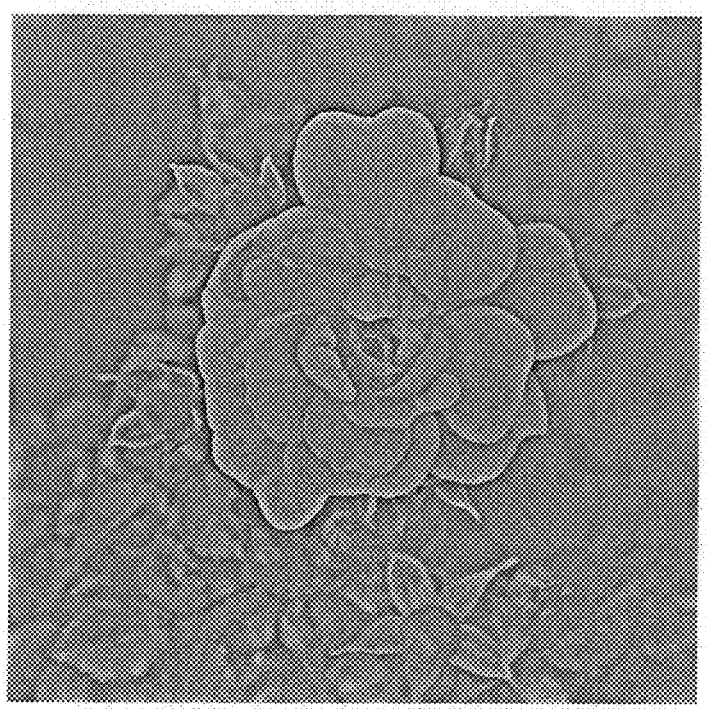
FIG. 24 is a view illustrating a processed image obtained by applying the filters obtained by the weighting method illustrated in FIGS. 21 and 22 to the original image (FIG. 12).

Also in the pinwheel framelet of degree 7, a wider variety of high-pass filters can be created by using the detail parts at level 2 in addition to the detail parts at level 1. FIGS. 21 and 22 are diagrams illustrating one example of still another weighting method for extracting the high-frequency portion. FIG. 23 is a diagram illustrating a graph of frequency characteristics of the filters obtained by the weighting method illustrated in FIGS. 21 and 22. FIG. 24 is a view illustrating a processed image obtained by applying the filters obtained by the weighting method illustrated in FIGS. 21 and 22 to the original image (FIG. 12).

As illustrated in FIGS. 23 and 24, it has been found that, also in the filters using the detail parts at levels 1 and 2, the frequency passband varies due to difference in degree; thus it has been found that a variety of filters can be created according to the difference in degree.

Figures 25, 26:
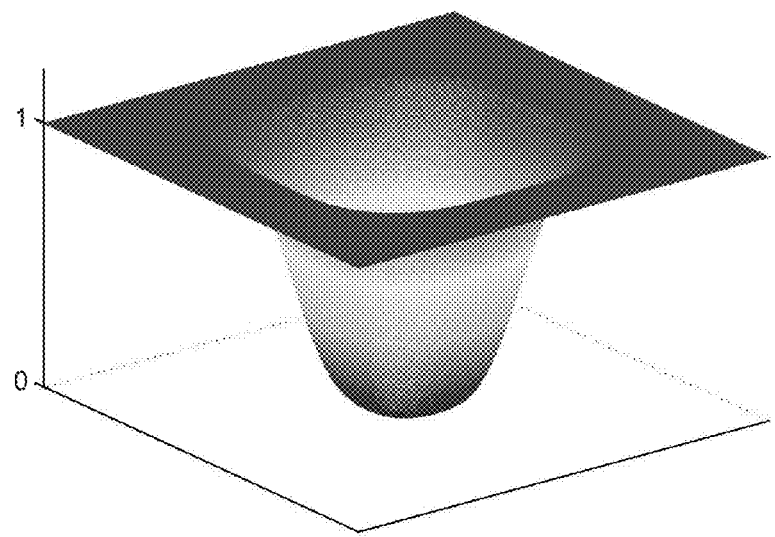
FIG. 25 is a diagram illustrating one example of a weighting method for creating filters using detail parts on the side farther from the approximate filter in the filter arrangement of the pinwheel framelet.
FIG. 26 is a diagram illustrating a graph of frequency characteristics of the filters obtained by the weighting method illustrated in FIG. 25.

While, in the above-described examples, the weighting unit 402d creates the filters by summing all the detail parts at a predetermined level or levels in the multiresolution decomposition, the weighting unit 402d is not limited to this, but can create a wider variety of filters, for example, by relatively amplifying the subband signals on the side farther from the approximate filter in the filter arrangement of the pinwheel framelet, or by relatively attenuating the subband signals on the side nearer to the approximate filter in the filter arrangement of the pinwheel framelet. More specifically, still more types of high-pass filters can be created by sequentially selecting and summing the subband signals of the detail parts from the side farther from the approximate part in a concentric manner around the approximate part, instead of summing all the subband signals of the detail parts. FIG. 25 is a diagram illustrating one example of a weighting method for creating filters using detail parts on the side farther from the approximate filter in the filter arrangement of the pinwheel framelet.

Figures 27, 28:
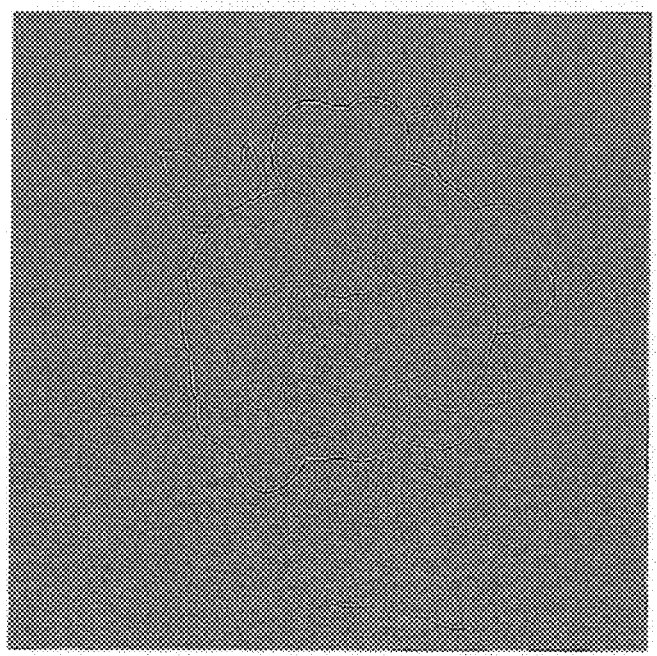
FIG. 27 is a view illustrating a processed image obtained by applying the filters obtained by the weighting method illustrated in FIG. 25 to the original image (FIG. 12).
FIG. 28 is a diagram illustrating one example of weighting for creating low-pass filters using the pinwheel framelet of degree 7.

As illustrated in FIG. 25, to extract higher-frequency components in the pinwheel framelet of degree 7, the weighting unit 402d sets the coefficients of a low-frequency part (periphery of the approximate part) to 0 in FIG. 18 mentioned above. FIG. 26 is a diagram illustrating a graph of frequency characteristics of the filters obtained by the weighting method illustrated in FIG. 25. FIG. 27 is a view illustrating a processed image obtained by applying the filters obtained by the weighting method illustrated in FIG. 25 to the original image (FIG. 12).

As illustrated in FIG. 27, it has been found that filters capable of extracting a higher-frequency part can be created by creating high-pass filters by summing only the detail parts on the side farther from the approximate filter in the filter arrangement in the pinwheel framelet.

1.2 Low-Pass Filter

While, in the above description, the explanation has been given on the creation example of the high-pass filters, the present invention is not limited to this, but can create low-pass filters by using and applying the same method to the low-frequency side. The same result can also be obtained by subtracting the result of processing by the high-pass filters from the original image, or by subtracting discrete Fourier transforms of the high-pass filters from a constant function 1. FIG. 28 is a diagram illustrating one example of weighting for creating the low-pass filters using the pinwheel framelet of degree 7.

As illustrated in FIG. 28, the weighting unit 402d performs weighting that can extract a low-frequency part by eliminating high-frequency components by setting, in contrast to the weighting method of FIG. 25, coefficients of detail parts on the side farther from the approximate filter in the filter arrangement to 0. More specifically, as illustrated in FIG. 28, the weighting unit 402d sets the coefficients of the subband signal corresponding to the approximate filter of the pinwheel framelet and of the subband signals corresponding to the detail filters that are positioned nearer to the approximate filter in the filter arrangement of the pinwheel framelet and that have low-frequency-side frequency characteristics to 1, and sets the coefficients of subband signals corresponding to the detail filters that are positioned farther from the approximate filter and that have high-frequency-side frequency characteristics to 0.

Figure 29:
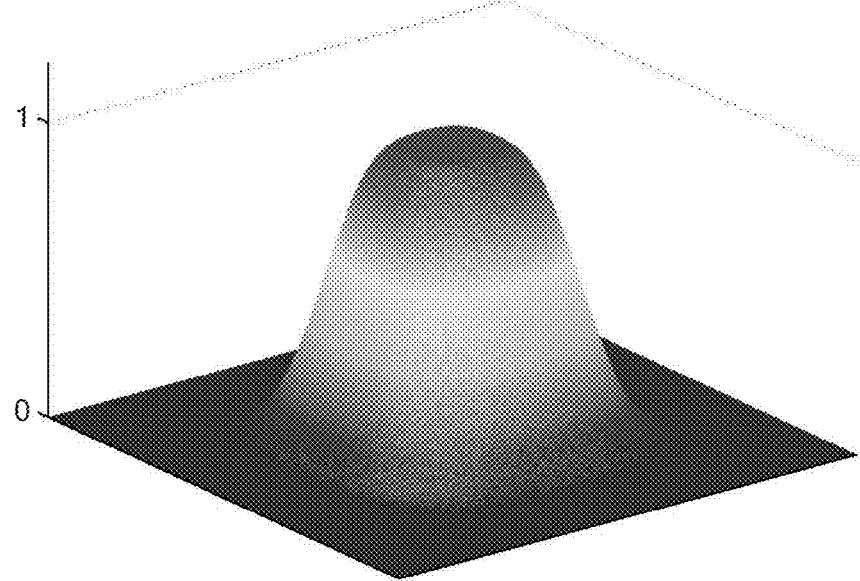
FIG. 29 is a diagram illustrating a graph of frequency characteristics of the low-pass filters obtained by the weighting method illustrated in FIG. 28.
Figure 30:
FIG. 30 is a view illustrating a processed image obtained by applying the low-pass filters obtained by the weighting method illustrated in FIG. 28 to the original image (FIG. 12).

FIG. 29 is a diagram illustrating a graph of frequency characteristics of the low-pass filters obtained by the weighting method illustrated in FIG. 28. FIG. 30 is a view illustrating a processed image obtained by applying the low-pass filters obtained by the weighting method illustrated in FIG. 28 to the original image (FIG. 12).

As illustrated in FIG. 30, it has been found that filters capable of extracting a low-frequency part can be created by creating low-pass filters by summing the detail parts on the side nearer to the approximate filter and the approximate part in the filter arrangement in the pinwheel framelet.

1.3 Band-Pass Filter and Band-Rejection Filter

Figures 31, 32:
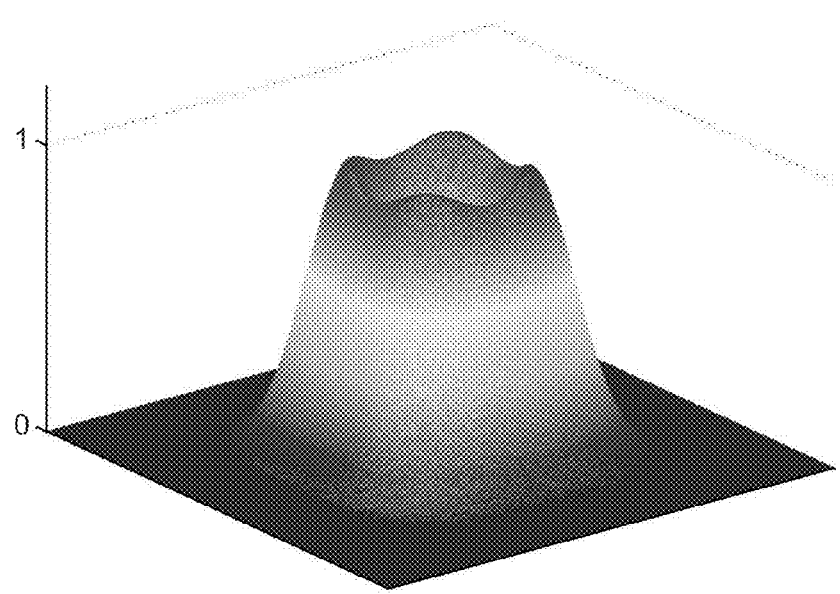
FIG. 31 is a diagram illustrating one example of weighting for creating band-pass filters using the pinwheel framelet of degree 7.
FIG. 32 is a diagram illustrating a graph of frequency characteristics of the band-pass filters obtained by the weighting method illustrated in FIG. 31.

As described above regarding the high-pass filters and the low-pass filters, the band-pass filters can be created by summing the subband signals of the detail parts in a concentric manner around the approximate part. The band-rejection filters can be obtained by creating filters by subtracting the result of processing by using the band-pass filters from the original image, or by subtracting discrete Fourier transforms of the band-pass filters from the constant function 1. FIG. 31 is a diagram illustrating one example of weighting for creating the band-pass filters using the pinwheel framelet of degree 7.

As illustrated in FIG. 31, in the weighting method of FIG. 28, the weighting unit 402*d* performs weighting that can extract band components between the high and low frequency bands by further setting the coefficient of the approximate part to 0. More specifically, as illustrated in FIG. 28, the weighting unit 402*d* sets the coefficient of the subband signal corresponding to the approximate filter of the pinwheel framelet to 0, sets the coefficients of the subband signals corresponding to the detail filters that are positioned nearer to the approximate filter in the filter arrangement of the pinwheel framelet and that have low-frequency-side frequency characteristics to 1, and sets the coefficients of the subband signals corresponding to the detail filters that are positioned farther from the approximate filter in the filter arrangement and that have high-frequency-side frequency characteristics to 0. The filter processing unit 402*a* sums the subband signals of the detail parts, and then performs scaling so that the maximum value of absolute values of discrete Fourier transform values of the subband signals is 1.

Figures 33, 34:
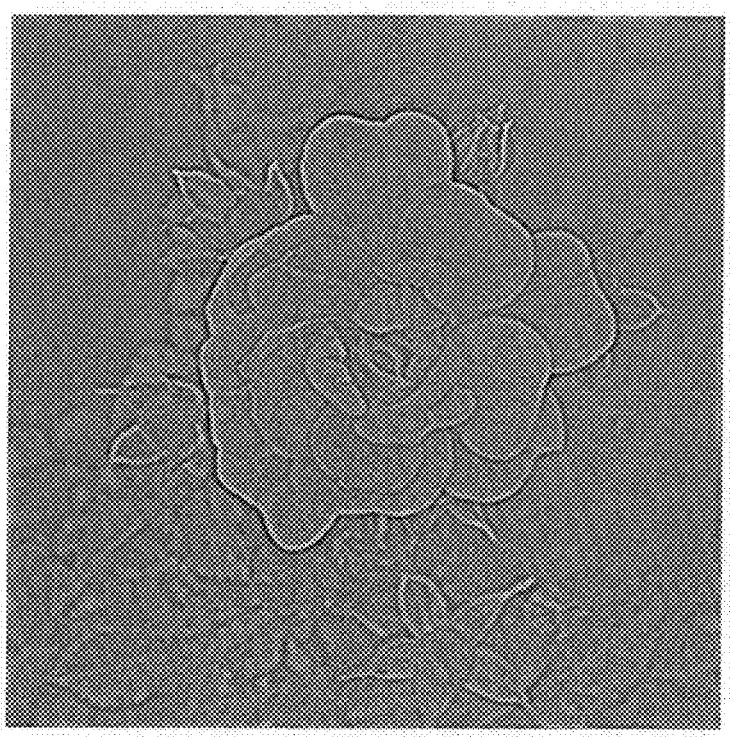
FIG. 33 is a view illustrating a processed image obtained by applying the band-pass filters obtained by the weighting method illustrated in FIG. 31 to the original image (FIG. 12).
FIG. 34 is a diagram illustrating one example of weighting for creating band-pass filters using detail parts at level 2 of the multiresolution decomposition by using the pinwheel framelet of degree 7.

FIG. 32 is a diagram illustrating a graph of frequency characteristics of the band-pass filters obtained by the weighting method illustrated in FIG. 31. As described above, the frequency characteristics are scaled so that the maximum value thereof is 1. FIG. 33 is a view illustrating a processed image obtained by applying the band-pass filters obtained by the weighting method illustrated in FIG. 31 to the original image (FIG. 12).

As illustrated in FIG. 33, it has been found that the band-pass filters capable of extracting band components between the high and low frequency bands can be created by creating band-pass filters by summing only the detail parts on the side nearer to the approximate filter except for the approximate part in the filter arrangement in the pinwheel framelet.

While, in the example of FIG. 31, the filters are created using only the detail parts at level 1, the present invention is not limited to this, but can create a variety of band-pass filters by using detail parts at another level (such as level 2). FIG. 34 is a diagram illustrating one example of weighting for creating band-pass filters using detail parts at level 2 of the multiresolution decomposition by using the pinwheel framelet of degree 7.

As illustrated in FIG. 34, in the weighting method of FIG. 31, the weighting unit 402*d* performs weighting that can extract band components between the high and low frequency bands by using detail parts on the side nearer to the approximate filter in the filter arrangement at level 2 instead of level 1. The filter processing unit 402*a* sums the subband signals of the detail parts, and then performs scaling so that the maximum value of absolute values of discrete Fourier transform values of the subband signals is 1.

Figure 35:
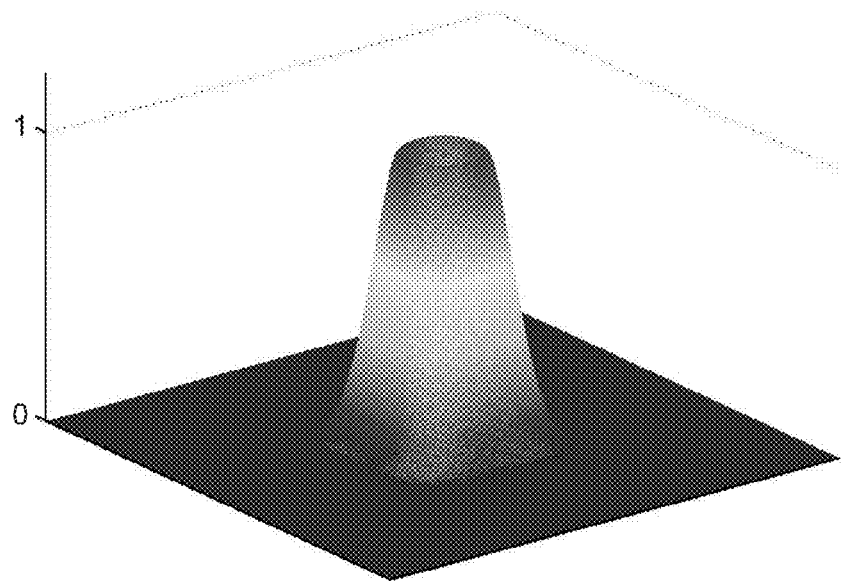
FIG. 35 is a diagram illustrating a graph of frequency characteristics of the band-pass filters obtained by the weighting method illustrated in FIG. 34.
Figure 36:
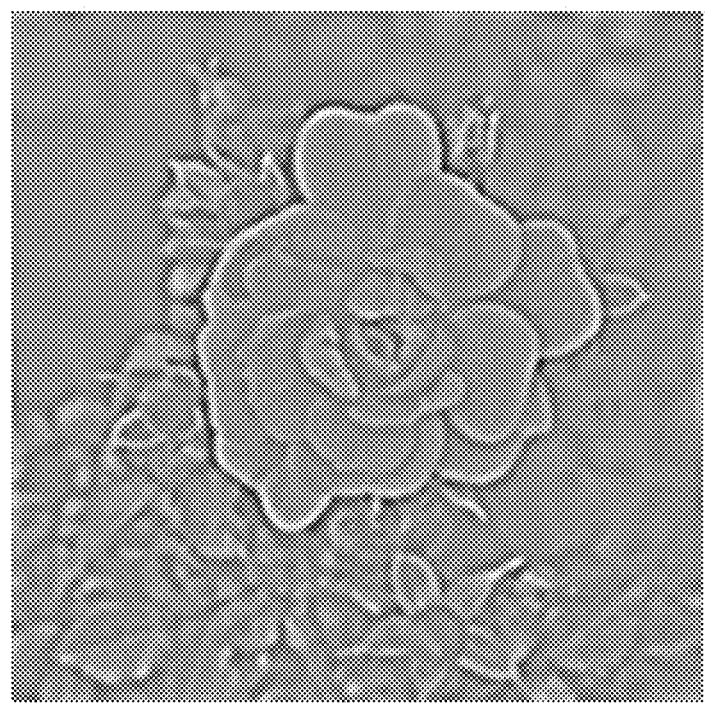
FIG. 36 is a view illustrating a processed image obtained by applying the band-pass filters obtained by the weighting method illustrated in FIG. 34 to the original image (FIG. 12).

FIG. 35 is a diagram illustrating a graph of frequency characteristics of the band-pass filters obtained by the weighting method illustrated in FIG. 34. FIG. 36 is a view illustrating a processed image obtained by applying the band-pass filters obtained by the weighting method illustrated in FIG. 34 to the original image (FIG. 12).

As illustrated in FIG. 36, it has been found that a processed image with components through high-pass filters on the slightly lower-frequency side is obtained by the band-pass filters using the detail parts at level 2 than by the band-pass filters using the detail parts at level 1.

1.4 Application Examples

An explanation will be given on application examples in each of which the above-described filters are used for creation of a hybrid image or a superhybrid image.

The hybrid image was announced in 2006 by Oliva, Torralba and Schyns as a two-layer image in which different images appear in one image when viewed from a "distant position" and when viewed from a "near position" (see A. Oliva, A. Torralba, P. G. Schyns, "Hybrid images", ACM Transactions on Graphics (TOG), 2006).

The filters according to the present embodiment can also create a two-layer hybrid image. Furthermore, beyond the conventional two-layer hybrid image, the present embodiment can create a three-layer hybrid image in which three different images appear when viewed from a "distant position", from a "slightly distant position", and from a "near position". The three-layer hybrid image that is made possible by the present embodiment is in particular referred to as a "superhybrid image". In the following examples, a creation example of the two-layer hybrid image by the filters of the present embodiment will first be explained, and a creation example of the superhybrid image will then be explained.

Figure 37:
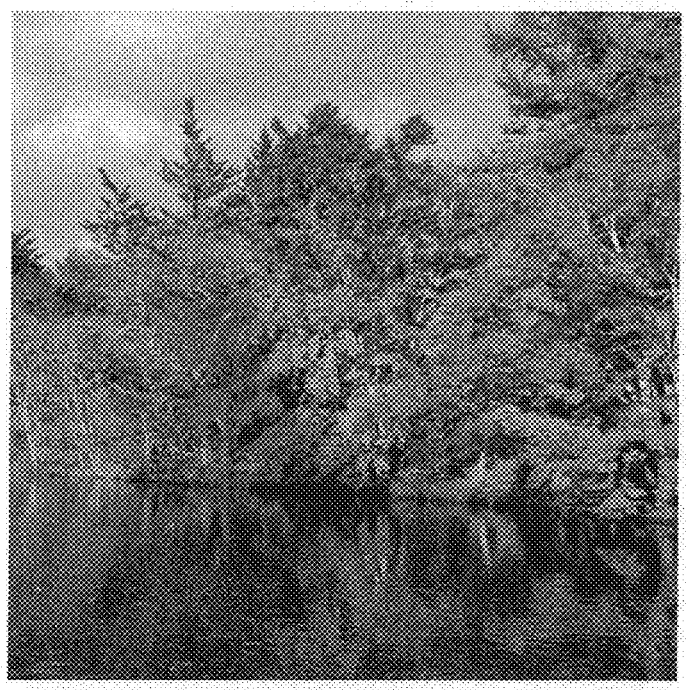
FIG. 37 is a view illustrating an image 1 used as one original image.
Figure 38:
FIG. 38 is a view illustrating an image 2 used as the other original image.

An explanation will be given on an example of creating a color hybrid image using the pinwheel framelet of degree 7. First, two original images to be used for a hybrid image are selected. In the present embodiment, the example will be explained in which the images in FIGS. 37 and 38 are used as the original images. FIG. 37 is a view illustrating an image 1 used as one of the original images, and FIG. 38 is a view illustrating an image 2 used as the other of the original images.

Figures 39, 40:
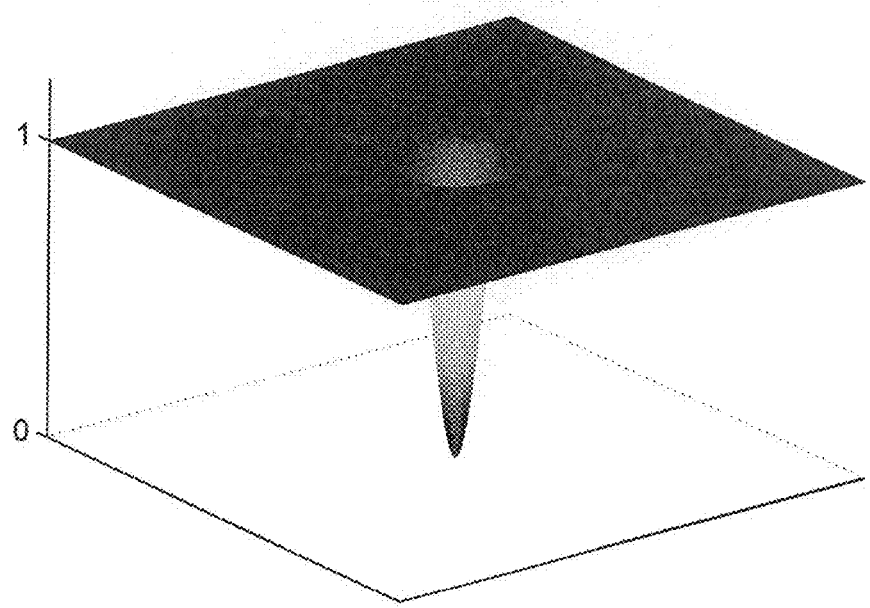
FIG. 39 is a diagram illustrating a weighting method for high-pass filters applied to the image 1 in an example of the embodiment.
FIG. 40 is a diagram illustrating a graph of frequency characteristics of the high-pass filters obtained by the weighting method illustrated in FIG. 39.

Because the images 1 and 2 are color images, the color space conversion unit 402*f* converts the color space to the CIELAB color space if necessary. The filter processing unit 402*a* applies high-pass filters to the image 1 and low-pass filters to the image 2. FIG. 39 is a diagram illustrating the weighting method for the high-pass filters applied to the image 1 in this example.

Figures 41, 42:
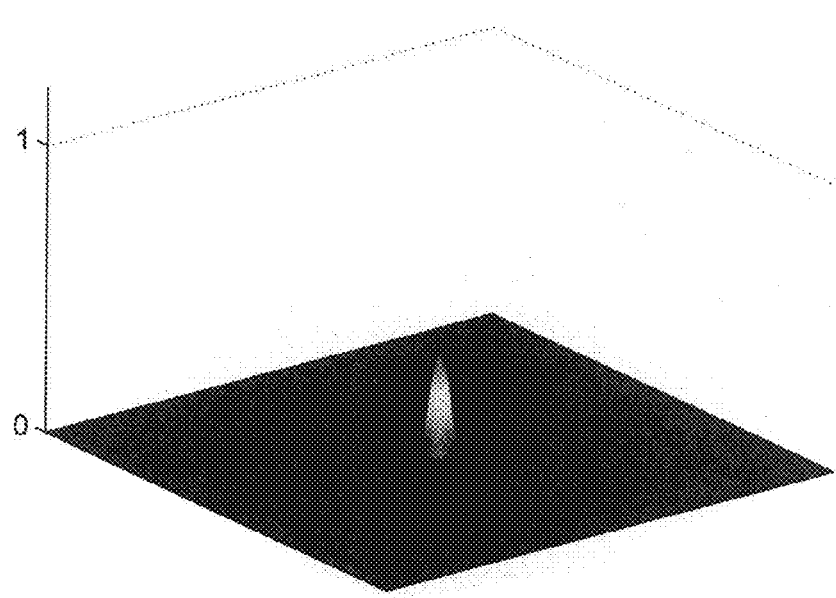
FIG. 41 is a diagram illustrating a weighting method for low-pass filters applied to the image 2 in the example of the embodiment.
FIG. 42 is a diagram illustrating a graph of frequency characteristics of the low-pass filters obtained by the weighting method illustrated in FIG. 41.

As illustrated in FIG. 39, the weighting unit 402*d* created the high-pass filters by summing detail parts at level 1 and detail parts at level 2 in the pinwheel framelet of degree 7. FIG. 40 is a diagram illustrating a graph of frequency characteristics of the high-pass filters obtained by the weighting method illustrated in FIG. 39. FIG. 41 is a diagram illustrating the weighting method for the low-pass filters applied to the image 2, as opposed to the high-pass filters applied to the image 1, in this example. All weighting factors are 0 if they are not written at levels lower than the level illustrated as in FIG. 41. The same applies to the tables to be illustrated below if not otherwise specified.

As illustrated in FIG. 41, the weighting unit 402*d* performs weighting that can extract a low-frequency part by eliminating high-frequency components by using filters at level 4 under a setting in which coefficients of detail parts on the side farther from the approximate filter in the filter arrangement at level 4 are 0. More specifically, as illustrated in FIG. 41, at level 4 of the multiresolution decomposition, the weighting unit 402*d* sets the coefficients of the detail parts on the low-frequency side that are positioned nearer to the approximate filter and of the approximate part in the filter arrangement of the pinwheel framelet to ⅓, and sets the coefficients of the detail parts on the high-frequency side that are positioned farther from the approximate filter in the filter arrangement to 0. FIG. 42 is a diagram illustrating a graph of frequency characteristics of the low-pass filters obtained by the weighting method illustrated in FIG. 41.

Figure 43:
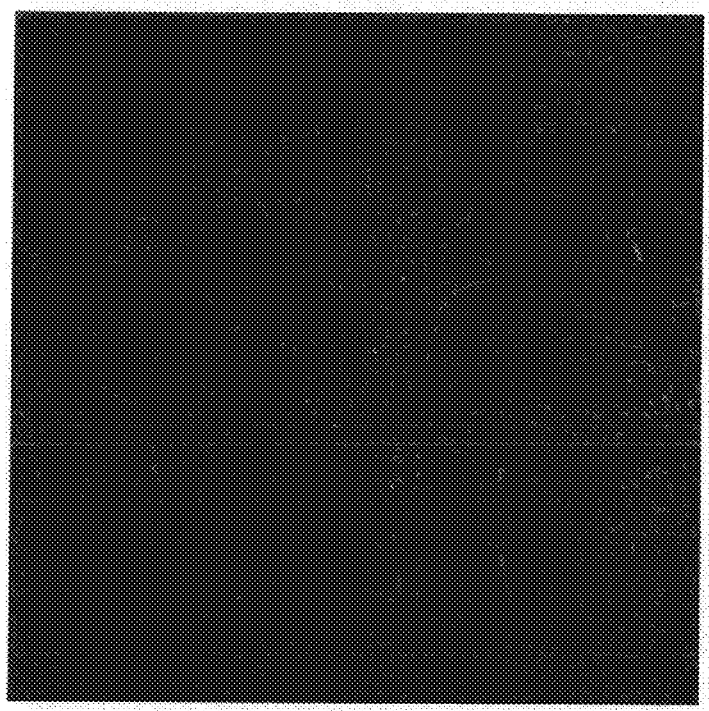
FIG. 43 is a view illustrating a processed image obtained by applying the high-pass filters obtained by the weighting method illustrated in FIG. 39 to the image 1 (FIG. 37).
Figure 44:
FIG. 44 is a view illustrating a processed image obtained by applying the low-pass filters obtained by the weighting method illustrated in FIG. 41 to the image 2 (FIG. 38).

The filter processing unit 402*a* applied the above-described high-pass filters to the image 1, and the above-described low-pass filters to the image 2, and, as a result, succeeded in obtaining the following respective processed images. FIG. 43 is a view illustrating the processed image obtained by applying the high-pass filters obtained by the weighting method illustrated in FIG. 39 to the image 1 (FIG. 37). FIG. 44 is a view illustrating the processed image obtained by applying the low-pass filters obtained by the weighting method illustrated in FIG. 41 to the image 2 (FIG. 38). While the same table was used for L*, a*, and b*, different tables may be used for the respective color components.

Figure 45:
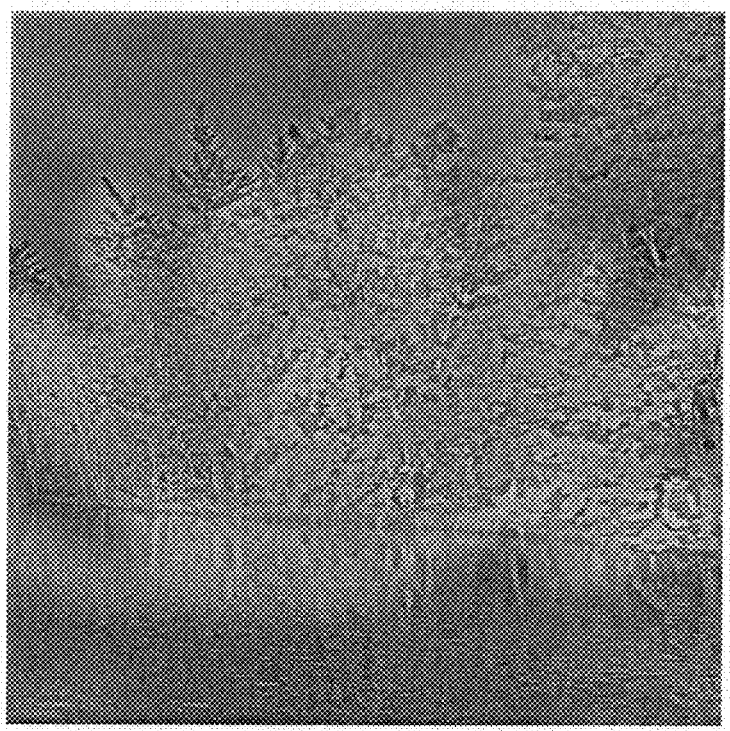
FIG. 45 is a view illustrating a hybrid image obtained by the example of the embodiment.

Then, the hybrid generating unit 402*h* obtained the following hybrid image by summing the two processing results, scaling L so as to be 0 to 100, and, if necessary, converting the color space through the processing performed by the color space conversion unit 402*f*. FIG. 45 is a view illustrating the hybrid image obtained by this example.

As illustrated in FIG. 45, this image appears to be a flower of a water lily when viewed from a distant position, and appears to be autumn leaves and a pond when viewed from a near position. For human vision, high-frequency portions are difficult to see from a distant position, and low-frequency portions are difficult to see from a near position. Hence, it has been verified that a hybrid image taking advantage of the human vision can be formed by combination of the high-pass filters and the low-pass filters according to the present embodiment.

Figure 46:
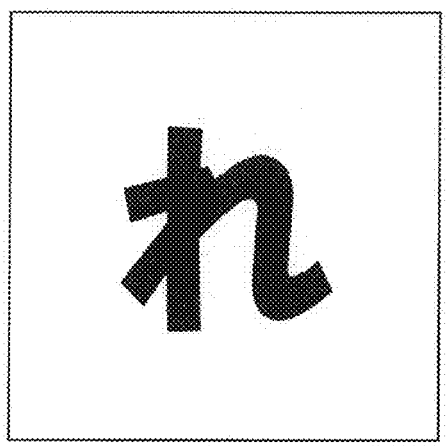
FIG. 46 is a diagram illustrating an image 1 used as a first original image.
Figure 47:
FIG. 47 is a diagram illustrating an image 2 used as a second original image.
Figure 48:
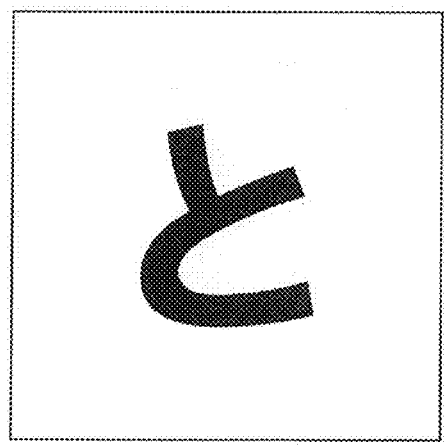
FIG. 48 is a diagram illustrating an image 3 used as a third original image.

Next, a creation example of a superhybrid image using a pinwheel framelet of degree 9 will be explained. First, three original images are prepared to form the superhybrid image. In the present embodiment, an example will be explained in which the images in FIGS. 46 to 48 are used as the original images (grayscale) of the superhybrid image. FIG. 46 is a diagram illustrating an image 1 used as a first original image; FIG. 47 is a diagram illustrating an image 2 used as a second original image; and FIG. 48 is a diagram illustrating an image 3 used as a third original image.

Then, the filter processing unit 402*a* applies filters for the image 1 to the image 1, filters for the image 2 to the image 2, and filters for the image 3 to the image 3. FIGS. 49 and 50 are diagrams illustrating the weighting method for the filters for the image 1 applied to the image 1 in this example. In the same manner as the above description, the positions of numbers in the table correspond to the arrangement of the subband signals of the multiresolution decomposition (for the arrangement of the pinwheel framelet of degree 9, see FIG. 75 to be explained later).

Figure 51:
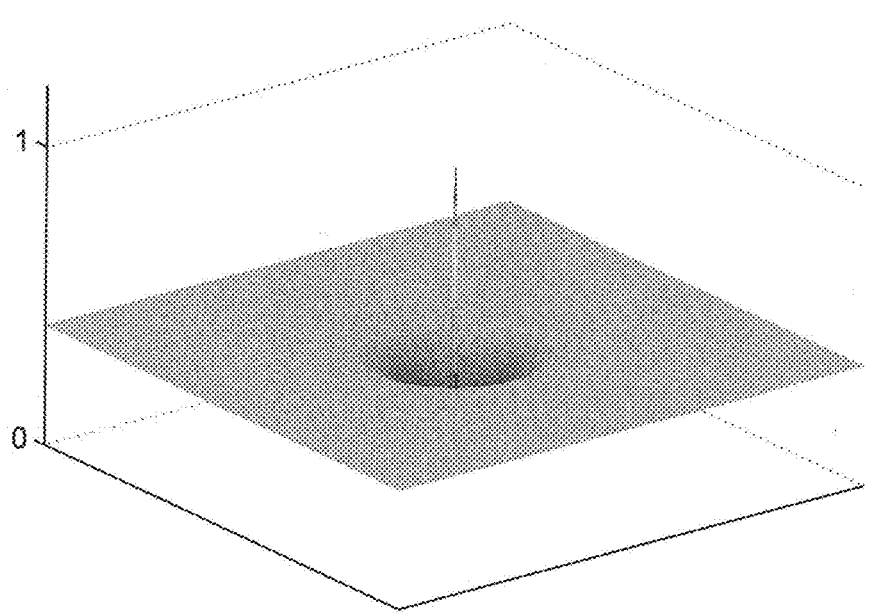
FIG. 51 is a diagram illustrating a graph of frequency characteristics of the filters for the image 1 obtained by the weighting method illustrated in FIGS. 49 and 50.

The weighting unit 402*d* created the filters in the pinwheel framelet of degree 9 by setting the coefficients of the detail parts at level 1 to 0.4 as illustrated in FIG. 49 and the coefficient of the approximate part at level 5 to 1 as illustrated in FIG. 50, and performing weighting. The weighting factors at level 2 to 4 are all set to 0. FIG. 51 is a diagram illustrating a graph of frequency characteristics of the filters for the image 1 obtained by the weighting method illustrated in FIGS. 49 and 50. The filters for the image 1 pass not only high-frequency components but also extremely low frequency components. FIGS. 52 and 53 are diagrams illustrating the weighting method for the filters for the image 2 applied to the image 2 in this example.

As illustrated in FIGS. 52 and 53, the weighting unit 402*d* performs weighting that can extract band components between the high and low frequency bands by setting the coefficient of the approximate part to 0 in the pinwheel framelet of degree 9. More specifically, as illustrated in FIG. 52, at level 3 of the multiresolution decomposition, the weighting unit 402*d* sets the coefficient of the subband signal corresponding to the approximate filter of the pinwheel framelet to 0, sets the coefficients of the subband signals corresponding to the detail filters that are positioned nearer to the approximate filter in the filter arrangement of the pinwheel framelet and that have low-frequency-side frequency characteristics to 0.2, and sets the coefficients of the subband signals corresponding to the detail filters that are positioned farther from the approximate filter in the filter arrangement and that have high-frequency-side frequency characteristics to 0. In addition, as illustrated in FIG. 53, at level 4, the weighting unit 402*d* sets the coefficient of the subband signal corresponding to the approximate filter of the pinwheel framelet to 0, and sets the coefficients of the subband signals corresponding to the detail filters to 0.6.

Figures 54, 55:
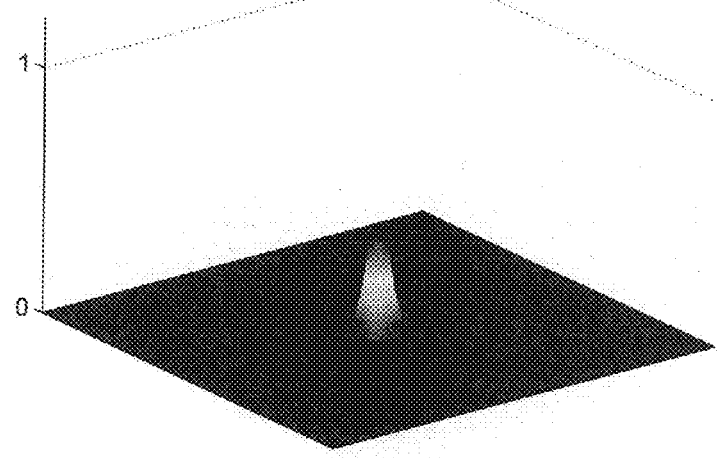
FIG. 54 is a diagram illustrating a graph of frequency characteristics of band-pass filters obtained by the weighting method illustrated in FIGS. 52 and 53.
FIG. 55 is a diagram illustrating a weighting method for filters for the image 3 applied to the image 3 in the example of the embodiment.

FIG. 54 is a diagram illustrating a graph of frequency characteristics of band-pass filters obtained by the weighting method illustrated in FIGS. 52 and 53. As illustrated in FIG. 54, band-pass filters that can extract band components between the high and low frequency bands were successfully created. FIG. 55 is a diagram illustrating the weighting method for the filters for the image 3 applied to the image 3 in this example.

As illustrated in FIG. 55, the weighting unit 402*d* performs weighting that can extract low-frequency components by setting only the coefficient of the approximate part to 1 at level 4 of the multiresolution decomposition using the pinwheel framelet of degree 9. More specifically, as illustrated in FIG. 55, at level 4 of the multiresolution decomposition, the weighting unit 402*d* sets the coefficient of the subband signal corresponding to the approximate filter of the pinwheel framelet to 1, and sets the coefficients of the subband signals corresponding to the detail filters to 0.

Figure 56:
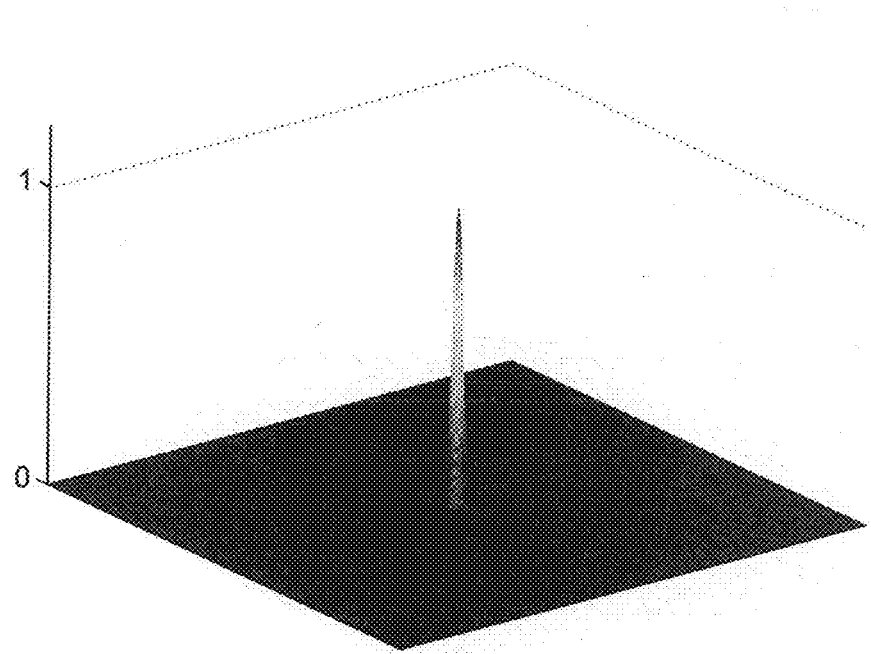
FIG. 56 is a diagram illustrating a graph of frequency characteristics of low-pass filters obtained by the weighting method illustrated in FIG. 55.

FIG. 56 is a diagram illustrating a graph of frequency characteristics of low-pass filters obtained by the weighting method illustrated in FIG. 55. As illustrated in FIG. 56, band-pass filters that can extract the low-frequency components were successfully created.

Figure 57:
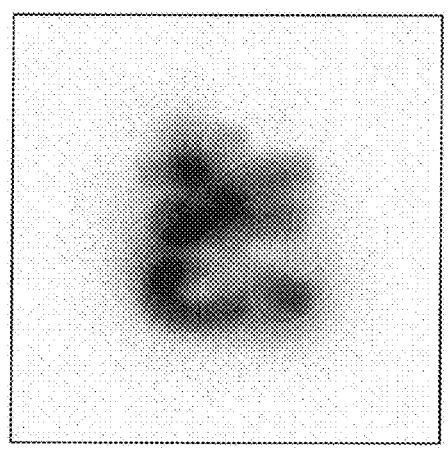
FIG. 57 is a view illustrating a superhybrid image created by the example of the embodiment.

As described above, the image processing apparatus 400 creates the filters that pass high frequencies and extremely low frequencies for the image 1, the band-pass filters for the image 2, and the low-pass filters for the image 3, and applies these filters to the respective original images through processing performed by the filter processing unit 402*a*. Then, the hybrid generating unit 402*h* sums the results obtained by processing the images 1 to 3 through the filters, and then normalizes the sum, thus generating an image as a superhybrid image. FIG. 57 is a view illustrating the superhybrid image created by this example.

Figure 58:
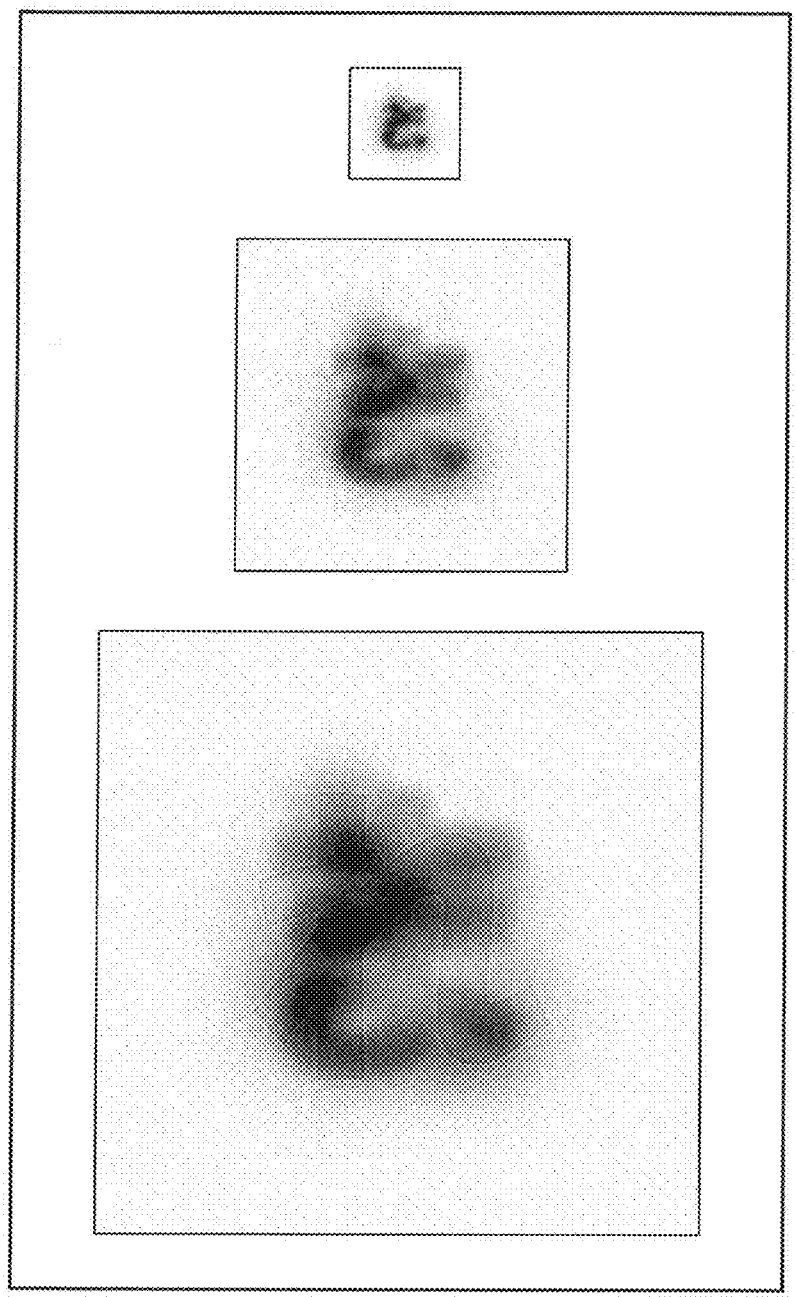
FIG. 58 is a diagram in which the same hybrid image (FIG. 57) is arranged in different sizes.

As illustrated in FIG. 57, the superhybrid image created by the present embodiment appears to be "と" (corresponding to the image 3 to which the low-pass filters are applied) when viewed from a distance, "ま" (corresponding to the image 2 to which the band-pass filters are applied) when viewed from a slightly nearer position, and "ん" (corresponding to the image 1 to which the filters that pass high frequencies and extremely low frequencies are applied) when viewed from a near position. The image 1 of "ん" is processed so as to contain not only high frequencies but also extremely low frequencies, and thereby is easy to read without being turned into only edges. The low frequencies contained in "ん" keep the shape from being distinguished when it is viewed from a distance where high frequencies are not visible. This also brings about an effect that other characters are not affected. FIG. 58 is a diagram in which the same hybrid image (FIG. 57) is arranged in different sizes. As illustrated in FIG. 58, it has successfully been demonstrated that changing the size of the image, instead of placing at a distance, varies the appearance of the three types.

1.5 Comparison with Prior Art

The filters without orientation selectivity (such as the high-pass filters, the low-pass filters, the band-pass filters, and the band-rejection filters) are conventionally created by various methods. Other filters are known, such as filters created by simply dividing a frequency range into 1 and 0, Butterworth filters, and Gaussian filters using Gaussian functions (see Non Patent Literature 4). Although these filters excel in ease of creation, they are not FIR filters, but IIR filters. In contrast, as in the present embodiment, FIR filters can be obtained by creating filters using a pinwheel framelet. The FIR filters also excel in performance as filters as illustrated in the examples.

2. Band-Pass Filter and Band-Rejection Filter with Orientation Selectivity

An explanation will be given on various creating methods of filters with orientation selectivity and application examples of the filters (reduction in periodic noise, creation of floating illusion, and analysis of letter-row tilt illusion).

Because of having orientation selectivity, the pinwheel framelet has a characteristic of being capable of creating band-pass filters having specific orientation selectivity. Band-rejection filters with orientation selectivity are obtained in the same manner by creating filters by subtracting the result of processing by the band-pass filters from an original image, or by subtracting discrete Fourier transforms of the band-pass filters from the constant function 1. According to the present embodiment, high-pass filters and low-pass filters can also have orientations. The explanation of this example includes these filters and filters with orientation selectivity that pass both the high and low frequency bands, in the band-pass filters with orientation selectivity.

2.1 Creating Methods

Figures 59, 60:
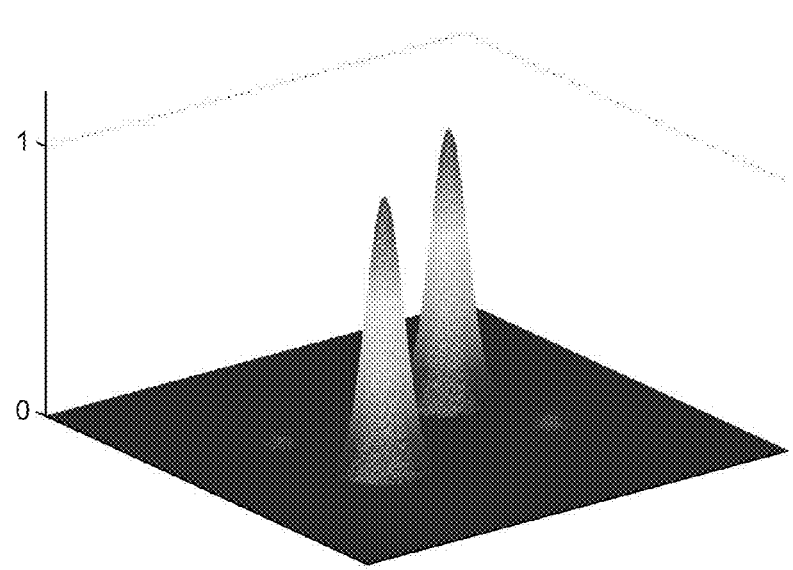
FIG. 59 is a diagram illustrating one example of a weighting method for creating filters with orientation selectivity in an example of the embodiment.
FIG. 60 is a diagram illustrating a graph of frequency characteristics of the filters with orientation selectivity obtained by the weighting method illustrated in FIG. 59.

A creation example of band-pass filters with orientation selectivity using the pinwheel framelet of degree 7 will be explained. Filters with orientation selectivity can be created by selecting subband signals of appropriate parts in accordance with orientations of filters to be created, summing the selected subband signals with appropriate weights, and then performing scaling so that the maximum value of absolute values of discrete Fourier transform values of the subband signals is 1. FIG. 59 is a diagram illustrating one example of a weighting method for creating filters with orientation selectivity in this example.

As illustrated in FIG. 59, the weighting unit 402*d* performs weighting that amplifies subband signals corresponding to detail filters that have predetermined orientations and attenuates the other subband signals in the pinwheel framelet. More specifically, as illustrated in FIG. 59, at level 2 of the multiresolution decomposition using the pinwheel framelet of degree 7, the weighting unit 402*d* sets the weighting factors of subband signals corresponding to detail filters that have an orientation at a predetermined positive angle relative to the orthogonal axis to s (1/maximum value of absolute values of discrete Fourier transform values of the subband signals), and sets the coefficients of the other detail parts and the approximate part to 0. The filter processing unit 402*a* sums the subband signals of the detail parts, and then performs scaling so that the maximum value of absolute values of discrete Fourier transform values of the subband signals is 1. FIG. 60 is a diagram illustrating a graph of frequency characteristics of the filters with orientation selectivity obtained by the weighting method illustrated in FIG. 59.

Figure 61:
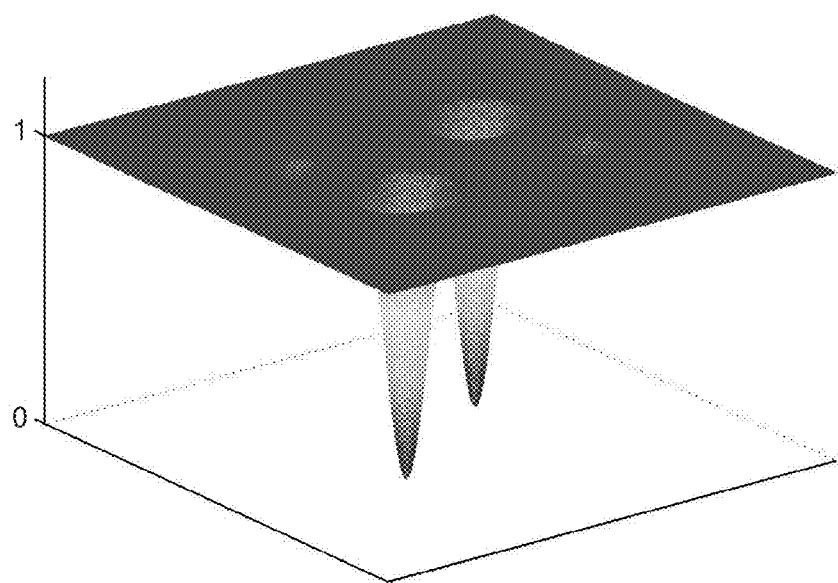
FIG. 61 is a diagram illustrating a graph of a frequency characteristic function of band-rejection filters with orientation selectivity created by subtracting discrete Fourier transforms of the filters from a constant function 1.

The band-rejection filters with orientation selectivity can also be created by subtracting discrete Fourier transforms of the filters from the constant function 1. FIG. 61 is a diagram illustrating a graph of a frequency characteristic function of the band-rejection filters with orientation selectivity created by subtracting the discrete Fourier transforms of the filters from the constant function 1.

2.2 Application to Noise Reduction

The following describes an application example in which periodic noise is reduced by using the filters with orientation selectivity created as described above.

Figure 62:
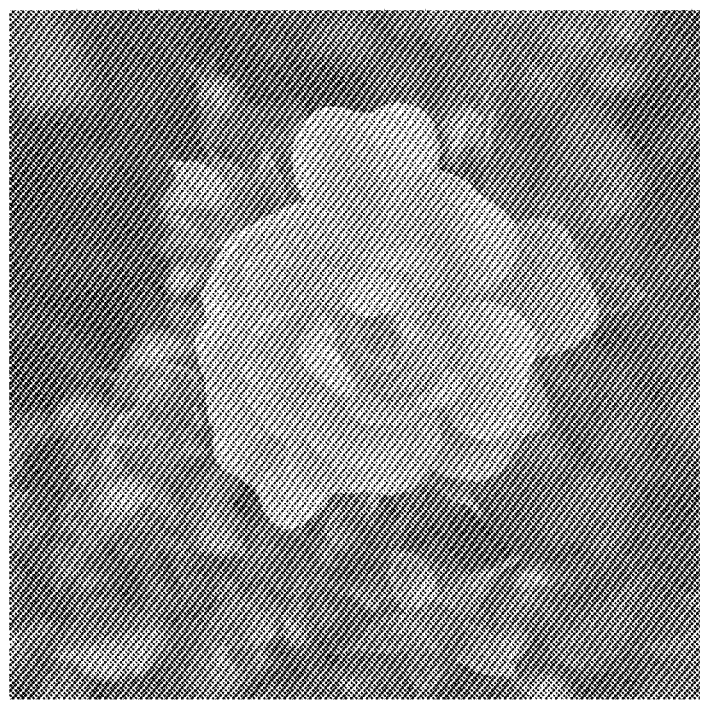
FIG. 62 is a view illustrating an image obtained by mixing periodic noise into the original image (FIG. 12).

An image used for verification of the noise reduction function of the filters is prepared by adding the periodic noise to the original image of FIG. 12 (for a method for adding the periodic noise, see Non Patent Literature 5 by McAndrew). FIG. 62 is a view illustrating the image obtained by mixing the periodic noise into the original image (FIG. 12).

Figure 63:
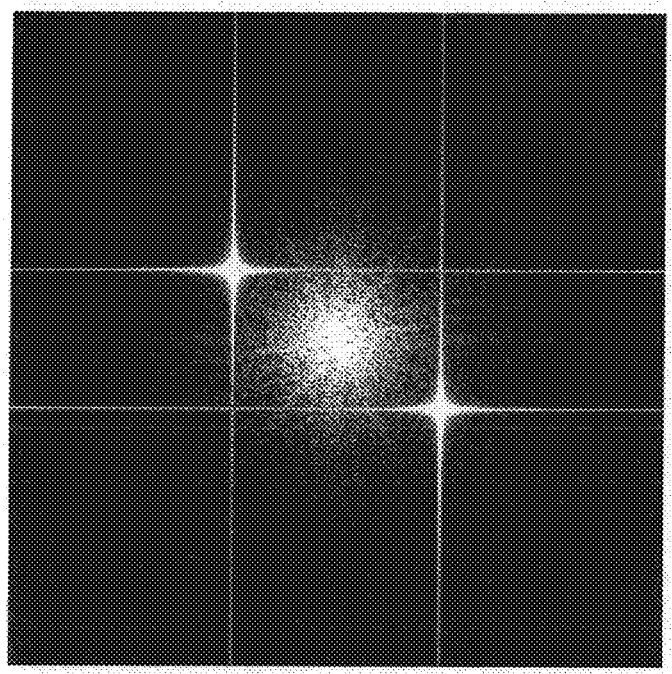
FIG. 63 is a diagram illustrating a two-dimensional plot of frequency characteristics of the image mixed with the periodic noise (FIG. 62).

The image containing the noise illustrated in FIG. 62 is subjected to calculation by the same method as that for graphs of frequency characteristics to create a two-dimensional grayscale plot. FIG. 63 is a diagram illustrating the two-dimensional plot of frequency characteristics of the image mixed with the periodic noise (FIG. 62). FIG. 63 displays the plot after being scaled so as to be easily viewable.

The above-described band-rejection filters with orientation selectivity, which are created by subtracting discrete Fourier transforms of the filters obtained by the weighting method of FIG. 59 from the constant function 1, are filters that are created by adapting the frequency characteristics for the noise reduction of the image.

Figure 64:
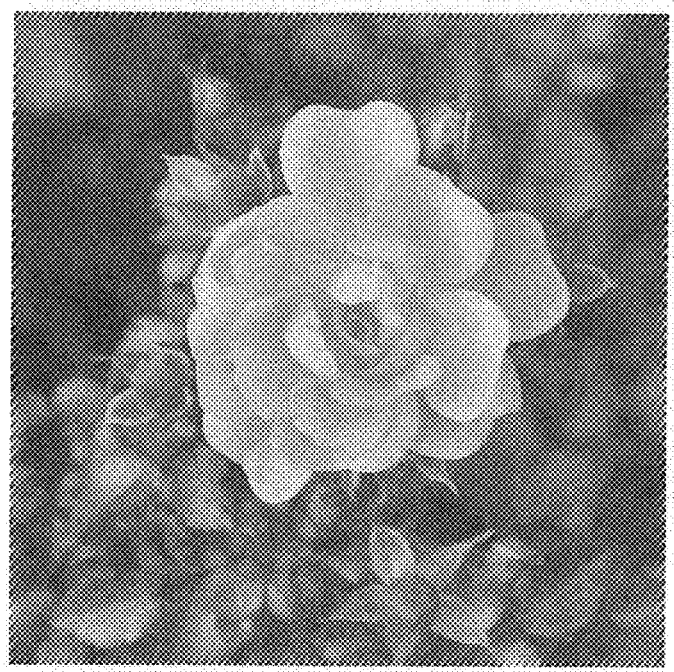
FIG. 64 is a view illustrating a processed image obtained by applying the band-rejection filters with orientation selectivity to the image mixed with the periodic noise (FIG. 62).

A processed image is obtained by applying the band-rejection filters with orientation selectivity to the image mixed with the periodic noise in FIG. 62 through processing performed by the filter processing unit 402*a*. FIG. 64 is a view illustrating the processed image obtained by applying the band-rejection filters with orientation selectivity to the image mixed with the periodic noise (FIG. 62).

Figure 65:
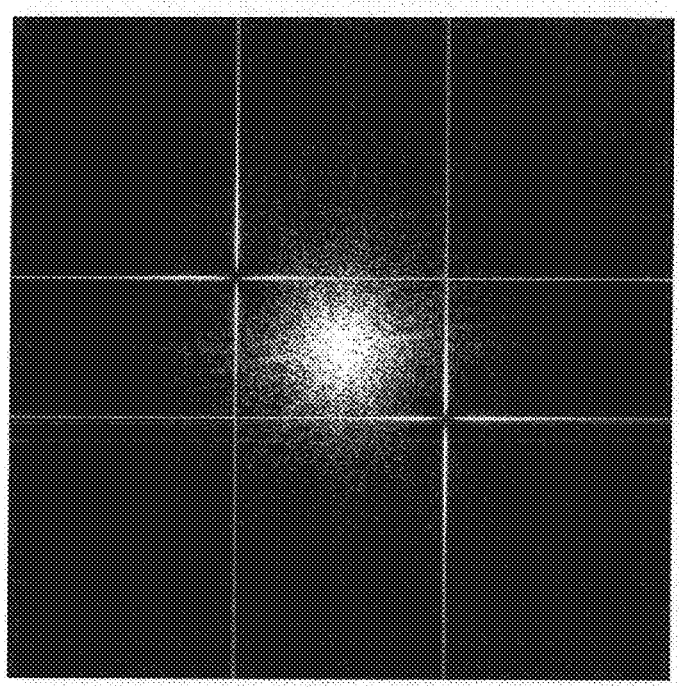
FIG. 65 is a diagram illustrating a two-dimensional plot of frequency characteristics of the processed image (FIG. 64).

The image after the noise reduction illustrated in FIG. 64 is subjected to calculation by the same method as that for graphs of frequency characteristics to create a two-dimensional grayscale plot. FIG. 65 is a diagram illustrating a two-dimensional plot of frequency characteristics of the processed image (FIG. 64). FIG. 65 also displays the plot after being scaled so as to be easily viewable.

Figure 66:
FIG. 66 is a view illustrating the original image (FIG. 12) with a peripheral portion thereof cut off for comparison.
Figure 67:
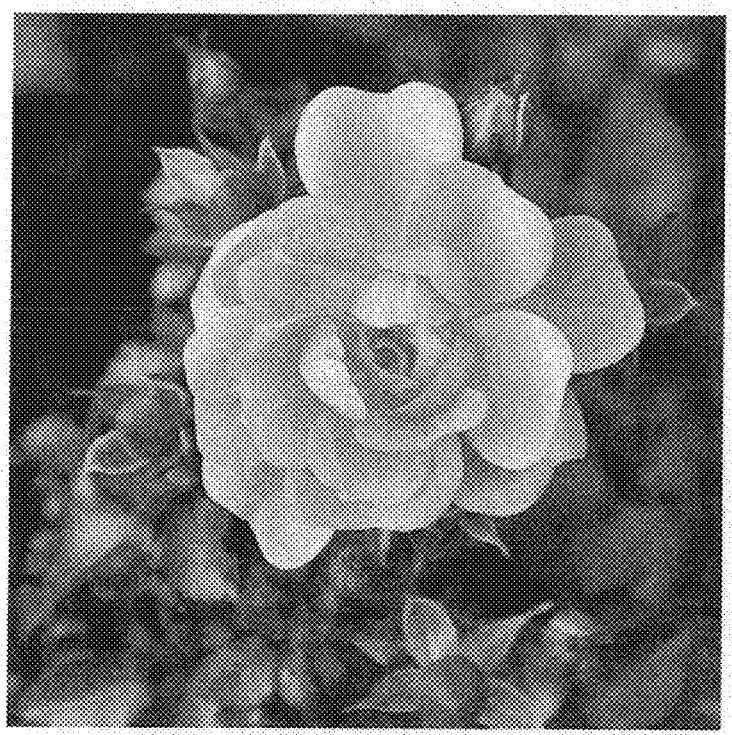
FIG. 67 is a view illustrating the processed image (FIG. 64) with a peripheral portion thereof cut off.

As illustrated in FIG. 65, characteristic orientation components are more attenuated than those in FIG. 63. Distortions remain at edges of the image without modification as illustrated in FIG. 64. Hence, a peripheral portion was cut off by processing performed by the filter processing unit 402a. FIG. 66 is a view illustrating the original image (FIG. 12) with a peripheral portion thereof cut off for comparison, and FIG. 67 is a view illustrating the processed image (FIG. 64) with the peripheral portion thereof cut off.

As illustrated in FIGS. 66 and 64, the use of the band-rejection filters with orientation selectivity created in this example succeeded in almost completely eliminating the periodic noise. While filters, such as filters created by simply dividing a frequency range into 1 and 0 and Butterworth filters, are conventionally known as filters for noise reduction, they are all IIR filters and are not FIR filters (see Non Patent Literature 5 (McAndrew) and Non Patent Literature 4 (Gonzalez and Woods)). In contrast, FIR filters can be obtained by creating filters with orientation selectivity using the pinwheel framelet of the present embodiment.

2.3 Creation of Floating Illusion Image

Figure 68:
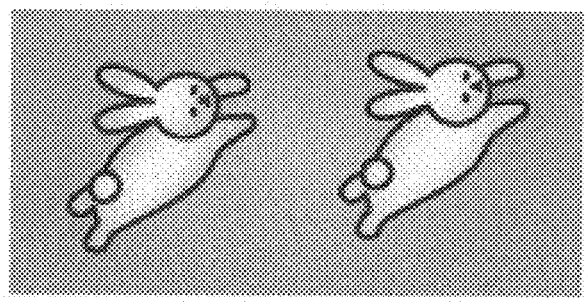
FIG. 68 is a view illustrating an original image used for creating a floating illusion image.

An explanation will be given on an application example in which filters with orientation selectivity using the pinwheel framelet of the present embodiment are created and used for creation of a floating illusion image. FIG. 68 is a view illustrating an original image used for creating the floating illusion image. FIGS. 69 and 70 are diagrams illustrating one example of a weighting method for creating band-pass filters with orientation selectivity that generate the floating illusion. Of the values 0, 1, and 2 in the table, "0" means that the corresponding subband signals are multiplied by 0, that is, deleted; "1" means that the corresponding subband signals are multiplied by 1, that is, not processed; and "2" means that the corresponding subband signals are amplified by a factor of 2.

As illustrated in FIGS. 69 and 70, the weighting unit 402d performs weighting that amplifies subband signals corresponding to detail filters that have predetermined orientations in the pinwheel framelet and attenuates subband signals with predetermined orientations. More specifically, as illustrated in FIGS. 69 and 70, at levels 1 to 4 of the multiresolution decomposition using the pinwheel framelet of degree 7, for example, the weighting unit 402d sets the coefficients of subband signals of detail filters that have an orientation in the same direction as or in an orthogonal direction to the axis orthogonal to the longitudinal direction of two floating directions to 0, sets the coefficients of subband signals corresponding to detail filters with orientations that are at negative angles relative to the orthogonal axis to 1 or 2, and sets the coefficients of subband signals corresponding to detail filters with orientations that are at positive angles relative to the orthogonal axis to 0. As illustrated in FIG. 70, the weighting unit 402d further sets the coefficient of the approximate part at the maximum level (level 5) to 1.

Figure 71:
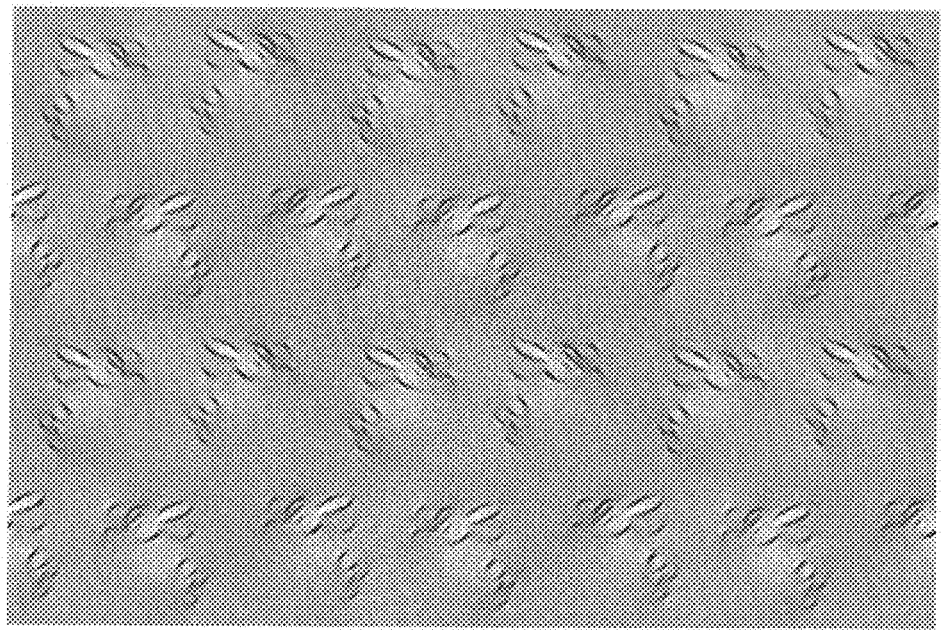
FIG. 71 is a diagram in which processed images obtained as a result of applying the band-pass filters with orientation selectivity created in an example of the embodiment to the original image (FIG. 68) are arranged.

The image processing apparatus 400 creates the band-pass filters with orientation selectivity used for calculation for creating the floating illusion in this manner, and applies the filters to the original image (FIG. 68) through processing by the filter processing unit 402a. FIG. 71 is a diagram illustrating a floating illusion created by arranging processed images obtained as a result of applying the band-pass filters with orientation selectivity created in this example to the original image (FIG. 68).

As illustrated in FIG. 71, it has been verified that the use of the band-pass filters with orientation selectivity created in this example can create a floating illusion image that wavers laterally when being moved longitudinally, and wavers longitudinally when being moved laterally.

[Pinwheel Framelet]

Figure 73:
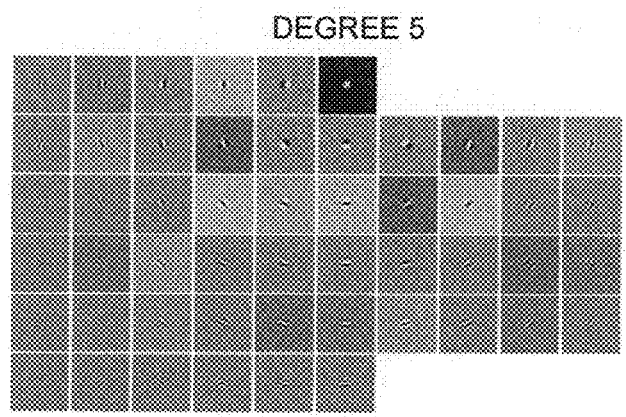
FIG. 73 is a diagram illustrating the decomposition detail coefficients at level 2 when obtained by processing a unit impulse using a maximal overlap pinwheel framelet of degree 5.
Figure 74:
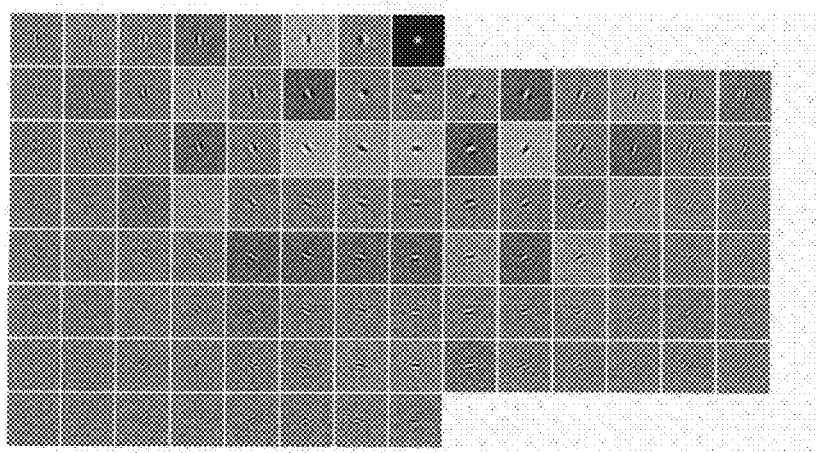
FIG. 74 is a diagram illustrating the decomposition detail coefficients at level 2 when obtained by processing a unit impulse using a maximal overlap pinwheel framelet of degree 7.

The following describes the filter arrangements of the pinwheel framelets of degrees 3, 5, 7, and 9 used in the examples described above, using FIGS. 72 to 75. FIG. 72 is a diagram illustrating a result of performing the multiresolution decomposition at level 2 when obtained by processing a unit impulse using a maximal overlap pinwheel framelet of degree 3 of unit impulse, and FIG. 73 is a diagram illustrating a result of performing the multiresolution decomposition at level 2 when obtained by processing a unit impulse using a maximal overlap pinwheel framelet of degree 5 of unit impulse. FIG. 74 is a diagram illustrating a result of performing the multiresolution decomposition at level 2 when obtained by processing a unit impulse using a maximal overlap pinwheel framelet of degree 7 of unit impulse, and FIG. 75 is a diagram illustrating a result of performing the multiresolution decomposition at level 2 when obtained by processing a unit impulse using a maximal overlap pinwheel framelet of degree 9 of unit impulse.

Each filter represents a subband signal (unit impulse response) obtained by applying the multiresolution decomposition to the unit impulse using a pinwheel framelet. The subband signals are shifted so that changing portions are located toward the center, and are all subband signals at level 2.

The positions of values in the tables correspond to the positions of these subband signals, and 64×64 pixels in the center are extracted and displayed as each of the illustrated images.

This is the end of the explanation of the embodiment of the digital filter for image processing, the digital filter creating method, and the program according to the present invention, and the image generating apparatus, the superhybrid image generating apparatus, the image generating method, the superhybrid image generating method, the printing medium manufacturing method, the electronic medium manufacturing method, and the program according to the present invention that use the FIR filters as an example. The filters with orientation selectivity created using a broad-sense pinwheel framelet including the pinwheel framelet of the present embodiment can be used as "filters with orientation selectivity near a character array direction" for generating the letter-row tilt illusion.

[II] The following describes in detail an embodiment of a letter-row tilt illusion generating apparatus, a letter-row tilt illusion generating method, a printing medium manufacturing method, an electronic medium manufacturing method, and a program according to the present invention, based on the drawings. This invention is not limited to the embodiment.

[Configuration of Letter-Row Tilt Illusion Generating Apparatus]

Figure 76:
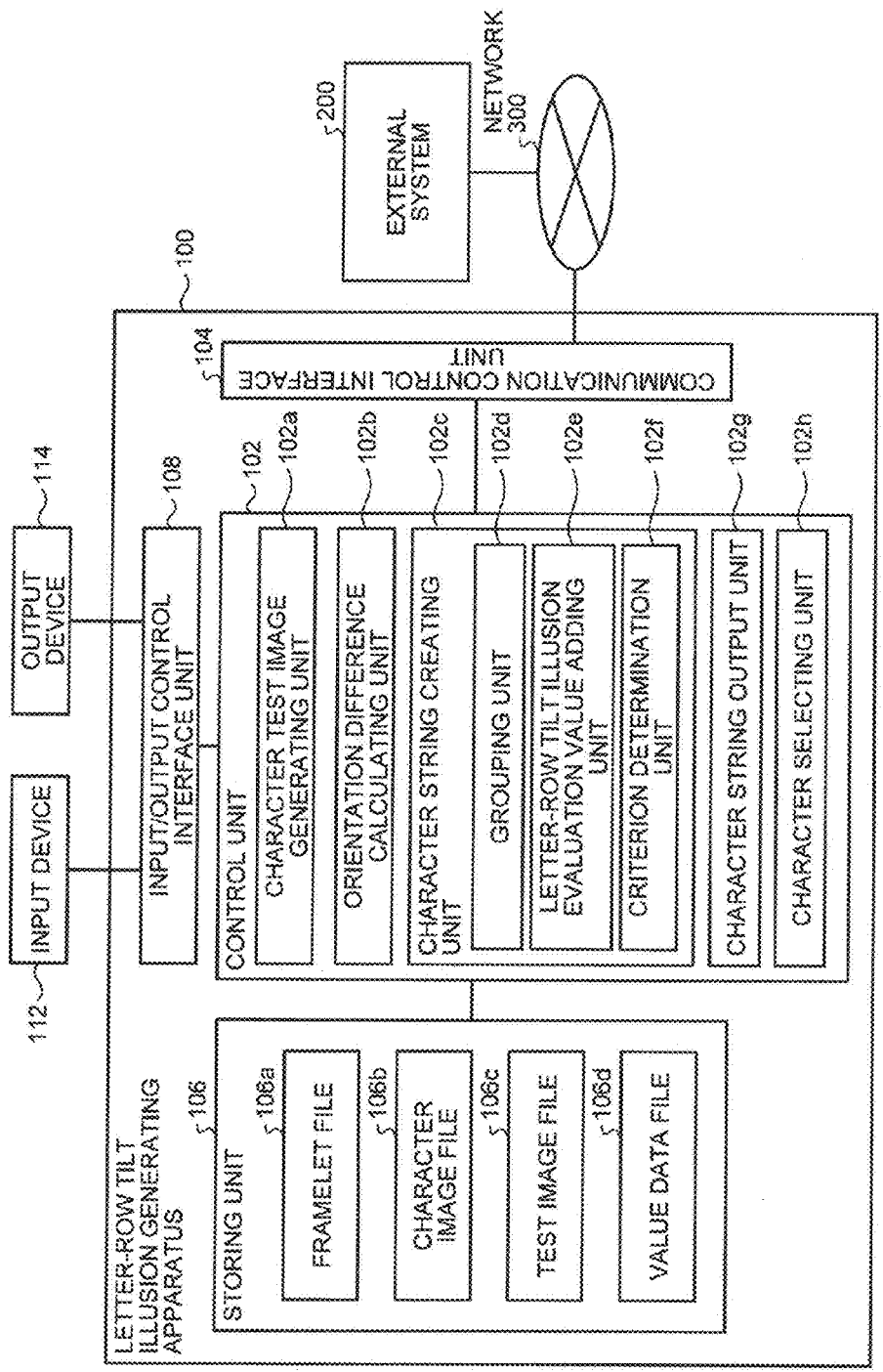
FIG. 76 is a block diagram illustrating one example of the configuration of a letter-row tilt illusion generating apparatus to which the embodiment is applied.

The configuration of the letter-row tilt illusion generating apparatus will be described with reference to FIG. 76. FIG. 76 is a block diagram illustrating one example of the configuration of the letter-row tilt illusion generating apparatus to which the present embodiment is applied, and schematically illustrates only a portion relating to the present embodiment in the configuration.

In FIG. 76, a letter-row tilt illusion generating apparatus 100 schematically includes a control unit 102, a communication control interface unit 104, an input/output control interface unit 108, and a storing unit 106. The control unit 102 is a CPU or the like that performs overall control of the letter-row tilt illusion generating apparatus 100. The input/output control interface unit 108 is an interface connected to an input device 112 and an output device 114. The storing unit 106 is a device that stores, for example, various databases and tables. These units of the letter-row tilt illusion generating apparatus 100 are communicably connected via any desired communication channel.

Various files (a framelet file 106a, a character image file 106b, a test image file 106c, and a value data file 106d) stored in the storing unit 106 are a storage unit, such as a fixed disk drive. For example, the storing unit 106 stores various programs, tables, files, databases, web pages, and the like used for various processes.

Of these components of the storing unit 106, the framelet file 106a is a filter storing unit that stores filters with orientation selectivity near the character array direction (such as band-limiting filters). The "character array direction" refers to a desired array direction in which a character string is created by the present embodiment, and is not limited to the character array direction normally used with the characters. For example, even if characters are horizontally written and not vertically written in a particular language, the character array direction may be the vertical direction.

Figures 77, 78:
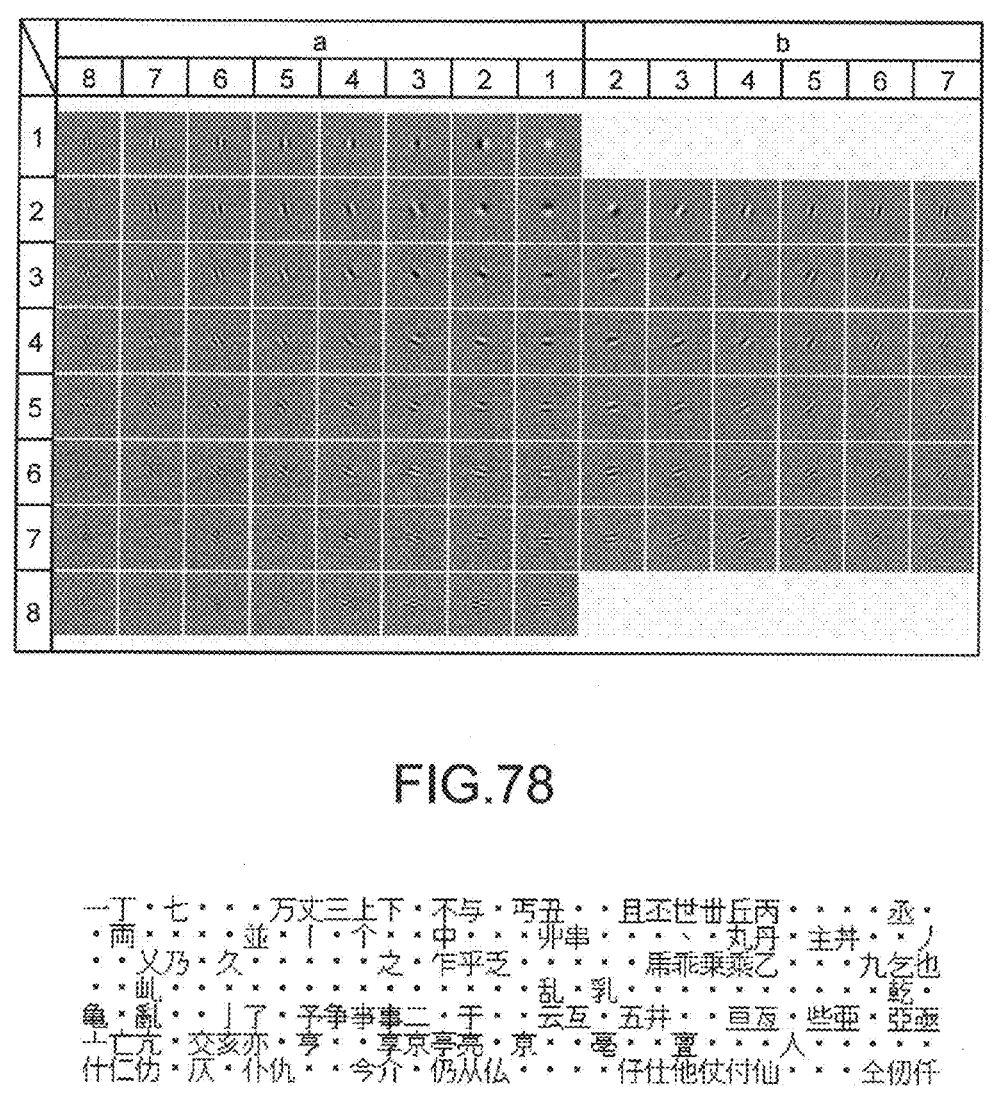

To create a character string in a horizontal writing style, the framelet file 106a stores a filter with orientation selectivity near the horizontal direction. The framelet file 106a may store a plurality of filters with various orientations in preparation for cases such as when the character array direction is not predetermined, and, as an example, may store a wavelet frame with orientation selectivity or a filterbank with orientation selectivity that is a set of an approximate filter with no orientation and a plurality of detail filters with respective orientations. As the wavelet frame with orientation selectivity, a pinwheel framelet may be used, or without being limited to this, for example, a simple pinwheel framelet or a pinwheel wavelet frame may be used (see Hitoshi Arai "Illusion Figures", K K. Sanshusha., 2007, Non Patent Literature 6, and Non Patent Literature 7). In a pinwheel wavelet frame, the length of the filters constituting the frame changes in accordance with the number of pixels of the original image, whereas a pinwheel framelet and a simple pinwheel framelet have a property where the length of the filters is independent of the number of pixels. For example, a pinwheel framelet is a two-dimensional framelet with orientation selectivity, and is one type of a multiwavelet frame. A pinwheel framelet is, for example, a mathematical model of simple cells in the human visual cortex. This decomposition is a mathematical model of signals decomposed by simple cells in the human brain. A pinwheel framelet is a model neuroscientifically closer to simple cells in V1 of the cerebral cortex than a simple pinwheel framelet. A pinwheel framelet, for example, has a degree that is an odd number of three or greater. The larger the degree, the more the orientations can be detected. A pinwheel framelet has a property where the number of filters increases and the calculation time increases as the degree increases. The number of filters of a pinwheel framelet of degree n is, for example, $(n+1)^2+(n-1)^2$. Of these filters, one filter is an approximate filter and the remaining filters are detail filters. FIG. 77 is a diagram illustrating filters obtained by calculating the cyclic correlation product of maximal overlap pinwheel framelet filters at level 2 of degree 7 and maximal overlap pinwheel framelet approximate filters at level 1 of degree 7 (for example of the cyclic correlation product, see Hitoshi Arai, "Linear Algebra, Basics and Applications", Nippon Hyoron Sha Co., Ltd. (2006)). In FIG. 77, the numbers in the left column represent the row numbers; the numbers in the top row represent the column numbers; and the alphabet letters in the top row represent the difference between orientations symmetrical to each other. The name of a filter is expressed as (row number-column number-level suffixed with a or b); for example, one filter at the leftmost top of FIG. 77 is represented as (1-8-2a).

Because the degree of the pinwheel framelet of FIG. 77 is 7, for example, as illustrated FIG. 77, the pinwheel framelet is composed of a set of 100 filters in total, combined from 8×8 filters on the left side and 6×6 filters on the right side, for each level. Of these filters, one filter (1-1-2a) in the central upper portion in FIG. 77 is a filter obtained by calculating the cyclic correlation product of the approximate filters at levels 1 and 2, and the other 99 filters are filters obtained by calculating the cyclic correlation product of the detail filters at level 2 and the approximate filter at level 1. The orientations of the filters generated by the detail filters are arranged substantially in the direction in which a pinwheel rotates around the filter generated only from the approximate filter. If the character arrangement direction is the horizontal direction, the framelet file 106a may use one filter in a group of filters with orientations near the horizontal direction, such as (2-1-2a), (3-1-2a), (4-1-2a), (5-1-2a), (6-1-2a), (7-1-2a), (8-1-2a), (2-2-2a), (3-2-2a), (4-2-2a), (5-2-2a), (6-2-2a), (7-2-2a), (2-2-2b), (3-2-2b), (4-2-2b), (5-2-2b), (6-2-2b), and (7-2-2b). If the character arrangement direction is the vertical direction, the framelet file 106a may use one filter in a group of filters with orientations near the vertical direction, such as (1-8-2a), (1-7-2a), (1-6-2a), (1-5-2a), (1-4-2a), (1-3-2a), (1-2-2a), (2-7-2a), (2-6-2a), (2-5-2a), (2-4-2a), (2-3-2a), (2-2-2a), (2-7-2b), (2-6-2b), (2-5-2b), (2-4-2b), (2-3-2b), and (2-2-2b). The maximal overlap multiresolution decomposition by using a pinwheel framelet of each degree has levels, and level 1 detects the finest portion (high-frequency portion). FIG. 77 illustrates the pinwheel framelet at level 2, and more approximate portions (lower-frequency portions) are detected as the level increases to 2, 3, . . . .

The framelet file 106a may store wavelet frames with orientation selectivity, such as a pinwheel framelet, in the form of a function (such as a frequency response function of framelet filters). Various wavelets may be used in the present embodiment without being limited to the above. Here, the wavelet is not limited to a classical wavelet, a wavelet in a narrow sense, or the like, and includes a wavelet in a broad sense. For example, the wavelet is a finite-length waveform or a wave-like oscillation with an amplitude that is amplified from zero and quickly converges to zero, and, for example, includes pseudo wavelets, such as a Gabor filter and a curvelet. Moreover, the framelet file 106a may store therein a filter group, such as a filterbank with orientation selectivity and filters with orientations, without being limited to such frames as wavelet frames with orientation selectivity.

The character image file 106b is a character image storing unit that stores a character image (or character images) of a plurality of characters. A character image may be stored character by character; or a plurality of characters may be collectively stored as a character image, and may be extracted one by one as required. For example, character image data stored in the character image file 106b is a font, that is, data of a character set with the same size and the same typeface. The data format of the character image stored in the character image file 106b may be a bitmap format, such as a bitmap font format, or a vector format, such as a scalable font format. FIG. 78 is a diagram illustrating one example of a font stored in the character image file 106b. In this example, the character image file 106b stores the font of MS Gothic in 12 pt, in which one character has 16×16 pixels. "•" indicates that no character is assigned to the code. The language need not be Japanese, but fonts of various languages, such as Chinese and Korean, may be used.

Figure 79:
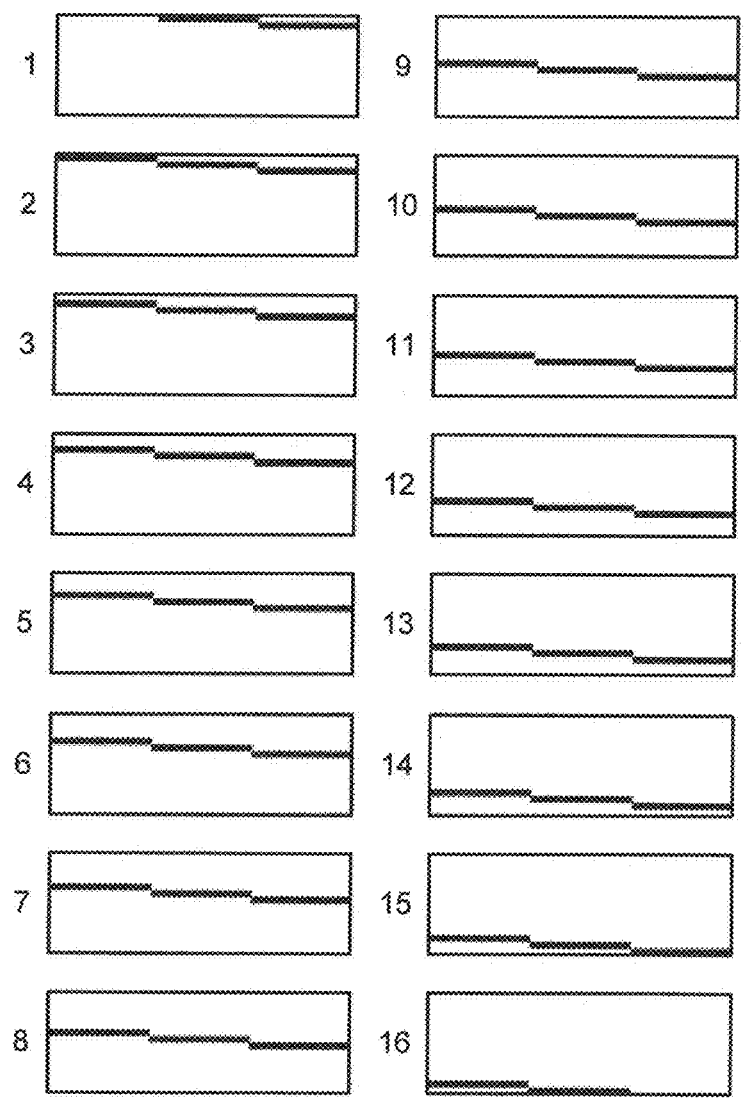
FIG. 79 is a diagram illustrating one example of a plurality of test images stored in a test image file 106c.

The test image file 106c is a test image storing unit that stores a test image. Assuming a line segment or a figure shaped like the line segment in the character array direction as a single character unit, the test image is an image obtained by arranging one or more of such line segments or figures in the character array direction. A plurality of characters shifted from each other in the direction vertical to the character array direction may be stored as the test image. For example, if the character array direction is the horizontal direction, the line segment or the figure shaped like it may be a horizontal bar-like symbol (such as "-"), such as a horizontal bar or a dash. If the character array direction is the vertical direction, the line segment or the figure shaped like it may be a vertical bar-like symbol (such as "|"), such as a vertical bar or a vertical line. The line segment or the figure shaped like it and a character correspond to the same single character unit. FIG. 79 is a diagram illustrating one example of a plurality of test images stored in the test image file 106c. FIG. 79 illustrates a total of 16 test images numbered from 1 to 16 (the rectangles surrounding the figures are not included in the test images).

As illustrated in FIG. 79 as an example, one test image is composed of a plurality horizontal bars arranged stepwise, character unit by character unit. In this example, the single character unit consists of 16×16 pixels, and the test image consists of 16×48 pixels for 3 horizontally written characters. The bar in the center is arranged stepwise so as to be shifted in height by one pixel each from the left and right bars. In this manner, assuming a bar in the character array direction as the single character unit, the test image may be composed of a plurality of such bars arranged in the character array direction while providing stepwise level differences between the bars. As illustrated in FIG. 79, the test image file 106c may store a plurality of test images in which positions of bars in one test image differ from each other in the direction vertical to the character array direction by a certain distance. In the example of FIG. 79, a test image j and a test image j+1 differ from each other in positions of bars by one pixel each, and because the single character unit has a height of 16 pixels, the example consists of a total of 16 test images. Because the continuity of the differences in the bar positions is important for obtaining a local minimum value of an orientation component or when characters are assigned to a character string, the test image file 106c may store test images in a manner corresponding to numbers or the like as in the case of the test images 1 to 16.

The description returns to FIG. 76 again. The input/output control interface unit 108 controls the input device 112 and the output device 114. As the output device 114, for example, a display device, such as a monitor (including a home television) and a screen of a mobile terminal or a cell phone, a printing device, such as a printer, and a data recording device that records data in an electronic medium such as a USB memory can be used. As the input device 112, for example, an imaging device, such as a camera, and an input device connected to an external storage medium can be used in addition to a keyboard, a mouse, and a microphone.

In FIG. 76, the control unit 102 includes an internal memory for storing therein control programs, such as an operating system (OS), computer programs defining various processing procedures and the like, and required data. The control unit 102 performs information processing for performing various types of processing using, for example, these programs. The control unit 102 includes a character test image generating unit 102a, an orientation difference calculating unit 102b, a character string creating unit 102c, a character string output unit 102g, and a character selecting unit 102h in the sense of a functional concept. The character string creating unit 102c further includes a grouping unit 102d, a criterion determination unit 102f, and a letter-row tilt illusion evaluation value adding unit 102e.

Of these units, the character test image generating unit 102a is a character test image generating unit that generates a character test image by replacing a line segment or a figure shaped like the line segment (such as an approximate line segment) corresponding to the single character unit in a test image stored in the test image file 106c with a character image for one character stored in the character image file 106b. When a plurality of continuous test images are stored in the test image file 106c as described above, the character test image generating unit 102a may generate a character test image by replacing a line segment or a figure shaped like the line segment (such as a line segment or a figure shaped like the line segment commonly located at the second character of all the test images) corresponding to the single character unit at the same sequential position in the test images with a character image for one character in these test images.

The orientation difference calculating unit 102b is an orientation difference calculating unit that uses filters with orientation selectivity near the character array direction stored in the framelet file 106a to calculate differences between orientation components of a character test image for a certain character and orientation components of a test image before having a line segment or a figure shaped like the line segment replaced with the character. In the present embodiment, orientation components of a certain image refer to an image composed of components with predetermined orientations in the certain image. For example, the orientation difference calculating unit 102b may calculate the differences by filtering the character test image and the test image with filters having orientations near the character array direction, and by comparing the orientation component data output through the filters. In this case, a plurality of sets of filters may be used to calculate respective differences. If there are a plurality of sets of character test images and test images, the orientation difference calculating unit 102b calculates differences between orientation components for the respective sets. Furthermore, the orientation difference calculating unit 102b may store the calculated differences between orientation components into the value data file 106d. As an example of the filtering method, the orientation difference calculating unit 102b may obtain image signals (subband signals) of orientation components near the character array direction among the orientation components by performing multiresolution decomposition on the image data of character test images and test images by using a wavelet frame with orientation selectivity, such as a pinwheel framelet, stored in the framelet file 106a. The "multiresolution decomposition" includes maximal overlap multiresolution decomposition, maximally decimated multiresolution decomposition, and partially decimated and partially overlap multiresolution decomposition (for example of maximal overlap multiresolution decomposition, see Hitoshi Arai, "Wavelet", Kyoritsu Shuppan Co., Ltd. (2010)). As described above, multiresolution decomposition using wavelet frames with orientation selectivity, such as a pinwheel framelet, has levels. As an example, the orientation difference calculating unit 102b first detects the finest portion (high frequency portion) by maximal overlap multiresolution decomposition by using a pinwheel framelet at level 1 and detects approximate portions (low frequency portions) as level becomes large such as level 2, 3, . . . .

As an example of the method for calculating the differences between orientation components, the orientation difference calculating unit 102b may use the following expression to calculate a norm of differences x between data obtained by filtering the images. The single character unit contains $N_1 \times N_2$ pixels, and x[j,k] represents a gray level difference (vector) between two images at vertically j-th and horizontally k-th pixels. Without being limited to this, the orientation difference calculating unit 102b may calculate the differences between the orientation components of the character test image and the orientation components of the test image using a known inter-image similarity calculation method that evaluates similarities between two images.

When $x =$ [Expression 1]

$$\begin{pmatrix} x[0,0] & \cdots & x[0, N_2-1] \\ \vdots & \ddots & \vdots \\ x[N_1-1, 0] & \cdots & x[N_1-1, N_2-1] \end{pmatrix} \text{ is satisfied,}$$

$$\text{"Norm of } x\text{"} = \sqrt{\sum_{i=0}^{N_1-1} \sum_{k=0}^{N_2-1} (x[i,k])^2}$$

The character string creating unit 102c is a character string creating unit that creates a character string for generating a letter-row tilt illusion by assigning corresponding characters to single character units based on a predetermined criterion. For example, the character string creating unit 102c may assign characters based on a criterion (a numerical criterion referred to as an "indicator A") that the differences between the orientation components calculated by the orientation difference calculating unit 102b are better to be smaller. When a plurality of continuous test images are used, the grouping unit 102d of the character string creating unit 102c may group the characters into one or more of the test images in which the differences between the orientation components calculated for each test image of characters by the orientation difference calculating unit 102b are locally minimized in the test images. The character string creating unit 102c may assign the characters based on the criterion (indicator A) that the local minimum value is better to be smaller. Because the local minimum value is not a minimum value in all of a plurality of test images, but a value locally minimal in a plurality of test images, a plurality of local minimum values may exist for one character in some cases. In such cases, the grouping unit 102d groups the characters into a plurality of test images corresponding to the respective local minimum values. The character string creating unit 102c may create a character string for generating a letter-row tilt illusion by sequentially assigning characters one by one from each of the groups according to the continuity of the test images.

Figure 80:
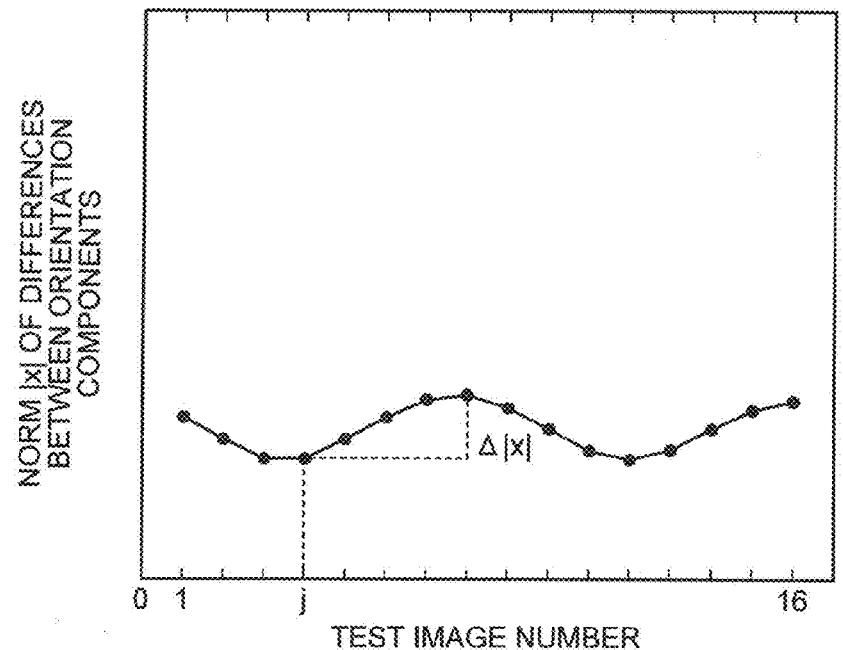
FIG. 80 is a graph with the horizontal axis representing a test image number and the vertical axis representing a norm |x| of differences between orientation components.
Figure 81:
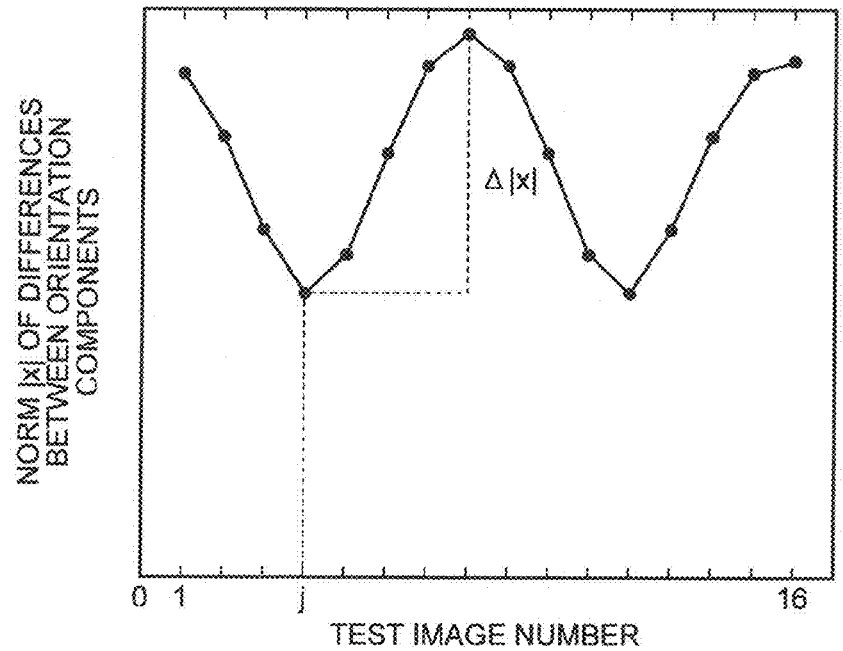
FIG. 81 is a graph with the horizontal axis representing the test image number and the vertical axis representing the norm |x| of differences between orientation components.

The character string creating unit 102c may assign characters based on, in addition to the criterion (indicator A) that the local minimum value of the differences between orientation components is better to be smaller, a criterion (a numerical criterion referred to as an "indicator B") that the difference between the maximum value and the minimum value near the local minimum value is better to be larger. In other words, the former (indicator A) may be regarded as an indicator of a degree of similarity to the orientation components of the test images, and the latter (indicator B) may be regarded as an indicator for a degree of uniqueness of being similar to only a particular test image. The difference between the indicators A and B will be explained below with reference to FIGS. 80 and 81. FIGS. 80 and 81 are graphs with the horizontal axis representing a test image number and the vertical axis representing the norm |x| of differences between orientation components.

In the character illustrated in FIG. 80, the differences between orientation components obtained by comparing the character with any test image are generally small. In other words, the character is relatively similar to any test image, and can be said to have no uniqueness. In the character illustrated in FIG. 81, the differences between orientation components largely fluctuate between test images. In other words, the character is similar to certain test images but not similar to some of the other test images, and can be said to have uniqueness. When both characters are compared based on only the local minimum value of the differences between orientation components (value of |x| at the test image j), the local minimum value of the character of FIG. 80 is smaller. As a result, if ranking is made based on only the indicator A, the character of FIG. 80 is ranked higher than the character of FIG. 81, and is likely to be assigned to a character string. However, a character having a generally small local minimum value and generally small other values as given in FIG. 80 may sometimes have difficulty in generating a letter-row tilt illusion. Hence, to avoid this, a criterion (indicator B) is set that the difference between the maximum value and the minimum value near the local minimum value is better to be larger, in addition to the criterion (indicator A) that the local minimum value is better to be smaller. For example, as illustrated in FIGS. 80 and 81, a difference Δ|x| between the maximum value and the minimum value is obtained in the vicinity of the test image j indicating the local minimum value, and ranking is made based on the criterion that the value is better to be larger. In this case, the character of FIG. 81 has a larger value of the difference Δ|x| between the maximum value and the minimum value near the local minimum value than that of the character of FIG. 80, and thereby is ranked higher than the character of FIG. 80 from the viewpoint of the indicator B.

Figure 82:
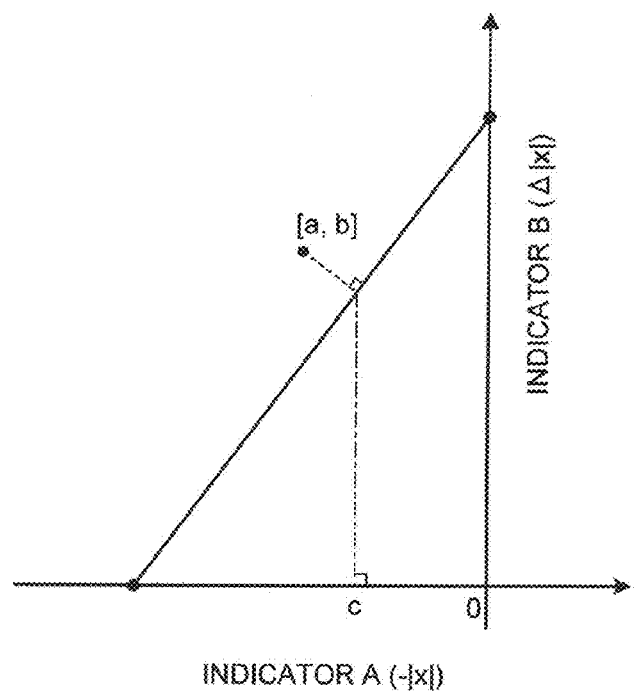
FIG. 82 is a graph for explaining one example of a method for calculation of a combined indicator of an indicator A and an indicator B.

The character string creating unit 102c may rank characters using any method between the indicators A and B. For example, the indicator A may be used for only grouping by the grouping unit 102d, and the criterion determination unit 102f may include a ranking unit and may rank the characters in the group based on only the indicator B. As another example, the criterion determination unit 102f may rank the characters in the group by calculating a combined indicator of the indicators A and B using the following method. FIG. 82 is a graph for explaining one example of the method for calculation of the combined indicator of the indicators A and B. The horizontal axis represents the indicator A (−|x|), and the vertical axis represents the indicator B (Δ|x|). In this example, the indicator A is defined to be a value obtained by multiplying the above-described norm |x| of differences between orientation components by −1 so that the evaluation is higher as the value increases.

As illustrated in FIG. 82, an evaluation criterion line (solid line in FIG. 82) is created. The evaluation criterion line may be, for example, a line connecting the coordinates of a character (symbol) evaluated to be high and the coordinates of a character (symbol) evaluated to be low. For example, when the test images illustrated in FIG. 79 are used, the bar is an ideal character (symbol) for generating a letter-row tilt illusion. Hence, the indicators A and B are obtained by creating a character test image with the bar itself (such as "-"), and are plotted as one end of the criterion. Because the character test image replaced with the bar itself and the test image are considered to completely coincide with each other in a particular bar position, the indicator A (−|x|) is approximately zero and the indicator B (Δ|x|) is large (the end point at the upper right on the solid line in FIG. 82). As an example of the character evaluated to be low, a character test image is created with a blank space " ", and the indicators A and B are obtained and plotted as the other end of the criterion. Because the character test image replaced with the blank space and the test image equally largely differ from each other in any position of the bar, the indicator A (−|x|) is small and the indicator B (Δ|x|) is approximately zero (the end point at the lower left on the solid line in FIG. 82).

Hence, in the example of FIG. 82, the evaluation is higher as the position moves toward the upper right and lower as the position moves toward the lower left along the evaluation criterion line. To numerically express this, the following calculation method may be employed. Specifically, when coordinates (indicator A, indicator B)=[a, b] is satisfied for a certain character, a vertical line (dashed line in FIG. 82) is drawn from the point to the evaluation criterion line, and a vertical line (long dashed short dashed line in FIG. 82) is further drawn from the foot of the vertical line to the x-axis. A value c of the intersection point (c, 0) with the x-axis at that time may be employed as the combined indicator. The calculation method of the combined indicator is not limited to this. The criterion determination unit 102*f* may perform the ranking by calculating the combined indicator of the indicators A and B using a known method for calculating the combined indicator. In addition to this, the ranking in a group can use various methods, such as a method in which indicator values for characters are plotted in a multidimensional space in general, and an orthogonal projection is made on a certain straight line.

The criterion determination unit 102*f* having the ranking unit may store the indicators or the combined indicator into the value data file 106*d*.

Figure 83:
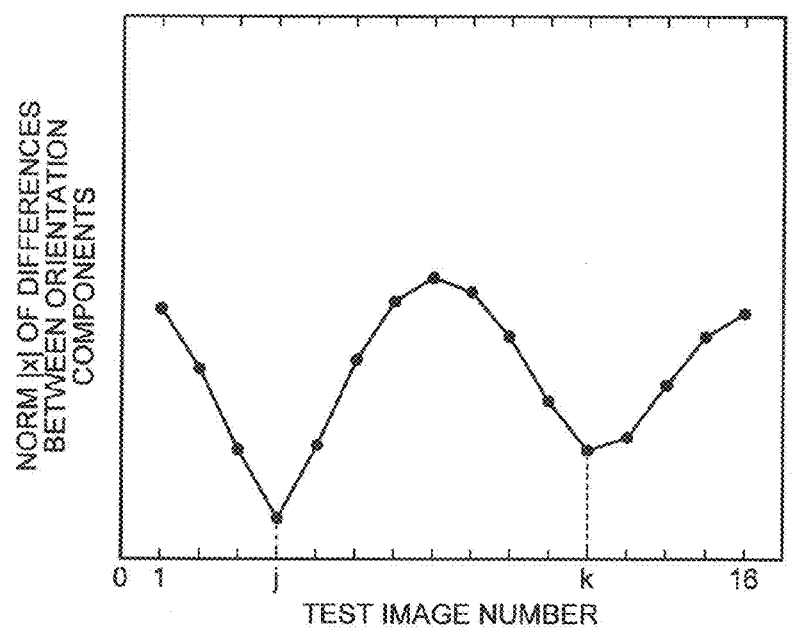
FIG. 83 is a graph concerning a character, with the horizontal axis representing the test image number and the vertical axis representing the norm |x| of differences between orientation components.

An explanation will be given on an example in which the grouping unit 102*d* performs processing of regrouping the characters commonly grouped into a plurality of test images. The test images illustrated in FIG. 79 will be used below. Many characters have local minimum values for a plurality of test images. FIG. 83 is a graph concerning a character, with the horizontal axis representing the test image number and the vertical axis representing the norm |x| of differences between orientation components.

As illustrated in FIG. 83, in this character, local minimum values appear at two places of j and k. In this case, the grouping unit 102*d* classifies this character into a group j and also a group k. At this point, the grouping unit 102*d* may regroup the characters that have commonly been grouped into two of the test images in which the positions of bars differ from each other by a predetermined distance. If the test image numbers represent continuity of the bar positions, this virtually means that the grouping unit 102*d* regroups the characters that have commonly been grouped into two groups m and m+n (mod 16) for which the test image numbers differ by a predetermined number n. The following illustrates the example of regrouping in the case in which the test image numbers are from 1 to 16, and the group number m=1 to 16 is satisfied. It is assumed that n=6 is satisfied.

(group 1)∩(group 7)=(new group 1)

(group 2)∩(group 8)=(new group 2)

(group 3)∩(group 9)=(new group 3)

(group 4)∩(group 10)=(new group 4)

(group 5)∩(group 11)=(new group 5)

(group 6)∩(group 12)=(new group 6)

(group 7)∩(group 13)=(new group 7)

(group 8)∩(group 14)=(new group 8)

(group 9)∩(group 15)=(new group 9)

(group 10)∩(group 16)=(new group 10)

(group 11)∩(group 1)=(new group 11)

(group 12)∩(group 2)=(new group 12)

(group 13)∩(group 3)=(new group 13)

(group 14)∩(group 4)=(new group 14)

(group 15)∩(group 5)=(new group 15)

(group 16)∩(group 6)=(new group 16)

In general, a letter-row tilt illusion that appears more smoothly tilted can be generated by sequentially arranging the regrouped characters such that the group numbers (test image numbers) are arranged in ascending or descending order. The grouping unit 102*d* is not limited to regrouping the characters when they have commonly been grouped into two groups at a certain interval, but may use the same principle to regroup the characters when they have commonly been grouped into three or more groups. In addition to this, a more visible letter-row tilt illusion is created by performing grouping and ranking by considering several conditions and using, for example, a plurality of filters. The number of characters remaining in each group decreases as the number of common groups increases.

The letter-row tilt illusion evaluation value adding unit 102*e* is a letter-row tilt illusion evaluation value adding unit that adds an evaluation value to a character string for generating a letter-row tilt illusion created by the character string creating unit 102*c*. For example, the letter-row tilt illusion evaluation value adding unit 102*e* adds an overall evaluation value to a character string using differences between orientation components, indicator values, or combined indicator values that have been obtained for respective characters in the character string. For example, a summed value or an average value may be used, but not limited thereto, as the overall evaluation value. The letter-row tilt illusion evaluation value adding unit 102*e* may read and use a value stored in the value data file 106*d*, if necessary.

The character string output unit 102*g* is a character string output unit that outputs the character string created by the character string creating unit 102*c* to the output device 114. For example, the character string output unit 102*g* may output to display the character string to a display device, such as a monitor, or may print out the character string to a printing device, such as a printer, to produce a printing medium, or may otherwise produce an electronic medium for, for example, electronic data. Examples of media to be printed on include, but are not limited to, media, such as paper and OHP sheets, that permanently display character strings. As an example, the printing medium may be in the form of, for example, a flyer, a fan, a card, a picture book, a New Year's card, a Christmas card, or a business card. Examples of electronic media include, but are not limited to, web pages, electronic mail, and electronic recording media. The character string output unit 102g may change the design (for example, change the size to the postcard size or the like) depending on the intended use according to the output form. The character string output unit 102g may transmit various types of data related to the letter-row tilt illusion to the external system 200 via the network 300.

The character selecting unit 102h is a character selecting unit that allows the user to select, via the input device 112 such as a keyboard, any number of characters among a plurality of characters with character images thereof stored in the character image file 106b. If the character selecting unit 102h has selected characters, the character string creating unit 102c sets the characters selected by the character selecting unit 102h as targets to be assigned. After the control unit 102 for the character test image generating unit 102a and the like has performed processing on all characters of the character images stored in the character image file 106b, the character string creating unit 102c may create a character string employing only characters selected by the character selecting unit 102h among the processed characters. Alternatively, the processing may be performed only on the characters selected by the character selecting unit 102h from the beginning.

The letter-row tilt illusion generating apparatus 100 may be communicatively connected to the network 300 via a communication device, such as a router, and a wired or wireless communication line, such as a dedicated line. In FIG. 76, the communication control interface unit 104 performs communication control between the letter-row tilt illusion generating apparatus 100 and the network 300 (or a communication device, such as a router). In other words, the communication control interface unit 104 is an interface connected to a communication device (not shown), such as a router, connected to a communication line or the like, and has the function of performing data communication with other terminals via communication lines. In FIG. 76, the network 300 has the function of mutually connecting the letter-row tilt illusion generating apparatus 100 and the external system 200 and is, for example, the Internet or the like.

In FIG. 76, the external system 200 is mutually connected to the letter-row tilt illusion generating apparatus 100 via the network 300 and may have the function of providing a computer program for causing an external database relating to digital fonts, image data, or a pinwheel framelet or a computer to function as the letter-row tilt illusion generating apparatus. The external system 200 may be configured as a WEB server, an ASP server, or the like. Moreover, the hardware configuration of the external system 200 may be composed of an information processing apparatus, such as a commercially available workstation and personal computer, and accessory devices thereof. The functions of the external system 200 are implemented by a CPU, a disk device, a memory device, an input device, an output device, a communication control device, and the like in the hardware configuration of the external system 200, computer programs for controlling these devices, and the like.

This is the end of the explanation of the configuration of the letter-row tilt illusion generating apparatus 100 according to the present embodiment.

[Processing by Letter-Row Tilt Illusion Generating Apparatus 100]

Figure 84:
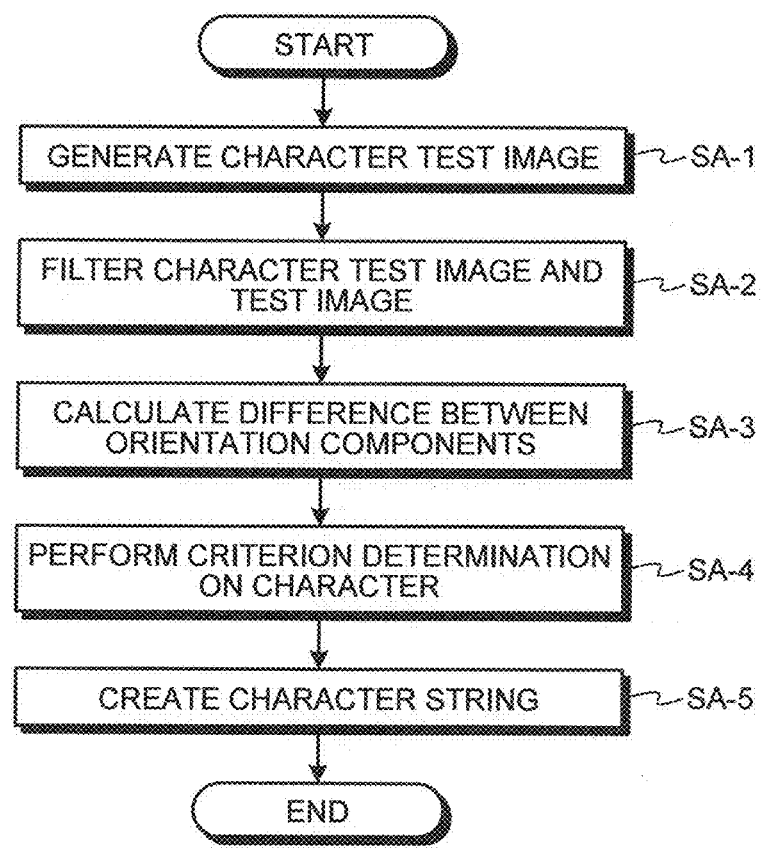
FIG. 84 is a flowchart illustrating one example of processing performed by a letter-row tilt illusion generating apparatus 100 in the embodiment.

The following describes in detail, with reference to FIGS. 84 to 89, one example of processing by the letter-row tilt illusion generating apparatus 100 in the present embodiment configured as above. FIG. 84 is a flowchart illustrating the example of the processing performed by the letter-row tilt illusion generating apparatus 100 in the present embodiment. While the following processing (at Steps SA-1 to SA-4 in particular) gives such a description that the processing is performed on one character in some cases, the processing in such cases is performed in parallel or iteratively on a plurality of characters to be processed (characters of character images stored in the character image file 106b or a character set selected by the character selecting unit 102h). In the following example, a case will be described in which the character array direction is the horizontal direction. However, the present embodiment is not limited to this. The case will also be described in which the test images illustrated in FIG. 79 are used as test images. However, the present embodiment is not limited to this.

Figure 85:
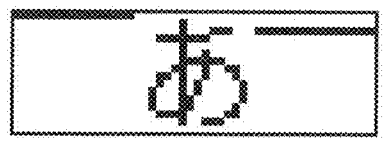
FIG. 85 is a diagram illustrating one example of a character test image.

As illustrated in FIG. 84, the character test image generating unit 102a first generates a character test image by replacing a bar corresponding to the single character unit in a test image stored in the test image file 106c with a character image for one character stored in the character image file 106b (Step SA-1). FIG. 85 is a diagram illustrating one example of the character test image.

As illustrated in FIG. 85, in this example, the bar at the second character is replaced with "あ" in a test image 2 of FIG. 79 explained above. The character test image generating unit 102a may replace, in addition to the bar at the second character in the test image, the other bars at the first and the third characters with the character "あ", and may determine, in the later processing, which of the three character test images created by replacing the first, the second, and the third character most resembles the test image. When a plurality of continuous test images are stored in the test image file 106c as described above regarding FIG. 79, the character test image generating unit 102a may generate character test images by replacing each bar at a predetermined place of order commonly in all the test images 1 to 16 (for example, each bar at the second character commonly in all the test images) with a character image for one character.

The description returns to FIG. 84 again. The orientation difference calculating unit 102b uses filters with orientation selectivity near the character array direction stored in the framelet file 106a to filter each of the character test image created at Step SA-1 and the original test image, and thus obtains orientation component data (Step SA-2). Because the character array direction is the horizontal direction in this example, the filters used by the orientation difference calculating unit 102b are filters with orientations near the horizontal direction; for example, filters (4-1-1a), (7-1-2a), and (5-1-2a) of the pinwheel framelet of degree 7 may be used (see FIG. 77). These filters are relatively high passing, medium passing, and low passing band-pass filters. A character string created by high-pass filters tends to give a stronger letter-row tilt illusion when viewed from a near position whereas, in contrast, a character string created by low-pass filters tends to give a stronger letter-row tilt illusion when viewed from a distant position.

Then, the orientation difference calculating unit 102b calculates the differences between the orientation components of the character test image and the orientation components of the original test image obtained by the filtering at Step SA-2 (Step SA-3). For example, the orientation difference calculating unit 102b may calculate the norm of the differences x between the data obtained by filtering both of the images. In the example of FIG. 85 explained above, if the character "あ" has a horizontal component approximate to the horizontal component provided by the bar in the center of the test image 2, the norm of the differences between the filtered data of FIG. 85 and the filtered data of the test image 2 is small. In this manner, the orientation difference calculating unit 102b obtains 16 values by calculating the norm of the differences in the orientation components of the test image j (j=1, 2, . . . , 15, 16) from those of the character test image. Without being limited to this, the orientation difference calculating unit 102b may calculate the differences between the orientation components of the character test image and the orientation components of the original test image using a known inter-image similarity calculation method that evaluates similarities between two images. The orientation difference calculating unit 102b may store the calculated differences between the orientation components into the value data file 106d.

Then, the criterion determination unit 102f of the character string creating unit 102c performs criterion determination on the character (Step SA-4). For example, the criterion determination unit 102f may perform the criterion determination by ranking a plurality of characters based on which of the characters is suited to the place. The criterion determination unit 102f may, for example, perform ranking in ascending order of the differences between the orientation components calculated by the orientation difference calculating unit 102b. If processing is performed using a plurality of test images having continuity in the bar position, the grouping unit 102d of the character string creating unit 102c may group the characters into one or more of the test images in which the differences between the orientation components calculated for each test image by the orientation difference calculating unit 102b are locally minimized in the test images. For example, if the character "あ" has a local minimum value between j and k among the test images 1 to 16, the grouping unit 102d classifies the character "あ" into the group j and the group k. This operation is performed on all characters to be classified, which are classified, except for the double-byte space " ", into at least one of the groups 1 to 16. In each of the groups, the criterion determination unit 102f may perform ranking in ascending order of the local minimum value as the indicator A, or may perform ranking in descending order of the difference between the maximum value and the minimum value near the local minimum value as the indicator B, or may otherwise perform ranking based on the combined indicator of the indicators A and B. Without being limited to this, the grouping unit 102d may regroup the characters that have commonly been grouped into two of the test images in which the positions of bars differ from each other by a predetermined distance. These processes may be performed using a plurality of appropriate filters. The criterion determination unit 102f may store the indicators or the combined indicator calculated into the value data file 106d.

Figure 88:
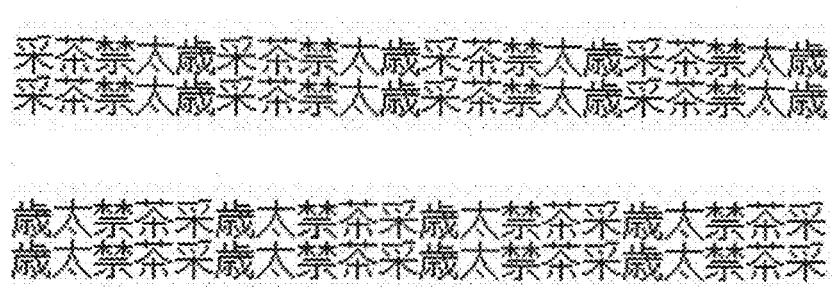
FIG. 88 is a diagram illustrating still other character strings created by the letter-row tilt illusion generating apparatus 100 of the embodiment.

Then, the character string creating unit 102c creates a character string for generating a letter-row tilt illusion by assigning the characters in the order of priority in accordance with the ranking obtained by the processing by the criterion determination unit 102f (Step SA-5). If characters have been selected by the character selecting unit 102h, the character string creating unit 102c may assign a character at the highest rank at the place among the characters. If characters have been grouped by the grouping unit 102d, the character string creating unit 102c may create a character string by sequentially assigning one character at a time from each group to the character string according to the continuity of the test images. For example, the character string creating unit 102c may assign the characters to the character string such that the group numbers (test image numbers) are arranged in ascending or descending order in the string. More specifically, the character string creating unit 102c may create a character string by repeating a process of assigning the top-ranked character in the group 1 to the first character, assigning the top-ranked character in the group 2 to the second character, assigning the top-ranked character in the group 3 to the third character, and so on. The letter-row tilt illusion is strengthened by assigning higher-ranked characters. FIGS. 86 to 88 are diagrams illustrating character strings created by the letter-row tilt illusion generating apparatus 100 of the present embodiment. In each of FIGS. 86 to 88, the illusion is strengthened by repeating a character string created such that characters are arranged in descending order in a segmental manner. Combining the ascending order and the descending order can generate a letter-row tilt illusion having complex tilts (such as a letter-row tilt illusion of waving up and down, or right and left).

Figure 89:
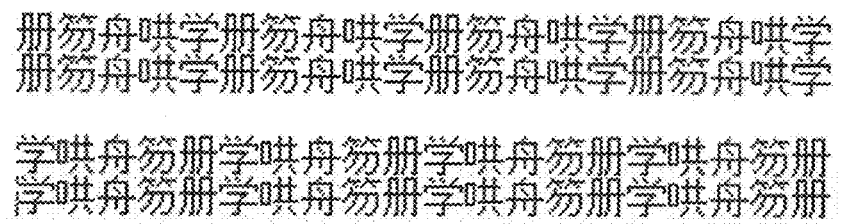
FIG. 89 is a diagram illustrating character strings created by the letter-row tilt illusion generating apparatus 100 of the embodiment.

If characters have been regrouped by the grouping unit 102d, the character string creating unit 102c may assign characters among the regrouped characters. FIG. 89 is a diagram illustrating character strings created by the letter-row tilt illusion generating apparatus 100 of the present embodiment by using the regrouping. In this manner, by assigning regrouped characters to a character string such that the group numbers (test image numbers) are arranged, for example, in ascending or descending order, a letter-row tilt illusion is obtained in which strings of the characters appear more smoothly tilted.

When the character string creating unit 102c generates the letter-row tilt illusion (Step SA-5), the letter-row illusion evaluation value adding unit 102e may add an evaluation value for evaluating an amount of illusion. This can quantify the amount of illusion of the created letter-row tilt illusion.

This is the end of the explanation of the processing performed by the letter-row tilt illusion generating apparatus 100.

[Example of Automatic Character String Generation from any Character Set]

The following describes an example of automatic character string generation from any specific character set performed by processing by the letter-row tilt illusion generating apparatus 100 of the present embodiment when the character set is given. Specifically, in this example, an example will be described in which a character string for generating a letter-row tilt illusion is automatically created from a character set selected by the character selecting unit 102h. This example assumes that, before the user selects the character set, the letter-row tilt illusion generating apparatus 100 has performed in advance the grouping and obtaining of the scores of indicators (ranking) by performing the processing of SA-1 to SA-4 described above on the font of the character images stored in the character image file 106b.

There are (1) a case of creating a character string using all characters in a given character set and (2) a case of creating a character string using some characters in a given character set. Because (1) is a special case of (2), (2) will be explained here. While an explanation will be given by exemplifying characters of MS Gothic double-byte in 12 pt, the character type is not limited to this.

The character selecting unit 102h allows the user to select desired N characters from MS Gothic double-byte characters in 12 pt via the input device 112 such as a keyboard. The control unit 102 of the letter-row tilt illusion generating apparatus 100 obtains a character string (combination and arrangement of characters) that causes a letter-row tilt illusion using M characters of the N characters, as illustrated below.

<Step 1>

First, one or more filters are selected from filters constituting a pinwheel framelet stored in the framelet file 106a. The number of filters is denoted as L, and the filters are represented as W_1, . . . , W_L. For example, it is assumed that L=2 is satisfied, and that W_1 represents the filter (2-1-1a) of the pinwheel framelet of degree 7 and W_2 represents the filter (5-1-2a) of the pinwheel framelet of degree 7 (see FIG. 77).

For each filter W_i, each character (16×16 pixels) of MS Gothic double-byte in 12 pt belongs to any one of the groups 1 to 16. If the character belongs to a group j, the score thereof is recorded. If not, a certain sign (such as "#") is added. The score refers to the combined indicator of the indicators A and B described above.

As illustrated in the following table, 16 scores for the 16 groups or # are given to one character. Because there are a total of 7327 MS Gothic double-byte characters in 12 pt, the table lists 16×7327 scores or signs (#). Table 1 is for W_2.

TABLE 1

|  | 1 | 2 | 3 | 4 | 5 | ... | 7327 |
|---|---|---|---|---|---|---|---|
| 1 | −9.34677 | # | # | # | −9.16642 | ... | # |
| 2 | # | # | # | # | # | ... | # |
| 3 | # | # | −8.5211 | # | # | ... | −8.81146 |
| 4 | # | # | # | # | # | ... | # |
| 5 | # | # | # | # | # | ... | # |
| 6 | # | # | # | −4.42581 | # | ... | # |
| 7 | # | # | # | # | # | ... | # |
| 8 | −10.514 | # | # | # | # | ... | # |
| 9 | # | # | # | # | −9.80863 | ... | # |
| 10 | # | # | # | # | # | ... | # |
| 11 | # | −7.96677 | −9.32698 | # | # | ... | −8.14323 |
| 12 | # | # | # | # | # | ... | # |
| 13 | # | # | # | −4.28701 | # | ... | # |
| 14 | # | # | # | # | # | ... | # |
| 15 | −9.3611 | # | # | # | # | ... | # |
| 16 | # | # | # | # | # | ... | # |

As illustrated in the following table, the scores except for # are normalized so as to fall between 0 and 1. After the normalization, 0 is put where # has been placed. In this manner, 16 normalized scores between 0 and 1 are given to one character. Hereinafter, the normalized score is simply called the score.

TABLE 2

|  | 1 | 2 | 3 | 4 | 5 | ... | 7327 |
|---|---|---|---|---|---|---|---|
| 1 | 0.247893 | 0 | 0 | 0 | 0.262406 | ... | 0 |
| 2 | 0 | 0 | 0 | 0 | 0 | ... | 0 |
| 3 | 0 | 0 | 0.314332 | 0 | 0 | ... | 0.290968 |
| 4 | 0 | 0 | 0 | 0 | 0 | ... | 0 |
| 5 | 0 | 0 | 0 | 0 | 0 | ... | 0 |
| 6 | 0 | 0 | 0 | 0.643868 | 0 | ... | 0 |
| 7 | 0 | 0 | 0 | 0 | 0 | ... | 0 |
| 8 | 0.153968 | 0 | 0 | 0 | 0 | ... | 0 |
| 9 | 0 | 0 | 0 | 0 | 0.210729 | ... | 0 |
| 10 | 0 | 0 | 0 | 0 | 0 | ... | 0 |
| 11 | 0 | 0.358938 | 0.249485 | 0 | 0 | ... | 0.344739 |
| 12 | 0 | 0 | 0 | 0 | 0 | ... | 0 |
| 13 | 0 | 0 | 0 | 0.655037 | 0 | ... | 0 |
| 14 | 0 | 0 | 0 | 0 | 0 | ... | 0 |

TABLE 2-continued

| | 1 | 2 | 3 | 4 | 5 | ... | 7327 |
|---|---|---|---|---|---|---|---|
| 15 | 0.24674 | 0 | 0 | 0 | 0 | ... | 0 |
| 16 | 0 | 0 | 0 | 0 | 0 | ... | 0 |

The control unit 102 of the letter-row tilt illusion generating apparatus 100 performs the above processing in advance, and stores the content of the above table as a database in the value data file 106d.

<Step 2>

Then, the character selecting unit 102h provides N characters. It is assumed here that the user has selected a character set " タチツテトナニ " (N=7).

<Step 3>

The character string creating unit 102c records all arrays in which M characters can be selected from the N characters and arranged. Arrays obtained by cyclic shifting are not counted. For example, if M=4 is satisfied and characters "タチツテ" are selected, "タチツテ", "チツテタ", "ツテタチ", and "テタチツ" are all counted as the same. A set composed of all the arrays is denoted as CP. For example, if N=7 and M=4 are satisfied, 210 kinds of arrays are possible. Hence, CP consists of 210 arrays of 4 characters, as illustrated in the following table.

TABLE 3

| | ARRAY |
|---|---|
| 1 | タテツチ |
| 2 | タテチツ |
| 3 | タツテチ |
| 4 | タツチテ |
| 5 | タチツテ |
| 6 | タチテツ |
| 7 | タトツチ |
| 8 | タトチツ |
| ... | ... |
| 210 | テトニナ |

<Step 4>

The letter-row tilt illusion evaluation value adding unit 102e of the character string creating unit 102c determines the evaluation value for approximately how much amount of illusion of letter-row tilt illusion is caused by each of the arrays belonging to CP. The method for determining the evaluation value is based on the following idea.

Suppose a right-downward letter-row tilt illusion. If the score of a character in an array is larger than 0 for a group j, the score of the next character is desirably larger than 0 for a group j+1 (or a group numbered close to j and larger than j+1) (if j+1 is close to 16, it may be considered that the number is based on mod 16, and a number close to 1 also applies). If such a case applies, because the array is likely to cause the letter-row tilt illusion, the letter-row tilt illusion evaluation value adding unit 102e gives the array a high evaluation value. If, in contrast, the score is larger than 0 for a group j−1 (or a group numbered close to j and smaller than j−1), the right-downward letter-row tilt illusion is difficult to occur (if j−1 is close to 1, it may be considered that the number is based on mod 16). If such a case applies, the letter-row tilt illusion evaluation value adding unit 102e gives the array a low evaluation value.

<Example of Method for Determining Evaluation Value>

The following describes one example of the method for determination of an evaluation value by the letter-row tilt illusion evaluation value adding unit 102e. To produce an evaluation value, a filter, such as a filter illustrated in the following table, is given and denoted as f, the filter having values lower than a value at the center on the front side and values higher than the value at the center on the rear side.

TABLE 4

| |
|---|
| −0.5 |
| −1 |
| −1 |
| 0 |
| 1 |
| 1 |
| 0.5 |

Regarding the arrays belonging to CP, arranging the 16 scores determined at Step 1 creates an array X_1 of 16×M (see the following table in the case of W_2 and "テトニナ").

TABLE 5

| 0 | 0 | 0 | 0 |
|---|---|---|---|
| 0.091679 | 0 | 0 | 0 |
| 0 | 0 | 0 | 0 |
| 0 | 0 | 0.76073 | 0 |
| 0 | 0 | 0 | 0 |
| 0 | 0 | 0 | 0.809882 |
| 0.229555 | 0 | 0 | 0 |
| 0 | 0.26614 | 0 | 0 |
| 0 | 0 | 0 | 0 |
| 0 | 0 | 0 | 0 |
| 0 | 0 | 0 | 0 |
| 0 | 0 | 0.793645 | 0 |
| 0 | 0 | 0 | 0 |
| 0 | 0 | 0 | 0.549096 |
| 0.280957 | 0 | 0 | 0 |
| 0 | 0.200548 | 0 | 0 |

An array is obtained by substituting 1 for components larger than 0 in X_1, and denoted as X_2 (see the table below).

TABLE 6

| 0 | 0 | 0 | 0 |
|---|---|---|---|
| 1 | 0 | 0 | 0 |
| 0 | 0 | 0 | 0 |
| 0 | 0 | 1 | 0 |
| 0 | 0 | 0 | 0 |
| 0 | 0 | 0 | 1 |
| 1 | 0 | 0 | 0 |
| 0 | 1 | 0 | 0 |
| 0 | 0 | 0 | 0 |
| 0 | 0 | 0 | 0 |
| 0 | 0 | 0 | 0 |
| 0 | 0 | 1 | 0 |
| 0 | 0 | 0 | 0 |
| 0 | 0 | 0 | 1 |
| 1 | 0 | 0 | 0 |
| 0 | 1 | 0 | 0 |

The convolution product of X_2 and f is calculated, and the obtained result is denoted as X_3. As illustrated in the table below, X_3 is also obtained as an array of 16×M.

TABLE 7

| | | | |
|---|---|---|---|
| −1 | 0 | −0.5 | 0 |
| 0 | 0 | −1 | 0 |
| 1 | 0 | −1 | −0.5 |
| 0.5 | 0 | 0 | −1 |
| −0.5 | −0.5 | 1 | −1 |
| −1 | −1 | 1 | 0 |
| 0 | −1 | 0.5 | 1 |
| 1 | 0 | 0 | 1 |
| 1 | 1 | −0.5 | 0.5 |
| 0.5 | 1 | −1 | 0 |
| 0 | 0.5 | −1 | −0.5 |
| −0.5 | 0 | 0 | −1 |
| −1 | −0.5 | 1 | −1 |
| −1 | −1 | 1 | 0 |
| 0 | −1 | 0.5 | 1 |
| 1 | 0 | 0 | 1 |

An array is obtained by cyclically shifting the columns of X_3 rightward, and denoted as X_4 (see the table below).

TABLE 8

| | | | |
|---|---|---|---|
| 0 | −1 | 0 | −0.5 |
| 0 | 0 | 0 | −1 |
| −0.5 | 1 | 0 | −1 |
| −1 | 0.5 | 0 | 0 |
| −1 | −0.5 | −0.5 | 1 |
| 0 | −1 | −1 | 1 |
| 1 | 0 | −1 | 0.5 |
| 1 | 1 | 0 | 0 |
| 0.5 | 1 | 1 | −0.5 |
| 0 | 0.5 | 1 | −1 |
| −0.5 | 0 | 0.5 | −1 |
| −1 | −0.5 | 0 | 0 |
| −1 | −1 | −0.5 | 1 |
| 0 | −1 | −1 | 1 |
| 1 | 0 | −1 | 0.5 |
| 1 | 1 | 0 | 0 |

An array is obtained by calculating the Hadamard product (see Arai, "Linear Algebra, Basics and Applications", Nippon Hyoron Sha Co., Ltd.) of X_1 and X_4, and denoted as X_5 (see the table below). If the array being evaluated can be regarded as causing a letter-row tilt illusion, the sum of all values of X_5 should be large. Hence, the value of the sum of all values of X_5 is defined as the evaluation value of this array. As a result, in the case of "テトニナ" illustrated in Table 3, the evaluation value is 2.336179. The method for determining the evaluation value described above is an example. The calculation method is not limited to this, provided that the calculation is performed based on the idea described above.

TABLE 9

| | | | |
|---|---|---|---|
| 0 | 0 | 0 | 0 |
| 0 | 0 | 0 | 0 |
| 0 | 0 | 0 | 0 |
| 0 | 0 | 0 | 0 |
| 0 | 0 | 0 | 0.809882 |
| 0.229555 | 0 | 0 | 0 |
| 0 | 0.26614 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0.549096 |

TABLE 9-continued

| | | | |
|---|---|---|---|
| 0.280957 | 0 | 0 | 0 |
| 0 | 0.200548 | 0 | 0 |

<Step 5>

The total number of arrays of characters belonging to CP is denoted as K, and the arrays of the characters belonging to CP are denoted as CP(1), . . . , CP(K). If N=7 and M=4 as described above, it results that K=210. The evaluation value of CP(k) for a filter W_i (i=1, . . . , L) is denoted as E(i,k). For example, average values of E(1,k), . . . , E(L,k) are calculated as overall evaluation values of CP(k), and denoted as Mean(k) (see the table below).

TABLE 10

| | W_1 | W_2 | Mean |
|---|---|---|---|
| CP(1) | −0.00476 | −0.19743 | −0.10109 |
| CP(2) | 0.943458 | −0.50434 | 0.21956 |
| CP(3) | 2.7377 | 2.172297 | 2.454998 |
| CP(4) | −0.62835 | 0.886682 | 0.129167 |
| ... | ... | ... | ... |
| CP(210) | 2.145358 | 2.336179 | 2.240769 |

Mean(k) are then arranged in descending order. An array at a higher rank of these arrays gives the character string thereof a larger amount of illusion of the letter-row tilt illusion among given character strings. As a result, based on W_1 mentioned above, the following character strings were obtained as those given higher evaluation values in the case of the example of the character set "タチツテトナニ".

TABLE 11

| |
|---|
| チニナテチニナテチニナテチニナテ |
| チニナテチニナテチニナテチニナテ |
| テナニチテナニチテナニチテナニチ |
| テナニチテナニチテナニチテナニチ |
| チニナテチニナテチニナテチニナテ |
| チニナテチニナテチニナテチニナテ |
| テナニチテナニチテナニチテナニチ |
| テナニチテナニチテナニチテナニチ |

Based on W_2 mentioned above, the following character strings were obtained as those given higher evaluation values in the case of the example of the character set "タチツテトナニ".

TABLE 12

| |
|---|
| タツナチタツナチタツナチタツナチ |
| タツナチタツナチタツナチタツナチ |
| チナツタチナツタチナツタチナツタ |
| チナツタチナツタチナツタチナツタ |
| タツナチタツナチタツナチタツナチ |
| タツナチタツナチタツナチタツナチ |
| チナツタチナツタチナツタチナツタ |
| チナツタチナツタチナツタチナツタ |

Based on the average values, the following character strings were obtained as those given higher evaluation values.

TABLE 13

| |
|---|
| チニツナチニツナチニツナチニツナ |
| チニツナチニツナチニツナチニツナ |
| ナツニチナツニチナツニチナツニチ |
| ナツニチナツニチナツニチナツニチ |

TABLE 13-continued

チニツナチニツナチニツナチニツナ
チニツナチニツナチニツナチニツナ
ナツニチナツニチナツニチナツニチ
ナツニチナツニチナツニチナツニチ

W_1 is a filter that widely passes a low-frequency band and a relatively wide high-frequency band, and W_2 is a filter that passes only a relatively low-frequency band compared with W_1. Hence, a result was obtained that the character strings evaluated based on W_1 give a stronger letter-row tilt illusion when viewed from a near position whereas, in contrast, the character strings evaluated based on W_2 give a stronger letter-row tilt illusion when viewed from a distant position, as illustrated in Tables 11 to 13. If average values are employed as overall evaluation values, the definition of higher rank may be such that an array is not ranked higher only based on the overall evaluation value, but an array that is given a higher overall evaluation value is ranked higher among arrays that are given the maximum evaluation value with respect to an individual filter. Other rankings may be performed using evaluation values and/or overall evaluation values. Using the same method can also create a letter-row tilt illusion of a character string that has a meaning (i.e., "This year is busier than usual." in English), as illustrated in FIG. 90. This is the end of the explanation of the example of the automatic character string generation from any character set.

In this manner, the embodiment of the present invention provides a letter-row tilt illusion generating apparatus, a letter-row tilt illusion generating method, a printing medium manufacturing method, an electronic medium manufacturing method, a program, and a recording medium that are capable of automatically generating character strings that cause letter-row tilt illusions from any character set. More specifically, according to the embodiment of the present invention, by distributing flyers, fans, cards, or the like on which, for example, characters of a company's name, a product name, or the like, or symbols causing a letter-row tilt illusion are printed, advertising effects for the company or the like can be increased; thus, the present invention is useful in fields such as the advertising industry. Moreover, it is possible to provide illusion images as entertainment products, such as picture books, or enjoy illusion images by tilting greetings, names, or the like on, for example, New Year's cards, Christmas cards, and business cards; thus, the present invention is highly useful in fields such as toy-related fields and printing-related fields. For, for example, cell phones, such as smartphones, and touchscreen personal computers, it is possible to provide an application with which, when a user types or writes any desired character set on the screen, the character set can be converted into a character string causing a letter-row tilt illusion, or the character string can be inserted into electronic mail or printed, so that the present invention is highly useful in, for example, software-related fields. When a character string causing a letter-row tilt illusion is displayed on a screen, a display, or the like, pedestrians can see the image as if it is tilted. According to the present invention, evaluation values of character strings causing letter-row tilt illusions can be obtained, so that various types of game application software using the character strings can be created; thus, the present invention is also useful in the game industry. In addition, because using the evaluation values can create letter-row tilt illusions with various amounts of illusion, the present invention can create psychological experiment equipment based on the evaluation values, and thus is also useful in experiment equipment. Because a letter-row tilt illusion of a character string that has a meaning (FIG. 90) can also be created, the present invention can be used in various ways as a new way of expression by combination of meaning and tilt of characters.

[Pinwheel Framelet]

In the present embodiment, as described above, a pinwheel framelet to be used as an example may be a wavelet frame with orientation selectivity, such as the well-known simple pinwheel framelet or pinwheel wavelet frame, or a filterbank with orientation selectivity. A pinwheel framelet will be described below.

For the symmetric matrix given by $A=(A_{k,l}):(n+1)\times(n+1)$, a matrix that satisfies $A_{s,t}=A_{n-s,t}=A_{s,n-t}=A_{n-s,n-t}$ is determined, where degree n is odd and $n \geq 3$, $s=0, 1, \ldots, [n/2]$, and $t=s, \ldots, [n/2]$. [ ] is a Gauss symbol.

If n=7, the following matrix satisfies the condition.

$$A = \begin{pmatrix} 0 & 0 & 0 & 0 & 0 & 0 & 0 & 0 \\ 0 & 1 & 1 & 1 & 1 & 1 & 1 & 0 \\ 0 & 1 & 2 & 2 & 2 & 2 & 1 & 0 \\ 0 & 1 & 2 & 3 & 3 & 2 & 1 & 0 \\ 0 & 1 & 2 & 3 & 3 & 2 & 1 & 0 \\ 0 & 1 & 2 & 2 & 2 & 2 & 1 & 0 \\ 0 & 1 & 1 & 1 & 1 & 1 & 1 & 0 \\ 0 & 0 & 0 & 0 & 0 & 0 & 0 & 0 \end{pmatrix}$$ [Expression 2]

If the matrix is given by $B=(B_{k,l})$: $(n+1)\times(n+1)$, B is a matrix satisfying the following condition (P).

$$\text{Condition } (P): \begin{cases} B_{k,l} = B_{l,k} \\ B_{k,l} = B_{n-k,l} = B_{k,n-l} = B_{n-k,n-l} \\ B_{k,l} \geq 0 \end{cases}$$ [Expression 3]

$$n_0 = \left[\frac{n}{2}\right]$$ [Expression 4]

There are $\frac{1}{2}(n_0+1)(n_0+2)$ free variables.

$$F_{k,l}^1(\theta_1, \theta_2) = \frac{1}{2}|\det M|^{1/2} i^{k+l+A_{k,l}} e^{-\pi i \theta_1} e^{-\pi i \theta_2} \sqrt{B_{k,l}}$$
$$\cos^{n-k-A_{k,l}}(\pi x)\sin^{k-A_{k,l}}(\pi x) \times \cos^{n-l-A_{k,l}}(\pi y)$$
$$\sin^{l-A_{k,l}}(\pi y) \times (-\cos(\pi x)\sin(\pi x) + \cos(\pi y)\sin(\pi y))^{A_{k,l}}$$ [Expression 5]

$$F_{k,l}^2(\theta_1, \theta_2) = \frac{1}{2}|\det M|^{1/2} i^{k+l+A_{k,l}} e^{-\pi i \theta_1} e^{-\pi i \theta_2} \sqrt{B_{k,l}}$$
$$\cos^{n-k-A_{k,l}}(\pi x)\sin^{k-A_{k,l}}(\pi x) \times \cos^{n-l-A_{k,l}}(\pi y)$$
$$\sin^{l-A_{k,l}}(\pi y) \times (\cos(\pi x)\sin(\pi x) + \cos(\pi y)\sin(\pi y))^{A_{k,l}}$$ [Expression 6]

where M is a sampling matrix of a rectangular grid, a quincunx grid, or a hexagonal grid.

$$f_{k,l}^1 \leftrightarrow F_{k,l}^2; f_{k,l}^2 \leftrightarrow F_{k,l}^2$$ [Expression 7]

$$A_f = \{(0,0), (0,n), (n,0), (n,n)\}$$

$$A_g = \{(k,l)\}_{k=0,n;l=1,\ldots,n-1} \cup \{(k,l)\}_{l=0,n;k=1,\ldots,n-1}$$

$$A_a = \{(k,l)\}_{k=1,\ldots,n-1; l=1,\ldots,n-1} \quad \text{[Expression 8]}$$

$$P_n = \{\sqrt{2}f_{k,l}^1\}_{(k,l)\in \Lambda_f \cup \Lambda_g} \cup \{f_{k,1}^1\}_{(k,l)\in \Lambda_a} \cup \{f_{k,l}^2\}_{(k,l)\in \Lambda_a} \quad \text{[Expression 9]}$$

Lemma 2 (H.&S. Arai, 2008)

The necessary and sufficient condition that Pn be a framelet filter relating to a rectangular grid, a quincunx grid, or a hexagonal grid is that $B=(B_{k,l})$ satisfies the following condition.

$$\sum_{k=0}^{n}\sum_{l=0}^{n}\sum_{j=1}^{2}|F_{k,l}^{j}(\theta_1,\theta_2)|^2 \equiv |\det M| \quad \text{[Expression 10]}$$

<Method of Determining $B=(B_{k,1})$ Satisfying the Above Condition>

$\{(k,l): k=0, 1, \ldots, n_0, l=s, \ldots, n_0,\}$ is ordered as follows.

| (0,0) | (0,1) | (0,2) | ... | $(0, n_0-1)$ | $(0, n_0)$ |
|---|---|---|---|---|---|
|  | (1,1) | (1,2) | ... | $(1, n_0-1)$ | $(1, n_0)$ |
|  |  |  | ⋱ | ⋮ | ⋮ |
|  |  |  |  | $(n_0-1, n_0-1)$ | $(n_0-1, n_0)$ |
|  |  |  |  |  | $(n_0, n_0)$ |

[Expression 11]

↕

| 1 | 2 | 3 | ... | $n_0$ | $n_0 + 1$ |
|---|---|---|---|---|---|
| $n_0+2$ | $n_0+3$ | ... | $2n_0$ | $2n_0+1$ | |
|  |  | ⋱ | ⋮ | ⋮ | |
|  |  |  | $\frac{1}{2}n_0(n_0+3)-1$ | $\frac{1}{2}n_0(n_0+3)$ | |
|  |  |  |  | $\frac{1}{2}n_0(n_0+1)(n_0+2)$ | |

$\mu = (k, l), v = (k', l')$ $$K_{\mu,v} = 2^{3-4n+4k}(-1)^l \sum_{p=0}^{k}\binom{2k}{2p} \quad \text{[Expression 12]}$$

$$\left[\left[\sum_{q=0}^{[2k-2p]}(-1)^q\binom{-2k-2p+2n}{2k'-2p+n-q}\binom{2k-2p}{q}\right]\times\right.$$

$$\left[\sum_{q=0}^{2p+2l-2k}(-1)^q\binom{2p+2n-2k-2l}{2l'+2p+n-2k-q}\right.$$

$$\left.\binom{2p+2l-2k}{q}\right] + \left[\sum_{q=0}^{[2k-2p]}(-1)^q\right.$$

$$\left.\binom{-2k-2p+2n}{2l'-2p+n-q}\binom{2k-2p}{q}\right]\times$$

$$\left[\sum_{q=0}^{2p+2l+2k}(-1)^q\binom{2p+2n-2k-2l}{2k'+2p+n-2k-q}\right.$$

$$\left.\left.\binom{2p+2l-2k}{q}\right)\right]\right\}$$

-continued $$\begin{pmatrix} K_{1,1} & \cdots & K_{1,\frac{1}{2}(n_0+1)(n_0+2)} \\ \vdots & \ddots & \vdots \\ K_{\frac{1}{2}(n_0+1)(n_0+2),1} & \cdots & K_{\frac{1}{2}(n_0+1)(n_0+2),\frac{1}{2}(n_0+1)(n_0+2)} \end{pmatrix} \quad \text{[Expression 13]}$$

$$\begin{pmatrix} X_1 \\ X_2 \\ \vdots \\ X_{\frac{1}{2}(n_0+1)(n_0+2)} \end{pmatrix} = \begin{pmatrix} 4 \\ 0 \\ \vdots \\ 0 \end{pmatrix}$$

$$B_{k,l} = \quad \text{[Expression 14]}$$

$$\begin{cases} 2X_s & s = \frac{1}{2}(k-1)(2n_0-k+4)+1, k=1,\ldots,n_0 \\ X_s & \text{etc.} \end{cases}$$

Theorem 3 (H.&S. Arai, 2008)

Figure 91:
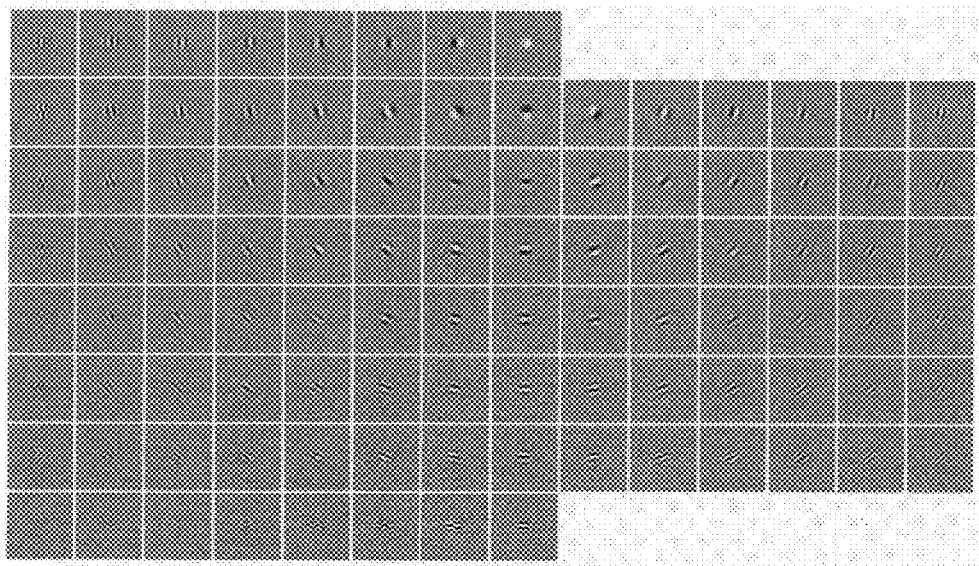
FIG. 91 is a diagram illustrating filters that are obtained by calculating the cyclic correlation product of maximal overlap pinwheel framelet filters at level 2 of degree 7 and maximal overlap pinwheel framelet approximate filters at level 1 of degree 7.
Figure 92:
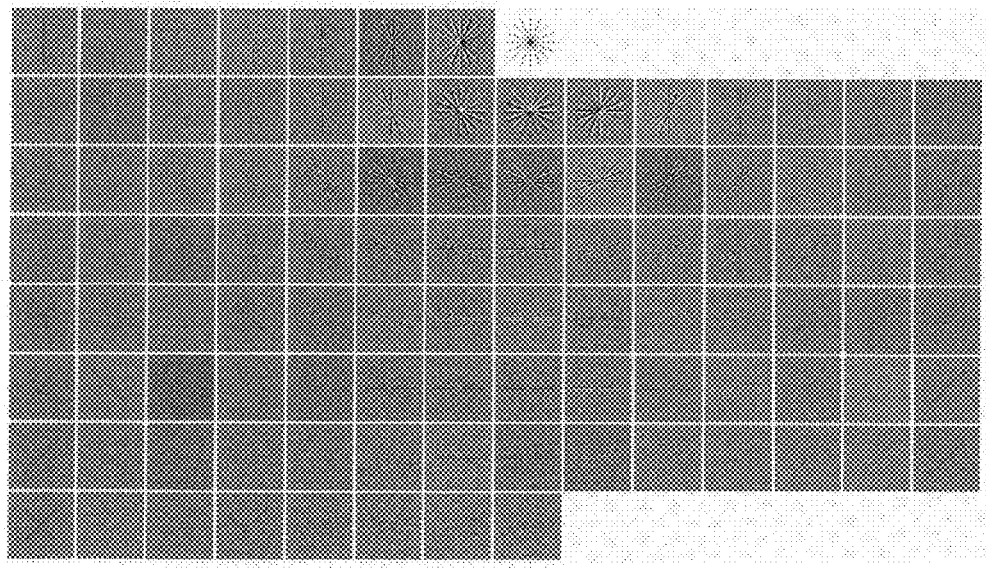
FIG. 92 is a diagram illustrating respective subband signals of a result obtained by performing up to the 2nd stage of maximal overlap multiresolution decomposition using the pinwheel framelet of degree 7 on an image composed of line segments in various directions.

$B=(B_{k,l})$ determined above satisfies Lemma 2. Therefore, Pn is a framelet filter relating to a rectangular grid, a quincunx grid, or a hexagonal grid. Pn is referred to as a pinwheel framelet of degree n. FIG. 91 is a diagram illustrating the filters obtained by calculating the cyclic correlation product of maximum overlap pinwheel framelet filters at level 2 and an approximate filter at level 1. FIG. 92 is a diagram illustrating each subband signal of the result obtained by performing the 2nd stage of maximal overlap MRA decomposition using a pinwheel framelet on an image composed of line segments in various directions.

This is the end of the explanation of the present embodiment.

Other Embodiments

The embodiment of the present invention has been described above, and the present invention can be implemented by various different embodiments within the scope of the technical idea described in the claims in addition to the above-described embodiment.

For example, while examples have been given on the cases where the letter-row tilt illusion generating apparatus 100 or the image processing apparatus 400 performs the processing in a stand-alone mode, the letter-row tilt illusion generating apparatus 100 or the image processing apparatus 400 may perform the processing in response to a request from a client terminal (a housing other than the letter-row tilt illusion generating apparatus 100 or the image processing apparatus 400) and return the processing results to the client terminal. For example, the letter-row tilt illusion generating apparatus 100 may be configured as an ASP server, and may receive data of a character set transmitted from a user terminal via the network 300, and return character string data created from characters in the character set to the user terminal. Alternatively, the image processing apparatus 400 may be configured as an ASP server, and may receive image data as an original image transmitted from a user terminal via the network 300, and return processed image data that has been processed based on the image data to the user terminal.

Moreover, among the steps of the processing described in the embodiment, all or part of the steps of the processing described as automatic processing may be performed manually and all or part of the steps of the processing described as manual processing may be performed automatically by well-known methods.

In addition thereto, the processing procedures, the control procedures, the specific names, the information including registered data of each processing and parameters, such as retrieval conditions, the screen examples, and the database configurations, described in the literature and drawings above may be arbitrarily modified unless otherwise indicated.

Furthermore, each component of the letter-row tilt illusion generating apparatus 100 or the image processing apparatus 400 illustrated in the drawings is formed on the basis of functional concept, and is not necessarily configured physically the same as those illustrated in the drawings.

For example, all or any part of the processing functions that the devices in the letter-row tilt illusion generating apparatus 100 or the image processing apparatus 400 have, and particularly each processing function performed by each of the control units 102 and 402, may be implemented by a central processing unit (CPU) and a computer program interpreted and executed by the CPU, or may be implemented as hardware by wired logic. The computer program is recorded in a recording medium to be described later, and is mechanically read into the letter-row tilt illusion generating apparatus 100 or the image processing apparatus 400 as necessary. Specifically, each of the storing units 106 and 406, such as a ROM and an HDD, or the like records a computer program for providing instructions to the CPU in cooperation with the operating system (OS) and for executing various types of processing. This computer program is executed by being loaded into a RAM and configures the control unit in cooperation with the CPU.

Moreover, this computer program may be stored in an application program server that is connected to the letter-row tilt illusion generating apparatus 100 or the image processing apparatus 400 via the any desirable network 300, and all or part thereof may be downloaded as necessary.

Furthermore, the program according to the present invention may be stored in a computer-readable recording medium and may be configured as a program product. The "recording medium" includes any "portable physical medium", such as a memory card, a USB memory, an SD card, a flexible disk, a magneto-optical disk, a ROM, an EPROM, an EEPROM, a CD-ROM, an MO, a DVD, and a Blu-ray Disc.

Moreover, the "program" refers to a data processing method written in any language and any description method, and is not limited to a specific format, such as source codes and binary codes. The "program" is not necessarily configured unitarily and includes a program constituted in a dispersed manner as a plurality of modules and libraries and a program that implements its functions in cooperation with a different program representative of which is an OS. Well-known configurations and procedures can be used for the specific configuration and reading procedure for reading a recording medium, the installation procedure after reading a recording medium, and the like in each device illustrated in the present embodiment.

Various databases and the like (the framelet file 106a to the value data file 106d, the filter file 406a, and the image data file 406b) stored in the storing unit 106 or 406 are each a storage unit, examples of which are a memory device, such as a RAM and a ROM, a fixed disk drive, such as a hard disk, a flexible disk, and an optical disk, and stores therein various computer programs, tables, databases, files for web pages, and the like that are used for various types of processing or providing websites.

Moreover, the letter-row tilt illusion generating apparatus 100 or the image processing apparatus 400 may be configured as an information processing apparatus, such as a well-known personal computer and workstation, or may be configured by connecting any desirable peripheral device to the information processing apparatus. Moreover, the letter-row tilt illusion generating apparatus 100 or the image processing apparatus 400 may be implemented by installing software (including computer program and data) that causes the information processing apparatus to execute the method in the present invention.

Furthermore, specific forms of distribution/integration of the devices are not limited to those illustrated in the drawings, and all or a part thereof can be configured by functionally or physically distributing or integrating them in any desired unit according to, for example, various additions, or according to functional loads. In other words, the above-described embodiments may be implemented by combining them in any desired manner, or the embodiments may be selectively performed.

REFERENCE SIGNS LIST

100 Letter-row tilt illusion generating apparatus
102 Control unit
102a Character test image generating unit
102b Orientation difference calculating unit
102c Character string creating unit
102d Grouping unit
102f Criterion determination unit
102e Letter-row tilt illusion evaluation value adding unit
102g Character string output unit
102h Character selecting unit
104 Communication control interface unit
106 Storing unit
106a Framelet file
106b Character image file
106c Test image file
106d Value data file
108 Input/output control interface unit
112 Input device
114 Output device
200 External system
300 Network
400 Image processing apparatus
402 Control unit
402a Filter processing unit
402b Decomposing unit
402c Reconstructing unit
402d Weighting unit
402f Color space conversion unit
402g Processed image output unit
402h Hybrid generating unit
404 Communication control interface unit
406 Storing unit
406a Filter file
406b Image data file
408 Input/output control interface unit
412 Input device
414 Output device

The invention claimed is:

1. A digital filter for image processing, the digital filter comprising:
a decomposing unit that performs multiresolution decomposition, which includes a decomposition phase and a synthesis phase, on image data by using a broad-sense pinwheel framelet that is a set of an approximate filter with no orientation and a plurality of detail filters with respective orientations, and that has a degree, and obtains subband signals output from the synthesis phase; and a reconstructing unit that obtains reconstructed image data by reconstructing an image by summing the subband signals obtained by the decomposing unit;

wherein the reconstructing unit generates the reconstructed image data by summing the subband signals after attenuating or amplifying a subband signal, which is output from the synthesis phase, corresponding to at least one of filters that have predetermined frequency characteristics and/or a predetermined orientation among the filters.

2. The digital filter for image processing according to claim 1, wherein the predetermined frequency characteristics are specified by a position in a predetermined filter arrangement based on an orientation at each level of the broad-sense pinwheel framelet and/or by a level in the multiresolution decomposition.

3. The digital filter for image processing according to claim 1, wherein the reconstructing unit attenuates or amplifies the corresponding subband signal by weighting and summing the subband signals obtained by the decomposing unit.

4. The digital filter for image processing according to claim 1, wherein the reconstructing unit attenuates or amplifies the corresponding subband signal by weighting the filters in the decomposition phase and/or the synthesis phase of the broad-sense pinwheel framelet.

5. The digital filter for image processing according to claim 1, wherein the reconstructing unit obtains the reconstructed image data by weighting frequency response functions for the respective filters of the broad-sense pinwheel framelet, multiplying and adding the results with a predetermined method to derive filter coefficients therefrom, and filtering the image data with the filters constituted by the filter coefficients.

6. The digital filter for image processing according to claim 1, wherein the decomposing unit and the reconstructing unit obtain the reconstructed image data by using a unit impulse response that has been obtained in advance in response to a unit impulse signal for the same number of pixels as that of the image data, and obtaining a cyclic convolution product using the unit impulse response for the image data.

7. The digital filter for image processing according to claim 1, wherein the reconstructing unit relatively attenuates a subband signal corresponding to the approximate filter at a predetermined level in the multiresolution decomposition.

8. The digital filter for image processing according to claim 1, wherein the reconstructing unit relatively amplifies a subband signal corresponding to a detail filter among the filters that is on a high-frequency side at a predetermined level, and relatively attenuates a subband signal corresponding to a filter among the filters that is on a low-frequency side at the predetermined level.

9. The digital filter for image processing according to claim 1, wherein the reconstructing unit relatively attenuates a subband signal corresponding to a detail filter among the filters that is on a high-frequency side at a predetermined level, and relatively amplifies a subband signal corresponding to a filter among the filters that is on a low-frequency side at the predetermined level.

10. The digital filter for image processing according to claim 1, wherein the reconstructing unit relatively attenuates subband signals corresponding to filters that are on a low-frequency side and a high-frequency side among the filters, and relatively amplifies a subband signal corresponding to a filter among the filters that is in a medium-frequency band including on a relatively low-frequency side and on a relatively high-frequency side.

11. The digital filter for image processing according to claim 1, wherein the reconstructing unit attenuates a subband signal corresponding to at least one of detail filters that have an orientation orthogonal or oblique to a floating direction among the detail filters.

12. The digital filter for image processing according to claim 1, wherein the reconstructing unit attenuates a subband signal corresponding to at least one of detail filters belonging to one group among two groups of a group composed of detail filters with an orientation that is neither horizontal nor vertical to an orthogonal axis of a floating direction and is at a negative angle relative to the orthogonal axis and a group composed of detail filters with an orientation that is neither horizontal nor vertical to the orthogonal axis of the floating direction and is at a positive angle relative to the orthogonal axis, and detail filters with an orientation orthogonal to the floating direction, among the detail filters.

13. The digital filter for image processing according to claim 1, wherein the decomposing unit performs the multiresolution decomposition on two types of image data by using the broad-sense pinwheel framelet; and the reconstructing unit further comprises a hybrid generating unit that generates hybrid image data by generating respective pieces of reconstructed image data by relatively amplifying a subband signal corresponding to at least one of detail filters that have high-frequency-side frequency characteristics for one of the two types of image data, and relatively amplifying a subband signal corresponding to at least one of the filters that have low-frequency-side frequency characteristics for the other of the two types of image data, and by superimposing the respective pieces of reconstructed image data obtained for the two types of image data.

14. A digital filter for image processing according to claim 1, the digital filter being preliminarily obtained as a unit impulse response by inputting a unit impulse signal for the same number of pixels as that of the image data.

15. A digital filter for image processing according to claim 1, the digital filter being created by the reconstructing unit, wherein the reconstructing unit calculates filter coefficients thereof by weighting, with predetermined weights, frequency response functions for respective filters of the broad-sense pinwheel framelet, and multiplies and adds the results with a predetermined method, wherein the predetermined weights are weights each of which attenuates or amplifies the subband signal.

16. An image generating apparatus comprising the digital filter for image processing according to claim 1.

17. An image generating method using the digital filter for image processing according to claim 1.

18. A digital filter creating method performed by a computer comprising at least a control unit for creating the digital filter according to claim 14, the digital filter creating method comprising:

a decomposing step of obtaining subband signals by performing multiresolution decomposition, which includes a decomposition phase and a synthesis phase, on a unit impulse signal for the same number of pixels as that of image data by using a broad-sense pinwheel framelet that is a set of an approximate filter with no orientation and a plurality of detail filters with respective orientations, and that has a degree, the subband signals being output from the synthesis phase; and a reconstructing step of creating, as a digital filter for image processing, a unit impulse response to a unit impulse signal that is obtained, before an image is reconstructed by summing the subband signals obtained at the decomposing step, by attenuating or amplifying a subband signal corresponding to at least one of filters that have predetermined frequency characteristics and/or a predetermined orientation among the filters and then summing the subband signals;

the decomposing step and the reconstructing step being performed by the control unit.

19. A digital filter creating method performed by a computer comprising at least a control unit for creating the digital filter according to claim 15, the digital filter creating method comprising a step performed by the control unit of creating a digital filter for image processing by calculating filter coefficients thereof by weighting, with predetermined weights, frequency response functions for respective filters of a broad-sense pinwheel framelet that is a set of an approximate filter with no orientation and a plurality of detail filters with respective orientations, and that has a degree, and multiplying and adding the results with a predetermined method, wherein among subband signals obtained by multiresolution decomposition, which includes a decomposition phase and a synthesis phase, the subband signals being output from the synthesis phase, the predetermined weights are weights each of which attenuates or amplifies, before the subband signals are summed to reconstruct an image, a subband signal corresponding to at least one of filters that have predetermined frequency characteristics and/or a predetermined orientation among the filters.

20. A non-transitory computer-readable medium comprising computer-readable program codes for creating the digital filter according to claim 14, performed by a computer, the program codes when executed causing the computer to execute:

a decomposing step of obtaining subband signals by performing multiresolution decomposition, which includes a decomposition phase and a synthesis phase, on a unit impulse signal for the same number of pixels as that of image data by using a broad-sense pinwheel framelet that is a set of an approximate filter with no orientation and a plurality of detail filters with respective orientations, and that has a degree, the subband signals being output from the synthesis phase; and a reconstructing step of creating, as a digital filter for image processing, a unit impulse response to a unit impulse signal that is obtained, before an image is reconstructed by summing the subband signals obtained at the decomposing step, by attenuating or amplifying a subband signal corresponding to at least one of filters that have predetermined frequency characteristics and/or a predetermined orientation among the filters and then summing the subband signals.

21. A non-transitory computer-readable medium comprising computer-readable program codes for creating the digital filter according to claim 15, performed by a computer, the program codes when executed causing the computer to execute a step of creating a digital filter for image processing by calculating filter coefficients thereof by weighting, with predetermined weights, frequency response functions for respective filters of a broad-sense pinwheel framelet that is a set of an approximate filter with no orientation and a plurality of detail filters with respective orientations, and that has a degree, and multiplying and adding the results with a predetermined method, wherein among subband signals obtained by multiresolution decomposition, which includes a decomposition phase and a synthesis phase, the subband signals being output from the synthesis phase, the predetermined weights are weights each of which attenuates or amplifies, before the subband signals are summed to reconstruct an image, a subband signal corresponding to at least one of filters that have predetermined frequency characteristics and/or a predetermined orientation among the filters.

* * * * *